US012625606B2

(12) United States Patent
Bian

(10) Patent No.: US 12,625,606 B2
(45) Date of Patent: May 12, 2026

(54) ANIMATION EFFECT LINKAGE OF UI ELEMENTS

(71) Applicant: Huawei Technologies Co., Ltd., Shenzhen (CN)

(72) Inventor: Chao Bian, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 132 days.

(21) Appl. No.: 18/287,371

(22) PCT Filed: Apr. 1, 2022

(86) PCT No.: PCT/CN2022/084921
§ 371 (c)(1),
(2) Date: Oct. 18, 2023

(87) PCT Pub. No.: WO2022/222738
PCT Pub. Date: Oct. 27, 2022

(65) Prior Publication Data
US 2024/0201839 A1    Jun. 20, 2024

(30) Foreign Application Priority Data

Apr. 20, 2021    (CN) .......................... 202110426820.7

(51) Int. Cl.
*G06F 3/0486* (2013.01)
*G06F 3/0481* (2022.01)
*G06T 13/00* (2011.01)

(52) U.S. Cl.
CPC .......... *G06F 3/0486* (2013.01); *G06F 3/0481* (2013.01); *G06T 13/00* (2013.01); *G06T 2200/24* (2013.01)

(58) Field of Classification Search
CPC .. G06F 3/0486; G06F 3/0481; G06F 3/04817; G06F 3/0482; G06F 3/0484;
(Continued)

(56) References Cited

U.S. PATENT DOCUMENTS

2010/0090964 A1*    4/2010    Soo ...................... G06F 3/04845
345/173
2014/0286581 A1*    9/2014    Horiuchi ............... G06F 3/0481
382/224
(Continued)

FOREIGN PATENT DOCUMENTS

CN        102375588 A        3/2012
CN        103870092 A        6/2014
(Continued)

*Primary Examiner* — Jeanette J Parker
(74) *Attorney, Agent, or Firm* — Slater Matsil, LLP

(57) ABSTRACT

M user interface UI elements are displayed on a screen of the electronic device, where M is a positive integer greater than 1. Dragging performed on a first UI element in the M UI elements is detected. In response to the dragging, each of N UI elements on the screen is enabled to move with a corresponding animation effect, where N is a positive integer ranging from 1 to M−1. The enabling the N UI elements to move with corresponding animation effects includes: determining a distance between the first UI element and a second UI element on the UI; determining an animation effect of movement of the second UI element based on the distance; and enabling the second UI element to move with the animation effect, to visually indicate that the second UI element moves with the first UI element.

20 Claims, 54 Drawing Sheets

(58) Field of Classification Search
CPC ............. G06F 3/04842; G06F 3/04845; G06F
3/04883; G06T 13/00; G06T 2200/24
See application file for complete search history.

(56) References Cited

U.S. PATENT DOCUMENTS

| | | | | |
|---|---|---|---|---|
| 2016/0196033 A1* | 7/2016 | Zhang | ................... | G06F 3/0488 |
| | | | | 715/863 |
| 2017/0277380 A1* | 9/2017 | Shan | ..................... | G06F 3/0488 |
| 2023/0342018 A1* | 10/2023 | Song | ..................... | G06F 3/0486 |

FOREIGN PATENT DOCUMENTS

| | | | |
|---|---|---|---|
| CN | 106775782 A | 5/2017 |
| CN | 113552987 A | 10/2021 |
| WO | 2012144225 A1 | 10/2012 |

* cited by examiner

200

300A

700A

700B

1200

1300

1400A

Horizontal spacing

1410A

Vertical spacing

1400B

Horizontal spacing

1420B

1430B

Vertical spacing

1500

Distance 0:

Distance 1:

Distance 2:

Distance 3:

Time

2000

2100

Center:

Edge:

2400

Large size:

Small size:

2500

2510
Display M user interface UI elements on a screen of an electronic device, where M is a positive integer greater than 1

2520
Detect pressing that is held for a period of time at a first UI element in the M UI elements 2530
Enable each of N UI elements on the screen to be scaled in response to the pressing, where N is a positive integer ranging from 1 to M−1

3100

3500

3510

3520

3530

4200

4300

4400

4600A

4700

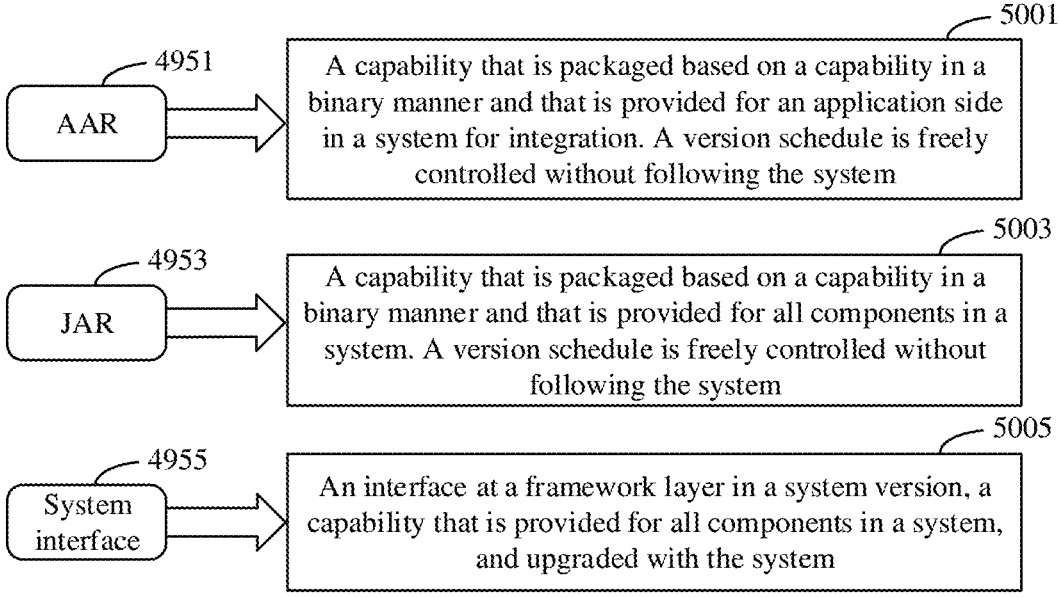

AAR — 4951

5001 — A capability that is packaged based on a capability in a binary manner and that is provided for an application side in a system for integration. A version schedule is freely controlled without following the system

JAR — 4953

5003 — A capability that is packaged based on a capability in a binary manner and that is provided for all components in a system. A version schedule is freely controlled without following the system System interface — 4955

5005 — An interface at a framework layer in a system version, a capability that is provided for all components in a system, and upgraded with the system

FIG. 50

ANIMATION EFFECT LINKAGE OF UI ELEMENTS

CROSS REFERENCE TO RELATED APPLICATIONS

This application is a National Stage of International Application No. PCT/CN2022/084921, filed on Apr. 1, 2022, which claims priority to Chinese Patent Application No. 202110426820.7, filed on Apr. 20, 2021. Both of the aforementioned applications are hereby incorporated by reference in their entireties.

TECHNICAL FIELD

The present disclosure generally relates to the field of information technologies, and in particular, to a graphical interface display method, an electronic device, a computer-readable storage medium, and a computer program product.

BACKGROUND

With the development of information technologies, various types of electronic devices are equipped with various types of screens. Therefore, display effects and styles of user interfaces (UI) on screens become key factors that affect user experience. Animations have become an important part of UIs. With improvement of performance of electronic devices such as smartphones, animations also develop correspondingly. There are an increasing quantity of animations with a high refresh rate, a high degree of rendering, and high complexity. Therefore, display of the animations needs to be further improved to improve user experience.

SUMMARY

According to some embodiments of the present disclosure, a graphical interface display method, an electronic device, a medium, and a program product are provided, to enhance linkage between animation effects of different UI elements, and highlight relationships between independent UI elements. In this way, animation effects of a UI better conform to users' use habits, thereby significantly improving user experience.

According to a first aspect, the present disclosure provides a graphical interface display method. According to the graphical interface display method in the first aspect, M user interface UI elements are displayed on a screen of an electronic device, where M is a positive integer greater than 1. Dragging performed on a first UI element in the M UI elements is detected. In response to the dragging, each of N UI elements on the screen is enabled to move with a corresponding animation effect, where N is a positive integer ranging from 1 to M−1. The enabling the N UI elements to move with corresponding animation effects includes: determining a distance between the first UI element and a second UI element on a UI; determining an animation effect of movement of the second UI element based on the distance; and enabling the second UI element to move with the animation effect, to visually indicate that the second UI element moves with the first UI element. In this manner, linkage between animation effects of different UI elements can be enhanced, and relationships between independent UI elements can be highlighted, so that animation effects of the UI better conform to users' use habits, thereby significantly improving user experience.

In some implementations, to determine the distance, a first reference point of the first UI element and a second reference point of the second UI element may be determined, and a distance between the first reference point and the second reference point is determined as the distance. In this manner, a distance may be determined based on reference points of determined UI elements, thereby improving accuracy of the determined distance and flexibility of a distance determining manner, and improving user experience.

In some implementations, to determine the distance, a first reference point of the first UI element may be determined, a target circle that intersects with the second UI element and has a smallest radius is determined from a plurality of circles that each use the first reference point as a center and that have respective radii, and the radius of the target circle is determined as the distance. In this manner, a distance between UI elements may be determined more simply and conveniently, thereby improving flexibility of a distance determining manner and improving user experience.

In some implementations, to determine the distance, a horizontal spacing between the first UI element and the second UI element may be determined, a vertical spacing between the first UI element and the second UI element is determined, and the distance is determined based on any one of the following: at least one of the horizontal spacing and the vertical spacing; or a direction from a second reference point of the second UI element to a first reference point of the first UI element, and at least one of the horizontal spacing and the vertical spacing. In this manner, a distance between UI elements may be determined based on a spacing between the UI elements, thereby improving flexibility of a distance determining manner and improving user experience.

In some implementations, the method may further include: determining an impact area of the first UI element based on a size of the first UI element; and determining UI elements that are in the M UI elements and that are in the impact area as the N UI elements. In this manner, a UI element that moves accordingly with a dragged UI element may be determined based on a size of the dragged UI element, so that animation effects of a UI better conform to users' use habits, thereby significantly improving user experience.

In some implementations, the method may further include: determining M−1 UI elements in the M UI elements other than the first UI element as the N UI elements. In this manner, UI elements other than a dragged UI element on a screen may move accordingly, so that the UI elements that move accordingly are determined more simply and conveniently, and animation effects of a UI better conform to users' use habits, thereby significantly improving user experience.

In some implementations, to determine an animation effect of the movement, a first animation effect with which the first UI element moves in response to the dragging may be determined, and an animation effect with which the second UI element moves in response to the dragging may be determined based on any one of the following: the first animation effect and the distance; or the first animation effect, the distance, and a size of the second UI element. In this manner, the animation effect of the first UI element may be transmitted to the second UI element, and the animation effect of the second UI element is further determined based on the distance between the first UI element and the second UI element and the size of the second UI element. Therefore, the animation effects of the UI may better conform to users' use habits, thereby significantly improving user experience.

In some implementations, the first animation effect of the movement of the first UI element may be determined based on a predefined curve in which a displacement changes over time. In this manner, movement of the first UI element may be conveniently controlled based on the predefined curve in which the displacement changes over time, so that the animation effects of the UI better conform to users' use habits, thereby significantly improving user experience.

In some implementations, the predefined curve may be a Bessel curve or an elastic force curve. In this manner, movement of the first UI element may be conveniently controlled based on the Bessel curve or the elastic force curve, so that the animation effects of the UI better conform to users' use habits, thereby significantly improving user experience.

In some implementations, the enabling the second UI element to move with the animation effect may include: determining a direction of the dragging; and enabling the second UI element to move, in association with the direction, with the animation effect. In this manner, a movement direction of a UI element that moves accordingly may be controlled based on a movement direction of the dragged UI element, so that the animation effects of the UI better conform to users' use habits, thereby significantly improving user experience.

In some implementations, the enabling the second UI element to move with the animation effect may include: determining a delay time based on the distance; and in response to the dragging, enabling the second UI element to move with the animation effect after the delay time. In this manner, it may be visually presented that linked movement is transmitted with the distance, so that the animation effects of the UI better conform to users' use habits, thereby significantly improving user experience.

In some implementations, the method may be implemented by using at least one of an AAR file, a JAR file, and a system interface. In this manner, graphical interface display with linked movement may be implemented simply and conveniently.

According to a second aspect of the present disclosure, an electronic device is provided. The electronic device includes a processor and a memory storing instructions. When the instructions are executed by the processor, the electronic device is enabled to perform the method according to any one of the first aspect and the implementations of the first aspect.

According to a third aspect of the present disclosure, a computer-readable storage medium is provided. The computer-readable storage medium stores instructions. When the instructions are executed by a processor, an electronic device is enabled to perform the method according to any one of the first aspect and the implementations of the first aspect.

According to a fourth aspect of the present disclosure, a computer program product is provided. The computer program product includes instructions. When the instructions are executed by a processor, an electronic device is enabled to perform the method according to any one of the first aspect and the implementations of the first aspect.

BRIEF DESCRIPTION OF THE DRAWINGS

Features, advantages, and other aspects of each implementation in the present disclosure become clearer with reference to the accompanying drawings and with reference to the following detailed descriptions. Several implementations of the present disclosure are shown herein by way of an example rather than a limitation. In the accompanying drawings:

FIG. 50 is a schematic diagram of a specific description of three manners of implementing a "linkage" animation effect capability or function according to an embodiment of the present disclosure.

DETAILED DESCRIPTION OF ILLUSTRATIVE EMBODIMENTS

Figure 1A:
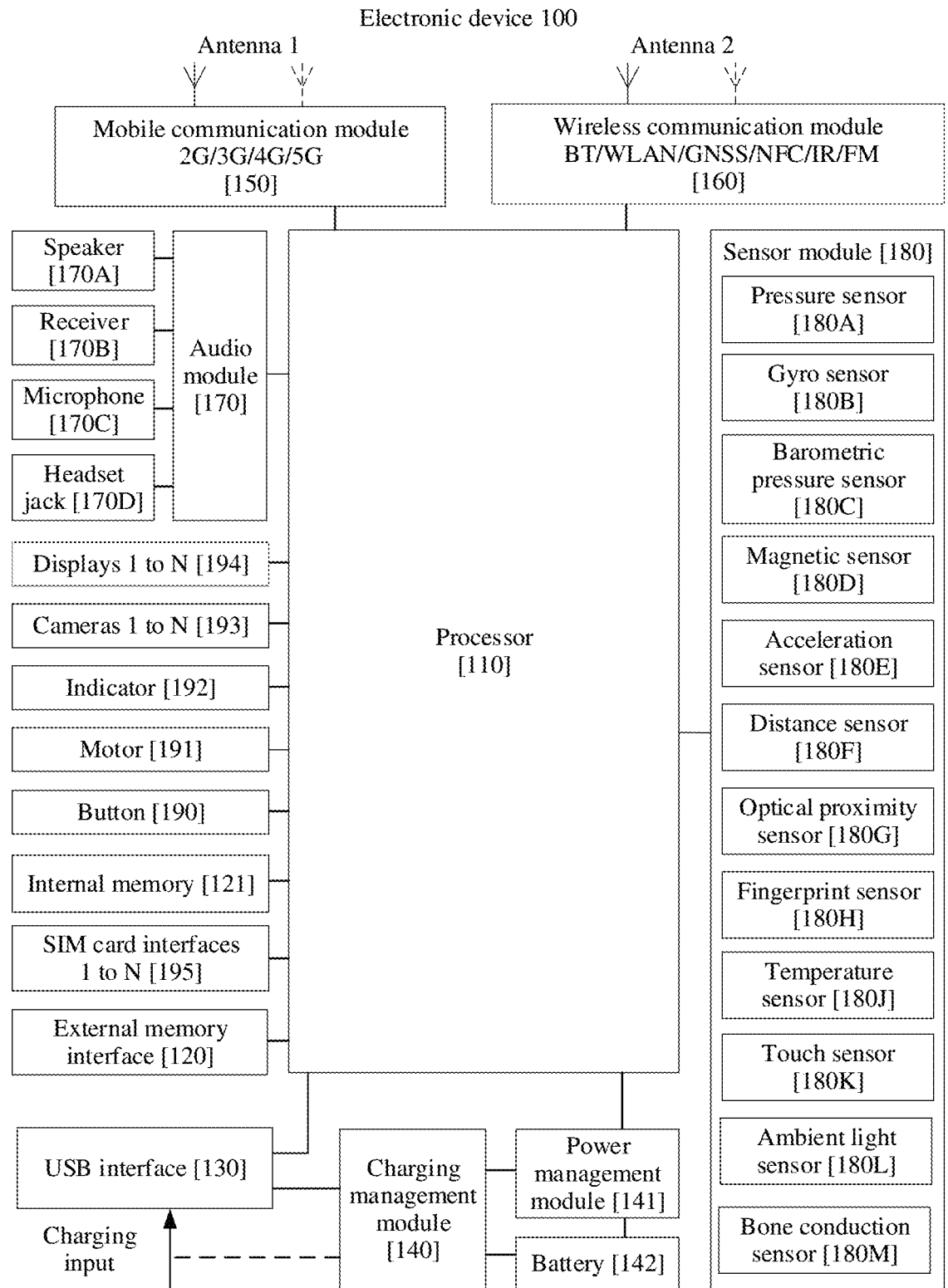
FIG. 1A and FIG. 1B are schematic diagrams of a hardware structure and a software structure of an electronic device that may implement an embodiment of the present disclosure.

Some example implementations of the present disclosure are described in detail below with reference to the accompanying drawings. Although some example implementations of the present disclosure are shown in the accompanying drawings, it should be understood that the present disclosure may be implemented in various forms and should not be limited by the example implementations set forth herein. Rather, these embodiments are provided to make the present disclosure more thorough and complete and to fully convey the scope of the present disclosure to a person skilled in the art.

The term "include" and variants thereof used in this specification indicate open inclusion, that is, "include but is not limited to". Unless otherwise stated, the term "or" means "and/or". The term "based on" means "at least partially based on". The terms "embodiments" and "some embodiments" both represent "at least some embodiments". The terms "first", "second", and the like are described to distinguish between different objects, and do not represent a sequence, and "first" and "second" are not limited to different types.

The term "UI" used in this specification represents an interface for interaction and information exchange between a user and an application or an operating system, and implements a conversion between an internal form of information and a form acceptable to the user. For example, a UI of an application is source code written in a specific computer language, for example, Java or an extensible markup language (extensible markup language, XML). The UI source code is parsed and rendered on an electronic device, and is finally presented as content that can be identified by the user, for example, a UI element such as an image, text, or a button.

In some embodiments, an attribute and content of a UI element on the UI are defined by using a label or a node. For example, UI elements included on the UI are specified by using nodes such as <Textview>, <ImgView>, and <VideoView> in the XML. One node corresponds to one UI element or one attribute on the UI. After being parsed and rendered, the node is presented as user-visible content. In addition, UIs of a plurality of applications such as a hybrid application (hybrid application) usually further include web pages. The web page may be understood as a special UI element embedded in the UI of the application. The web page is source code written in a specific computer language, for example, a hypertext markup language (hypertext markup language, HTML), a cascading style sheet (cascading style sheets, CSS), or JavaScript (JavaScript, JS). The web page source code may be loaded and displayed as content that can be identified by the user by using a browser or a web page display component whose function is similar to that of a browser. Specific content included on the web page is also defined by using a label or a node in the web page source code. For example, an element and an attribute of the web page are defined by using <p>, <img>, <video>, or <canvas> in the HTML.

The term "UI element" used in this specification includes but is not limited to visual UI elements such as a window (window), a scroll bar (scroll bar), a table view (table view), a button (button), a menu bar (menu bar), a text box (text box), a navigation bar, a toolbar (toolbar), an image (image), static text (static text), and a widget (Widget).

Some procedures described in embodiments of the present disclosure include a plurality of operations or steps that appear in a specific order. However, it should be understood that the operations or steps may be performed not based on the order of the operations or steps appear in embodiments of the present disclosure or may be performed in parallel. Sequence numbers of the operations are merely used to distinguish between different operations, and the sequence numbers do not represent any execution order. In addition, the procedures may include more or fewer operations, the operations or steps may be performed in sequence or in parallel, and the operations or steps may be combined.

In mobile operating systems such as Android and iOS, an animation is essentially a real-time display of a user interface UI or a UI element based on a refresh rate. Due to a principle of persistence of vision of human beings, a user feels that an image is moving. An animation changes from an initial state to a final state of the animation after animation duration. In this transformation process, the animation may be controlled based on an animation type and an animation transformation form. For example, the animation type may include a displacement animation, a rotation animation, a scaling animation, a transparent animation, and the like. The animation transformation form may be controlled by a controller such as an interpolator and an estimator. Such a controller may be configured to control an animation transformation speed during animation duration.

However, conventionally, an animation is merely a combination of simple animation effects. The animation effects are monotonous and do not comply with a physical rule, and a real use scenario and users' use habits are not considered.

Therefore, embodiments of the present disclosure provide a new graphical interface display solution. Embodiments of the present disclosure relate to animation effect linkage of UI elements on a UI, including dragging linkage, depth linkage, and pressure linkage. During linkage, an operated target UI element may affect other UI elements that are not operated. Specifically, triggering an animation effect of the target UI element may jointly trigger an animation effect of one or more other UI elements, or even other UI elements on the entire UI.

In this way, linkage between animation effects of different UI elements can be enhanced, and relationships between independent UI elements may be highlighted. Compared with a conventional animation in which animation effects are monotonous and UI elements are independent and unrelated, embodiments of the present disclosure can make an animation effect better comply with a physical rule, and consider a real use scenario and users' use habits, thereby significantly improving user experience.

The following describes some example embodiments of the present disclosure with reference to FIG. 1A to FIG. 46.

FIG. 1A is a schematic diagram of a hardware structure of an electronic device 100 that may implement an embodiment of the present disclosure. As shown in FIG. 1, the electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identity module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It should be understood that the structure shown in this embodiment of the present disclosure does not constitute a specific limitation on the electronic device 100. In some other embodiments of the present disclosure, the electronic device 100 may include more or fewer components than those shown in the figure, or some components may be combined, or some components may be split, or different component arrangements may be used. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU). Different processing units may be independent devices, or may be integrated into one or more processors. The controller may generate an operation control signal based on an instruction operation code and a time sequence signal, to control instruction reading and instruction execution.

A memory may be further disposed in the processor 110, and is configured to store instructions and data. In some embodiments, the memory in the processor 110 is a cache memory. The memory may store instructions or data that has been recently used or cyclically used by the processor 110. If the processor 110 needs to use the instructions or the data again, the processor may directly invoke the instructions or the data from the memory. This avoids repeated access, reduces waiting time of the processor 110, and improves system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a two-way synchronization serial bus, and includes one serial data line (serial data line, SDA) and one serial clock line (serial clock line, SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device 100.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communication module 160 through the I2S interface, to implement a function of answering a call through a Bluetooth headset.

The PCM interface may also be configured to: perform audio communication, and sample, quantize, and encode an analog signal. In some embodiments, the audio module 170 may be coupled to the wireless communication module 160 through a PCM bus interface. In some embodiments, the audio module 170 may alternatively transmit an audio signal to the wireless communication module 160 through the PCM interface, to implement a function of answering a call through a Bluetooth headset. Both the I2S interface and the PCM interface may be configured to perform audio communication.

The UART interface is a universal serial data bus, and is configured to perform asynchronous communication. The bus may be a two-way communication bus. The bus converts to-be-transmitted data between serial communication and parallel communication. In some embodiments, the UART interface is usually configured to connect the processor 110 to the wireless communication module 160. For example, the processor 110 communicates with a Bluetooth module in the wireless communication module 160 through the UART interface, to implement a Bluetooth function. In some embodiments, the audio module 170 may transmit an audio signal to the wireless communication module 160 through the UART interface, to implement a function of playing music through a Bluetooth headset.

The MIPI interface may be configured to connect the processor 110 to a peripheral device such as the display 194 or the camera 193. The MIPI interface includes a camera serial interface (camera serial interface, CSI), a display serial interface (display serial interface, DSI), and the like. In some embodiments, the processor 110 communicates with the camera 193 through the CSI, to implement an image shooting function of the electronic device 100. The processor 110 communicates with the display 194 through the DSI, to implement a display function of the electronic device 100.

The GPIO interface may be configured by software. The GPIO interface may be configured to transmit a control signal or a data signal. In some embodiments, the GPIO interface may be configured to connect the processor 110 to the camera 193, the display 194, the wireless communication module 160, the audio module 170, the sensor module 180, and the like. The GPIO interface may alternatively be configured as an I2C interface, an I2S interface, a UART interface, an MIPI interface, or the like.

The USB interface 130 is an interface that conforms to a USB standard specification, and may be specifically a mini USB interface, a micro USB interface, a USB type-C interface, or the like. The USB interface 130 may be configured to connect to the charger to charge the electronic device 100, or may be configured to transmit data between the electronic device 100 and a peripheral device, or may be configured to connect to a headset to play audio through the headset. The interface may be further configured to connect to another electronic device such as an AR device.

It may be understood that an interface connection relationship between the modules shown in this embodiment of the present disclosure is merely an example for description, and constitutes no limitation on the structure of the electronic device 100. In some other embodiments of the present disclosure, the electronic device 100 may alternatively use an interface connection manner different from that in the foregoing embodiment, or use a combination of a plurality of interface connection manners.

The charging management module 140 is configured to receive a charging input from the charger. The charger may be a wireless charger or a wired charger. In some embodiments of wired charging, the charging management module 140 may receive a charging input from the wired charger through the USB interface 130. In some embodiments of wireless charging, the charging management module 140 may receive a wireless charging input by using a wireless charging coil of the electronic device 100. The charging management module 140 may further supply power to the electronic device 100 through the power management module 141 while charging the battery 142.

The power management module 141 is configured to connect the battery 142, the charging management module 140, and the processor 110. The power management module 141 receives an input from the battery 142 and/or the charging management module 140, and supplies power to the processor 110, the internal memory 121, the display 194, the camera 193, the wireless communication module 160, and the like. The power management module 141 may further be configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented by the antenna 1, the antenna 2, the mobile communication module 150, the wireless communication module 160, the modem processor, the baseband processor, and the like. The antenna 1 and the antenna 2 are configured to transmit and receive an electromagnetic wave signal. Each antenna in the electronic device 100 may be configured to cover one or more communication frequency bands. Different antennas may be further multiplexed, to improve antenna utilization. For example, the antenna 1 may be multiplexed as a diversity antenna in a wireless local area network. In some other embodiments, the antennas may be used in combination with a tuning switch.

The mobile communication module 150 may provide a solution for wireless communication such as 2G, 3G, 4G, 5G, and 6G that is used in the electronic device 100. The mobile communication module 150 may include at least one filter, a switch, a power amplifier, a low noise amplifier (low noise amplifier, LNA), and the like. The mobile communication module 150 may receive an electromagnetic wave through the antenna 1, perform processing such as filtering and amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1. In some embodiments, at least some functional modules of the mobile communication module 150 may be disposed in the processor 110. In some embodiments, at least some functional modules of the mobile communication module 150 may be disposed in a same device as at least some modules of the processor 110.

The modem processor may include a modulator and a demodulator. The modulator is configured to modulate a to-be-sent low-frequency baseband signal into a medium- or high-frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal through an audio device (which is not limited to the speaker 170A, the receiver 170B, or the like), or displays an image or a video through the display 194. In some embodiments, the modem processor may be an independent device. In some other embodiments, the modem processor may be independent of the processor 110, and is disposed in a same device as the mobile communication module 150 or another functional module.

The wireless communication module 160 may provide a wireless communication solution that is used in the electronic device 100. The wireless communication solution includes wireless local area network (wireless local area networks, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, or the like. The wireless communication module 160 may be one or more devices integrating at least one communication processing module. The wireless communication module 160 receives an electromagnetic wave through the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

In some embodiments, the antenna 1 and the mobile communication module 150 in the electronic device 100 are coupled, and the antenna 2 and the wireless communication module 160 in the electronic device 100 are coupled, so that the electronic device 100 can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-CDMA), long term evolution (long term evolution, LTE), 5G and a subsequent evolved standard, BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (beidou navigation satellite system, BDS), a quasi-zenith satellite system (quasi-zenith satellite system, QZSS), and/or a satellite based augmentation system (satellite based augmentation systems, SBAS).

The electronic device 100 implements the display function through the GPU, the display 194, the application processor, and the like. The GPU is a microprocessor for image processing, and is connected to the display 194 and the application processor. The GPU is configured to: perform mathematical and geometric computation, and render an image. The processor 110 may include one or more GPUs that execute program instructions to generate or change display information.

The display 194 is configured to display an image, a video, and the like. The display 194 includes a display panel. In some embodiments, the electronic device 100 may include one or N displays 194. N is a positive integer greater than 1.

The electronic device 100 may implement the image shooting function by using the ISP, the camera 193, the video codec, the GPU, the display 194, the application processor, and the like. The ISP is configured to process data fed back by the camera 193. For example, during shooting, a shutter is pressed, light is transferred to a camera photosensitive element through a lens, an optical signal is converted into an electrical signal, and the camera photosensitive element transmits the electrical signal to the ISP for processing, to convert the electrical signal into a visible image. The ISP may further perform algorithm optimization on noise, brightness, and complexion of the image. The ISP may further optimize parameters such as exposure and a color temperature of an image shooting scene. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format such as RGB or YUV. In some embodiments, the electronic device 100 may include one or N cameras 193. N is a positive integer greater than 1.

The digital signal processor is configured to process a digital signal, and may process another digital signal in addition to the digital image signal. For example, when the electronic device 100 selects a frequency, the digital signal processor is configured to perform Fourier transform and the like on frequency energy.

The video codec is configured to compress or decompress a digital video. The electronic device 100 may support one or more types of video codecs. In this way, the electronic device 100 may play or record videos in a plurality of coding formats, for example, moving picture experts group (moving picture experts group, MPEG)-1, MPEG-2, MPEG-3, and MPEG-4.

The NPU is a neural-network (neural-network, NN) computing processor. The NPU quickly processes input information with reference to a structure of a biological neural network, for example, a transfer mode between human brain neurons, and may further continuously perform self-learning. Applications such as intelligent cognition of the electronic device 100 may be implemented through the NPU. Intelligent cognition includes image recognition, facial recognition, speech recognition, text understanding, and the like.

The external memory interface 120 may be configured to connect to an external memory card, for example, a micro SD card, to extend a storage capability of the electronic device 100. The external memory card communicates with the processor 110 through the external memory interface 120, to implement a data storage function. For example, files such as music and videos are stored in the external memory card.

The internal memory 121 may be configured to store computer-executable program code. The executable program code includes instructions. The internal memory 121 may include a program storage area and a data storage area. The program storage area may store an operating system, an application required for at least one function (such as a sound playing function and an image display function), and the like. The data storage area may store data (such as audio data and an address book) and the like that are created during use of the electronic device 100. In addition, the internal memory 121 may include a high-speed random access memory, or may include a non-volatile memory, for example, at least one magnetic disk storage device, a flash memory, or a universal flash storage (universal flash storage, UFS). The processor 110 runs instructions stored in the internal memory 121 and/or instructions stored in a memory disposed in the processor, to perform various function applications and data processing of the electronic device 100.

The electronic device 100 may implement an audio function, for example, music playing and recording by using the audio module 170, the speaker 170A, the receiver 170B, the microphone 170C, the headset jack 170D, the application processor, and the like.

The SIM card interface 195 is configured to connect to a SIM card. The SIM card may be inserted into the SIM card interface 195 or may be removed from the SIM card interface 195, to implement contact with or separation from the electronic device 100. The electronic device 100 may support one or N SIM card interfaces. N is a positive integer greater than 1. The SIM card interface 195 may support a nano-SIM card, a micro-SIM card, a SIM card, or the like. A plurality of cards may be inserted into a same SIM card interface 195 at the same time. The plurality of cards may be of a same type or different types. The SIM card interface 195 may be compatible with different types of SIM cards. The SIM card interface 195 may also be compatible with an external memory card. The electronic device 100 interacts with a network through the SIM card, to implement functions such as calling and data communication. In some embodiments, the electronic device 100 uses an eSIM, namely, an embedded SIM card. The eSIM card may be embedded in the electronic device 100, and cannot be separated from the electronic device 100.

A software system of the electronic device 100 may use a layered architecture, an event-driven architecture, a micro-kernel architecture, a microservice-based architecture, or a cloud architecture. In embodiments of the present disclosure, a mobile operating system in a layered architecture is used as an example to describe a software structure of the electronic device 100.

Figure 1B:
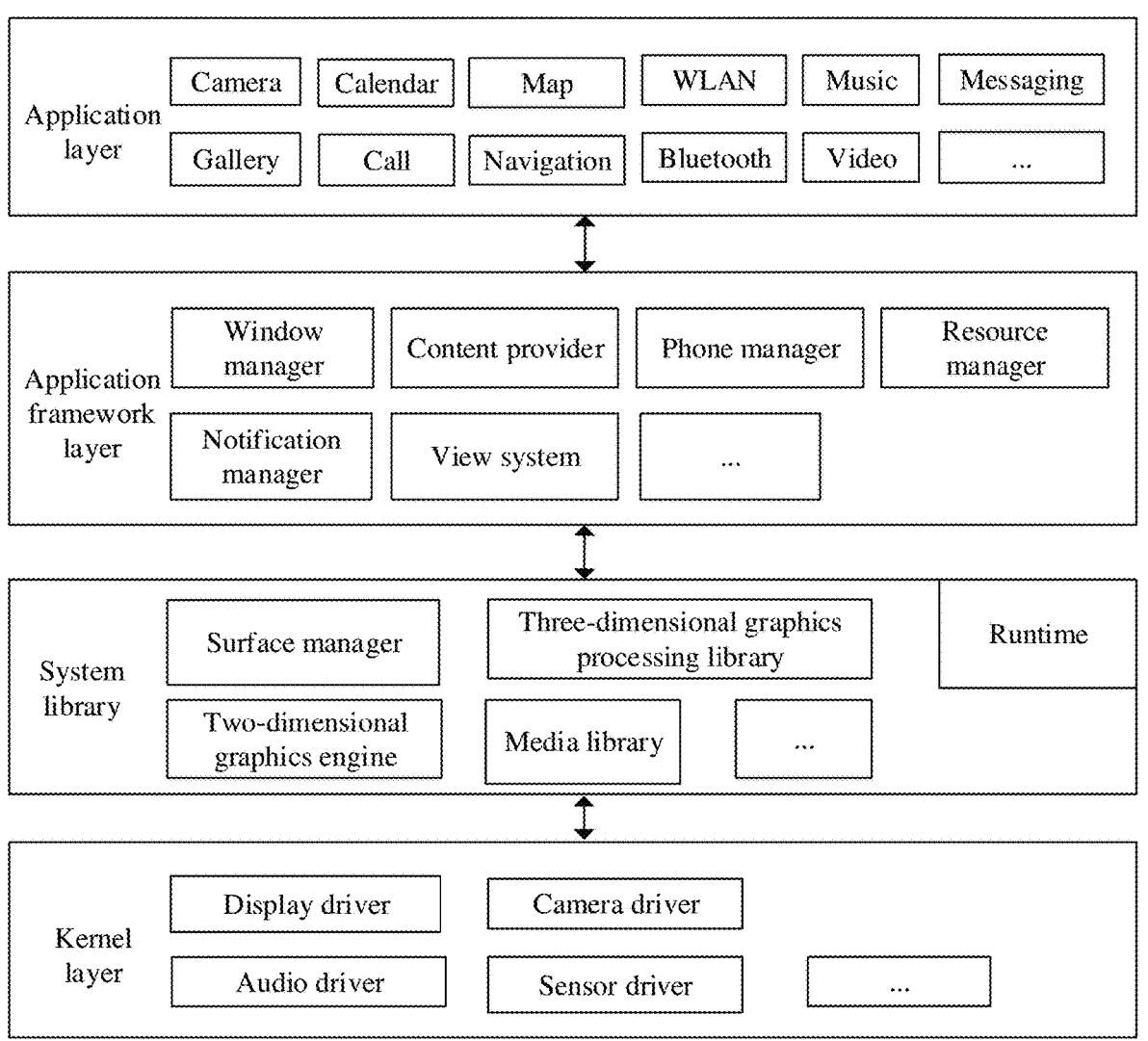

FIG. 1B is a schematic diagram of a software structure of the electronic device 100 according to an embodiment of the present disclosure. In the layered architecture, software is divided into several layers, and each layer has a clear role and task. The layers communicate with each other through software interfaces. In some embodiments, an operating system may be divided into four layers: an application layer, an application framework layer, operating system runtime (runtime) and a system library, and a kernel layer from top to bottom.

The application layer may include a series of application packages. As shown in FIG. 1B, the application packages may include applications such as Camera, Gallery, Calendar, Call, Map, Navigation, WLAN, Bluetooth, Music, Video, and Messaging.

The application framework layer provides an application programming interface (application programming interface, API) and a programming framework for an application at the application layer. The application framework layer includes some predefined functions.

As shown in FIG. 1B, the application framework layer may include a window manager, a content provider, a view system, a phone manager, a resource manager, a notification manager, and the like. The window manager is configured to manage a window program. The window manager may obtain a size of a display, determine whether there is a status bar, perform screen locking, take a screenshot, and the like. The content provider is configured to store and obtain data, and enable the data to be accessible by an application. The data may include a video, an image, audio, calls that are made and answered, a browsing history, a bookmark, an address book, and the like. The view system includes visual controls such as a control for displaying text and a control for displaying an image. The view system may be configured to construct an application. A display interface may include one or more views. For example, a display interface including a notification icon of Messages may include a text display view and an image display view. The phone manager is configured to provide a communication function for the electronic device 100, for example, management of a call status (including answering, declining, and the like). The resource manager provides various resources such as a localized character string, an icon, an image, a layout file, and a video file for an application. The notification manager enables an application to display notification information in a status bar, and may be configured to convey a notification message. The notification manager may automatically disappear after a short pause without requiring a user interaction. For example, the notification manager is configured to notify download completion, provide a message notification, and the like. The notification manager may alternatively be a notification that appears in a top status bar of a system in a form of a graph or scroll bar text, for example, a notification of an application running on the background or a notification that appears on a screen in a form of a dialog window. For example, text information is prompted in the status bar, an alert sound is played, the electronic device vibrates, or the indicator light blinks.

Still refer to FIG. 1B. The operating system runtime includes a kernel library and a virtual machine. The operating system runtime is responsible for scheduling and management of the operating system. The kernel library includes two parts: a function that needs to be invoked in Java language and a kernel library of the operating system. The application layer and the application framework layer run on the virtual machine. The virtual machine executes Java files of the application layer and the application framework layer as binary files. The virtual machine is configured to implement functions such as object lifecycle management, stack management, thread management, security and exception management, and garbage collection. The system library may include a plurality of functional modules, for example, a surface manager (surface manager), a media library (Media Libraries), a three-dimensional graphics processing library (for example, an OpenGL ES), and a 2D graphics engine (for example, an SGL).

The surface manager is configured to: manage a display subsystem, and provide fusion of 2D and 3D layers for a plurality of applications. The media library supports playback and recording in a plurality of commonly used audio and video formats, static image files, and the like. The media library may support a plurality of audio and video coding formats, such as MPEG-4, H.264, MP3, AAC, AMR, JPG, and PNG. The three-dimensional graphics processing library is configured to implement three-dimensional graphics drawing, image rendering, compositing, layer processing, and the like. The 2D graphics engine is a drawing engine for 2D drawing.

The kernel layer is a layer between hardware and software. The kernel layer includes at least a display driver, a camera driver, an audio driver, and a sensor driver.

Figure 2:
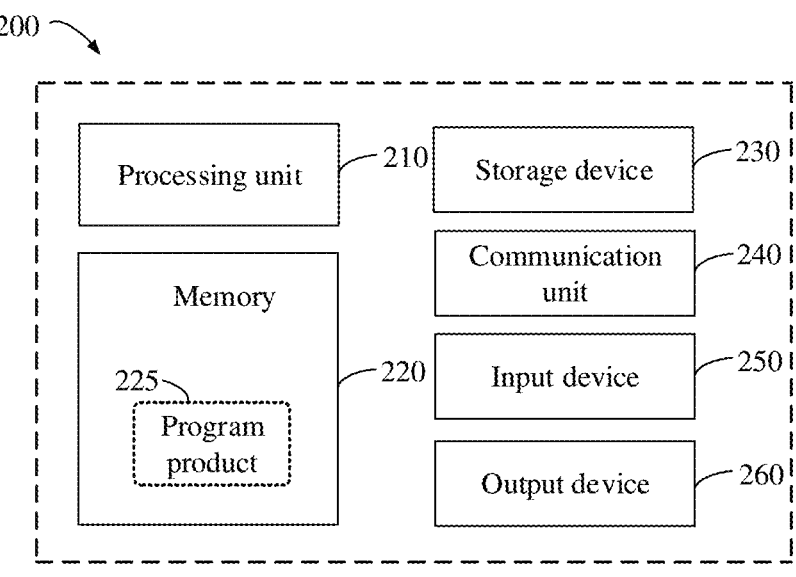
FIG. 2 is a block diagram of another electronic device that may implement an embodiment of the present disclosure.

FIG. 2 is a block diagram of another electronic device 200 that may implement an embodiment of the present disclosure. As shown in FIG. 2, the electronic device 200 may be in a form of a general-purpose computing device. Components of the electronic device 200 may include but are not limited to one or more processors or processing units 210, a memory 220, a storage device 230, one or more communication units 240, one or more input devices 250, and one or more output devices 260. The processing unit 210 may be a physical or virtual processor and is capable of performing various processing based on a program stored in the memory 220. In a multiprocessor system, a plurality of processing units execute computer-executable instructions in parallel, to improve a parallel processing capability of the electronic device 200.

The electronic device 200 generally includes a plurality of computer storage media. Such a medium may be any available medium accessible to the electronic device 200, including but not limited to volatile and non-volatile media and removable and non-removable media. The memory 220 may be a volatile memory (for example, a register, a cache, a random access memory (RAM)), a non-volatile memory (for example, a read-only memory (ROM), an electrically erasable programmable read-only memory (EEPROM), a flash memory), or a combination thereof. The storage device 230 may be a removable or non-removable medium, and may include a machine-readable medium, such as a flash drive, a disk, or any other medium. The storage device 230 may be configured to store information and/or data (for example, training data used for training) and may be accessed in the electronic device 200.

The electronic device 200 may further include another removable/non-removable storage medium or volatile/non-volatile storage medium. Although not shown in FIG. 2, a disk drive for performing reading and writing on a removable, non-volatile disk (for example, a "floppy disk") and an optical disc drive for performing reading and writing on a removable, non-volatile optical disc may be provided. In these cases, each drive may be connected to a bus (not shown) over one or more data medium interfaces. The memory 220 may include a computer program product 225, and the computer program product 225 has one or more program modules. These program modules are configured to perform an object editing method or process in embodiments of the present disclosure.

The communication unit 240 communicates with another computing device through a communication medium. Additionally, functions of the components of the electronic device 200 may be implemented by using a single computing cluster or a plurality of computing machines. These computing machines can communicate with each other through a communication connection. Therefore, the electronic device 200 may be operated in a networked environment by using a logical connection to one or more other servers, a network personal computer (PC), or another network node.

The input device 250 may be one or more input devices, such as a mouse, a keyboard, or a tracking ball. The output device 260 may be one or more output devices, for example, a display, a speaker, or a printer. In this embodiment of the present disclosure, the output device 260 may include a touchscreen having a touch sensor, and the touchscreen may receive a touch input of a user. The electronic device 200 may further communicate with one or more external devices (not shown) through the communication unit 240 based on a requirement. The external devices, such as a storage device and a display device, communicate with one or more devices that enable a user to interact with the electronic device 200, or communicate with any device (for example, a network adapter or a modem) that enables the electronic device 200 to communicate with one or more other computing devices. Such communication may be performed over an input/output (I/O) interface (not shown).

It should be understood that the electronic device 100 shown in FIG. 1 and the electronic device 200 shown in FIG. 2 are merely two example electronic devices that can implement one or more embodiments of the present disclosure, and should not constitute any limitation on functions and scope of embodiments described in this specification.

Dragging Linkage

Currently, to display more information and better display information, a screen of an electronic device is increasingly large, a layout of a UI on the screen is increasingly complex, and differences between UI elements in size and shape are increasingly large. In this case, there are various irregular UI elements arranged in various irregular layouts on the UI. For example, various irregular UI elements such as controls, cards, images, and covers exist in HiBoard, a control center, an application market, and a gallery of a smartphone.

Conventionally, there is no animation effect linkage between various irregular UI elements. In other words, triggering an animation effect of a target UI element does not jointly trigger an animation effect of one or more other UI elements. Animation effects of UI elements are independent and unrelated. Therefore, a conventional animation effect is monotonous and rigid, and cannot reflect a relationship between UI elements.

Embodiments of the present disclosure relate to animation effect linkage of UI elements on a UI during dragging, which is also referred to as dragging linkage. During dragging linkage, a dragged target UI element may affect another UI element that is not dragged. Specifically, during dragging linkage, triggering an animation effect of the target UI element may jointly trigger an animation effect of one or more other UI elements, or even other UI elements on the entire UI. For example, during dragging linkage, when the target UI element is dragged, in addition to that the target UI element moves with the animation effect following the dragging, another UI element may also move with a corresponding animation effect, to visually present linked dragging.

In this way, linkage between animation effects of different UI elements can be enhanced, and relationships between independent UI elements may be highlighted. Compared with a conventional animation in which animation effects are monotonous and UI elements are independent and unrelated, embodiments of the present disclosure can make an animation effect better comply with a physical rule, and consider a real use scenario and users' use habits, thereby significantly improving user experience.

The following describes some example embodiments of dragging linkage with reference to FIG. 3A to FIG. 19B.

Figure 3A:
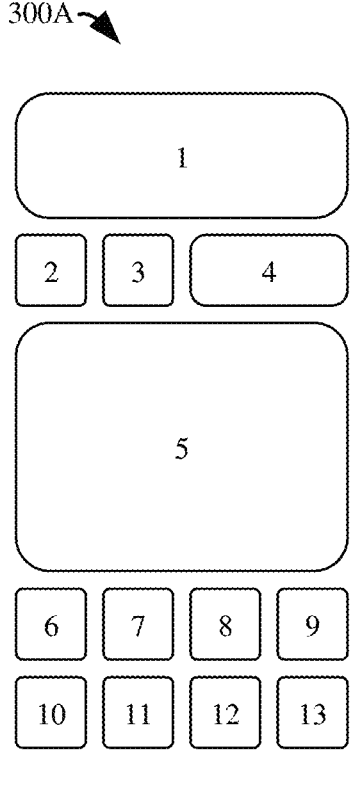
FIG. 3A to FIG. 3C are respectively schematic diagrams of example UIs according to some embodiments of the present disclosure.
Figures 3B, 3C:
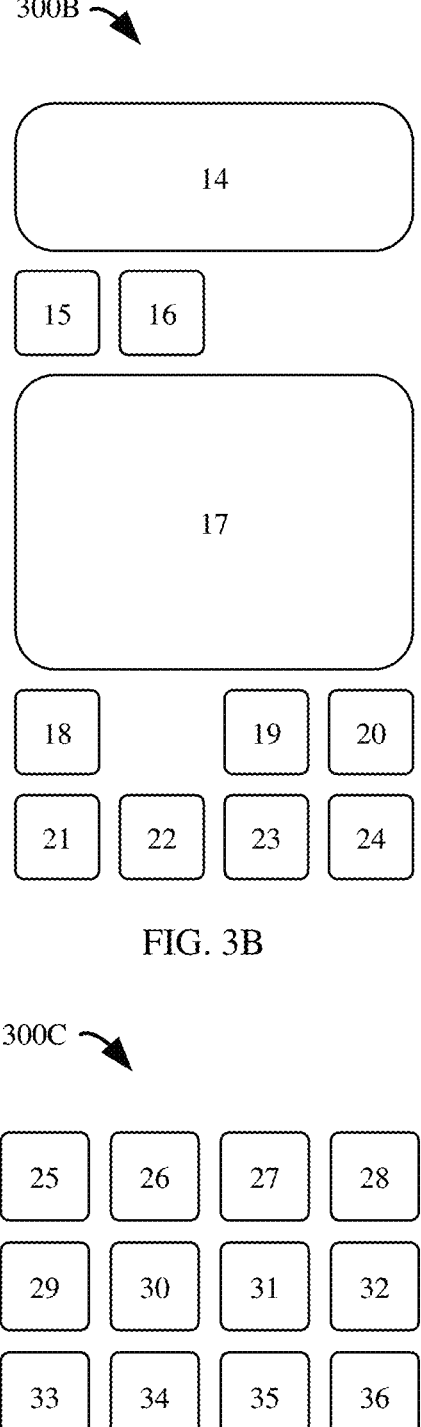

FIG. 3A to FIG. 3C are schematic diagrams of example UIs 300A to 300C according to some embodiments of the present disclosure. In some embodiments, UI elements may have irregular sizes and shapes. For example, as shown in FIG. 3A, the UI 300A may include a plurality of UI elements, such as UI elements 1 to 13, and the UI elements 1, 2, 4, and 5 have different sizes and shapes. Further, a UI may alternatively have an irregular part. For example, as shown in FIG. 3B, right sides of UI elements 16 and 18 on the UI 300B are empty, that is, there are no UI elements. However, embodiments of the present disclosure are also applicable to a UI that has a regular layout and that has UI elements of regular sizes and shapes. For example, as shown in FIG. 3C, the UI 300C has a regular layout, and UI elements 25 to 40 on the UI 300C all have a same size and a same shape. It should be understood that embodiments of the present disclosure are applicable to any UI that has suitable regular or irregular layout and that has UI elements of regular and irregular sizes and shapes.

A UI element on the UI may be dragged. For example, when a user expects to move the UI element, the user may drag the UI element. For example, when the user expects to change a position of the UI element on the UI, merge the UI element with another UI element, or place the UI element into a toolbar or a trash box, the user may drag the UI element. When dragging at the UI element is detected, the UI element may move with an animation effect, to visually present a dragging action. As described above, during dragging linkage, a dragged target UI element may affect another UI element that is not dragged. Specifically, when the target UI element is dragged, in addition to that the target UI element moves with the animation effect following the dragging, another UI element may also move with a corresponding animation effect, to visually present linked dragging.

Figures 4, 5A:
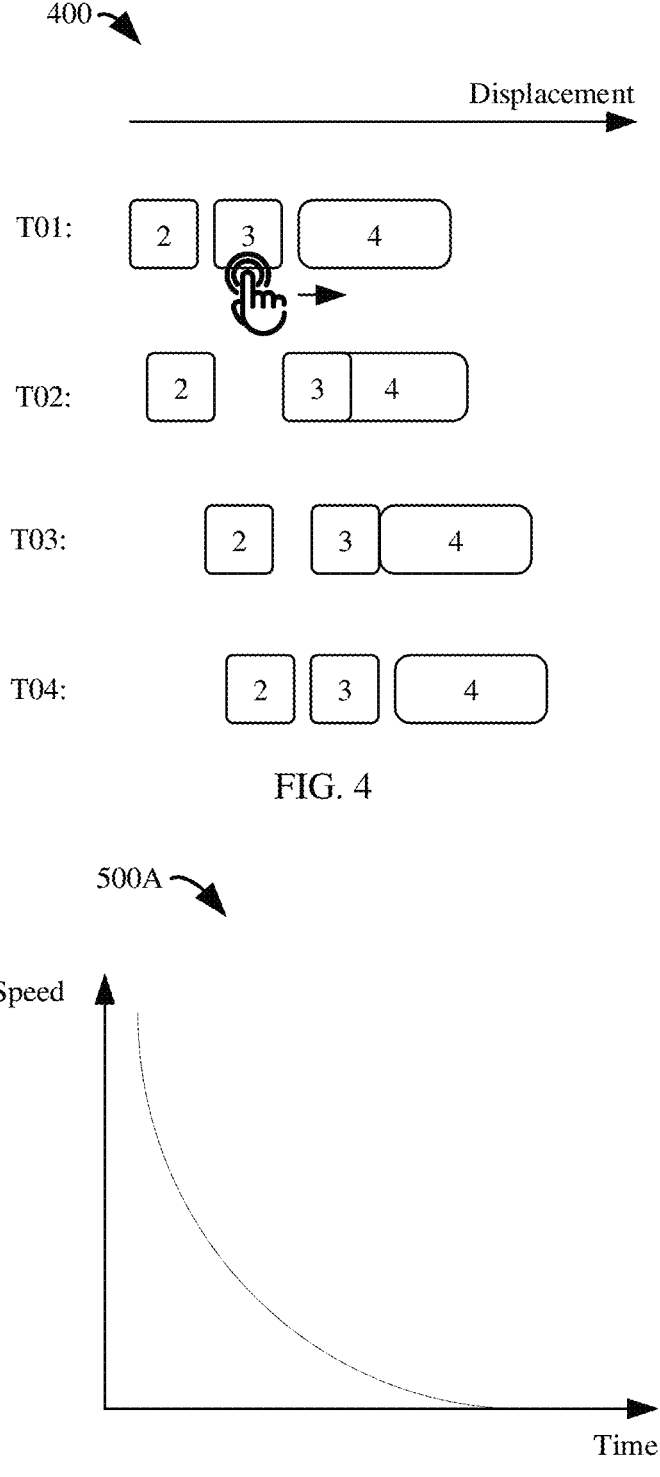
FIG. 4 is a schematic diagram of example dragging linkage according to some embodiments of the present disclosure.
FIG. 5A and FIG. 5B are respectively schematic diagrams of an example speed-time curve and an example displacement-time curve of a friction model according to some embodiments of the present disclosure.

FIG. 4 is a schematic diagram of example dragging linkage 400 according to some embodiments of the present disclosure. As shown in FIG. 4, when dragging at the UI element 3 is detected, the UI element 3 may move with an animation effect, to visually present a dragging action. In addition to the UI element 3 that moves with the animation effect following the dragging, the other UI elements 2 and 4 may also move with corresponding animation effects, to visually present linked dragging. For clarity, FIG. 4 shows only linked movement of the UI elements 2 and 3. It should be understood that linked movement may occur between any at least two UI elements on any UI, for example, between any at least two UI elements on the UIs 300A to 300C.

Specifically, at a time T01, dragging at the UI element 3 is detected, so that the UI element 3 and the other UI elements 2 and 4 move. At a time T02, a spacing between the UI element 3 and the UI element 4 in a dragging direction is shortened. The spacing may represent a distance between corresponding reference points of two UI elements. In some embodiments, it may be determined that a central point of a UI element is a reference point of the UI element. Optionally, the spacing may represent a distance between adjacent boundaries of two UI elements. As shown in FIG. 4, in some embodiments, the UI element 3 may even cover at least a part of the UI element 4. However, a spacing between the UI element 3 and the UI element 2 in a direction opposite to the dragging direction is prolonged. This means that a movement speed of the UI element 3 is faster than those of the UI elements 2 and 4. At a time T03, the spacing between the UI element 3 and the UI element 4 in the dragging direction is prolonged, and the spacing between the UI element 3 and the UI element 2 in the direction opposite to the dragging direction is shortened. This means that the movement speed of the UI element 3 is slower than those of the UI elements 2 and 4. At a time T04, the UI element 3 and the other elements 2 and 4 move to predetermined distances and stop moving. In some embodiments, the predetermined distance may be determined based on a friction model. The following describes a manner of determining a distance based on the friction model in detail. Therefore, descriptions thereof are omitted herein.

The foregoing describes an example of linked movement of UI elements, and the following describes a principle of movement of a UI element.

Movement of the UI element may be controlled by the following factors: a friction factor, a linkage factor, a follow-hand factor, a follow-hand ratio factor, a release-hand rebound factor, and/or an inertia rebound factor. For example, the friction factor may control the UI element to stop moving. The linkage factor may control an animation effect of another UI element. The follow-hand factor may control follow-hand movement of the UI element, for example, follow-hand movement of the UI element when dragged without crossing a boundary. The follow-hand ratio factor may control a ratio of follow-hand movement of the UI element, for example, a ratio of a displacement of the UI element to a displacement of the hand when the UI element is dragged crossing the boundary. The release-hand rebound factor may control reset of the UI element after the hand is released, for example, reset of the UI element after the UI element is dragged crossing the boundary and the hand is released. The inertia rebound factor may control a rebound of the UI element after the UI element crosses the boundary. For example, when the UI element moves across the boundary, the friction factor may be unable to stop the UI element from moving. In this case, the inertia rebound factor may control the rebound of the UI element after the UI element crosses the boundary.

The following describes a friction model associated with the friction factor and an elastic force model associated with the linkage factor in detail. In general, a to-be-moved distance of the UI element may be determined by using the friction model, so that a source position and a destination position of movement of the UI element are determined. In addition, a spring parameter of another UI element that moves accordingly may be determined based on a spring parameter (for example, an elasticity coefficient or a damping coefficient) of a dragged UI element by using a transmission manner described in detail below. In this way, in a movement process of the dragged UI element and the UI element that moves accordingly, each UI element is controlled to move in compliance with the elastic force model based on the spring parameter of each UI element.

The friction model may be used to determine the to-be-moved distance of the UI element, for example, a to-be-moved distance of the UI element after the hand is released or flicked. The distance may be determined by using the following equations (1) and (2):

$$V(t) = V_0 \times e^{-4.2 \times f_{friction} \times t} \qquad (1)$$

$$S(t) = \left( \frac{V_0}{-4.2 \times f_{friction}} \right) \times \left( e^{-4.2 \times f_{friciton} \times t} - 1 \right) \qquad (2)$$

$f_{friction}$ represents friction, and is configurable by the electronic device or the user. t represents movement duration. $V_0$ represents an initial speed, and is configurable by the electronic device or the user, or is obtained by detecting a dragging speed of the user. V(t) represents a final speed, and V(t) is 0 because movement of the UI element finally stops. e represents a natural constant. S(t) represents the to-be-moved distance of the UI element. It should be understood that the constant in the foregoing equations is merely an example, and may be set by the electronic device or the user.

It can be learned from the foregoing equations that the movement duration t may be determined by using the equation (1). Therefore, the distance S(t) may be further determined by using the equation (2). In this way, the to-be-moved distance of the UI element may be easily determined. In addition, because various parameters (for example, the friction and the initial speed) in the equations are configurable, the to-be-moved distance of the UI element may be affected by configuring these parameters, thereby improving flexibility of an animation effect and user experience.

Figure 5B:
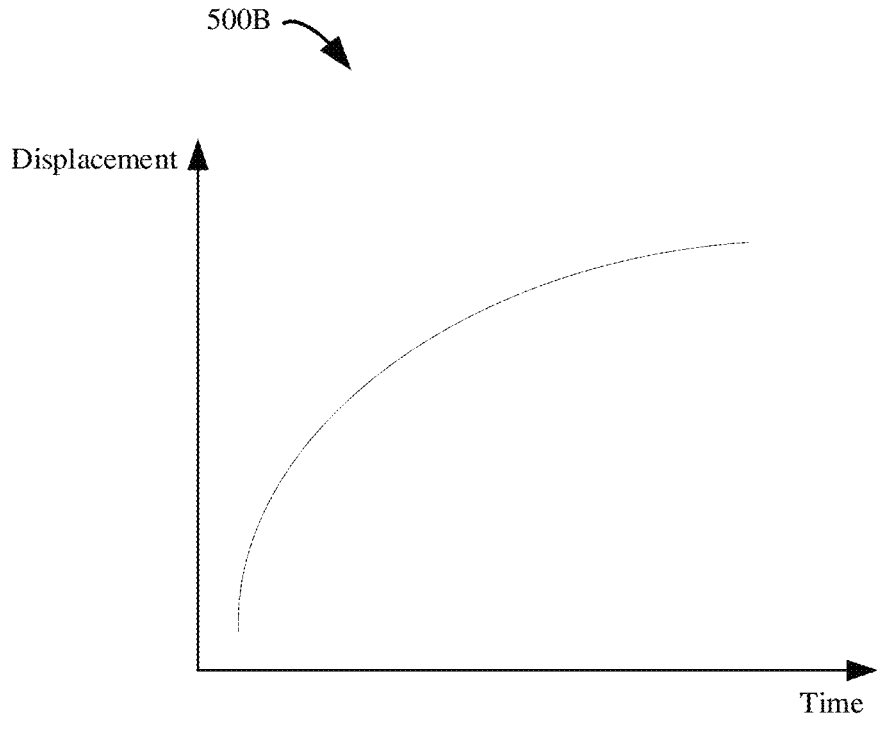

Movement of a UI element that conforms to the friction model satisfies a speed-time curve and a displacement-time curve of the friction model. FIG. 5A and FIG. 5B are respectively schematic diagrams of an example speed-time curve 500A and an example displacement-time curve 500B of a friction model according to some embodiments of the present disclosure. As shown in FIG. 5A and FIG. 5B, in a case of only friction, a movement speed of the UI element decreases to 0 over time, and a movement distance of the UI element increases over time until the UI element stops moving.

The foregoing describes how the friction factor controls the UI element to stop moving. In addition, whether a position to which the UI element can be moved is limited may also control where the UI element stops moving.

Specifically, in some embodiments, the position to which the UI element can be moved is not limited. In this case, a distance determined based on the friction model is the to-be-moved distance of the UI element. However, in some embodiments, the position to which the UI element can be moved is limited. In other words, the UI element can be moved only to a predetermined position. In this case, although the to-be-moved distance of the UI element may be determined based on the friction model, if the UI element is not located at the predetermined position after the UI element is moved the to-be-moved distance, the to-be-moved distance of the UI element needs to be adjusted, so that the UI element can be moved to the predetermined position. For example, the UI element may be moved to a predetermined position closest to a stopping position determined based on the friction model. Therefore, the to-be-moved distance of the UI element may be determined based on both the friction model and the predetermined position.

Figure 6:
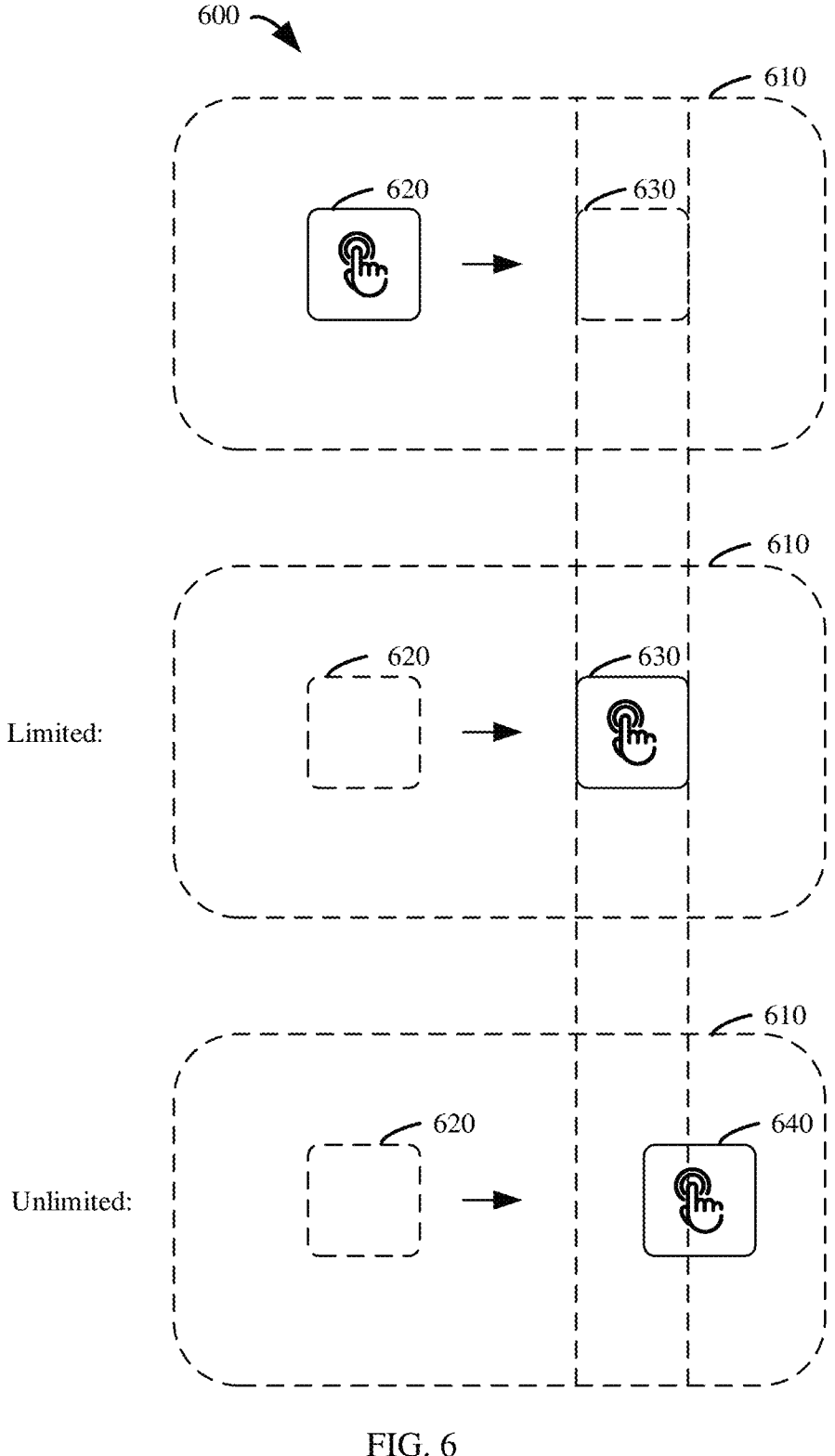
FIG. 6 is a schematic diagram of an example in which movement positions are limited and unlimited according to some embodiments of the present disclosure.

FIG. 6 is a schematic diagram of an example 600 in which movement positions are limited and unlimited according to some embodiments of the present disclosure. As shown in FIG. 6, when the position to which the UI element can be moved is limited, the UI element can be moved only from a source position 620 to a predetermined position 630 on a screen 610. In comparison, when the position to which the UI element can be moved is not limited, the UI element can be moved from the source position 620 to any position 640 on the screen 610.

Further, in some embodiments, a scope in which the UI element can move may further be limited. Movement of the UI element beyond the scope is considered as crossing the boundary. The scope may be any appropriate scope. For example, the scope may be a scope in which a distance to a screen boundary is less than a predetermined ratio of a screen size or predetermined pixels (for example, 10% or 1000 pixels), or a scope in which a distance from a source position of the UI element to a destination position is less than a predetermined ratio of a screen size or predetermined pixels (for example, 50% or 10000 pixels). Therefore, the to-be-moved distance of the UI element may also be determined based on the scope.

The foregoing describes the friction model in detail, and the following further describes the elastic force model.

A curve in which a displacement of movement of the UI element changes over time may be an elastic force curve that conforms to the elastic force model. Because a speed may be determined based on the displacement and time, the movement speed of the UI element also conforms to the elastic force model. Therefore, it may be considered that movement of the UI element may simulate a motion rule of a spring. It should be understood that, to describe the elastic force model herein, the curve in which the displacement of movement of the UI element changes over time is described as an elastic force curve. However, the curve in which the displacement of movement of the UI element changes over time may also be any appropriate predefined curve, such as a Bessel curve.

The elastic force model may be based on damping vibration equations (3) and (4) under Hooke's law:

$$f = ma \tag{3}$$

$$-kx - g\frac{dx}{dt} = m\frac{d^2x}{dt^2} \tag{4}$$

f represents a force exerted on the spring in a vibration process (that is, in movement), and may be configurable by the electronic device or the user. a represents an acceleration of movement. t represents movement duration. k represents an elasticity coefficient of the spring. x represents a deformation amount of the spring. g represents a damping coefficient of the spring. m represents mass of the UI element. Herein, a size of the UI element may be equivalent to the mass of the UI element.

The elasticity coefficient is a magnitude of a force required by a unit deformation amount of the spring. A larger elasticity coefficient k indicates shorter time for the spring to return to an equilibrium position from a maximum amplitude, and vice versa. The elasticity coefficient k is configurable by the electronic device or the user. In some embodiments, a value range of the elasticity coefficient k may be 1 to 999, and a recommended value range of the elasticity coefficient k may be 150 to 400.

The damping coefficient is a quantitative representation of a shock absorption force (for example, fluid resistance or friction) of the spring in the vibration process. The shock absorption force may gradually decrease an amplitude of the spring until the spring stops in the equilibrium position. A larger damping coefficient indicates that the spring stops in the equilibrium position more easily, and vice versa. The damping coefficient g is configurable by the electronic device or the user. In some embodiments, a value range of the damping coefficient g may be 1 to 99.

Furthermore, it should be understood that, as described above, the to-be-moved distance S(t) of the UI element may be determined based on the friction model. When the UI element moves the distance S(t), S(t) may be considered as the deformation amount of the spring. Therefore, S(t) is equal to x.

The elastic force model has three damping states: a critically damped state, an underdamped state, and an overdamped state. Critical damping satisfies the following equation (5):

$$g^2 = 4 \times m \times k \tag{5}$$

g represents the damping coefficient of the spring, m represents the size of the UI element, and k represents the elasticity coefficient of the spring.

With the critical damping as a reference, if a damping value is greater than a critical damping value, the state is overdamped, or if a damping value is less than a critical damping value, the state is underdamped.

Figure 7A:
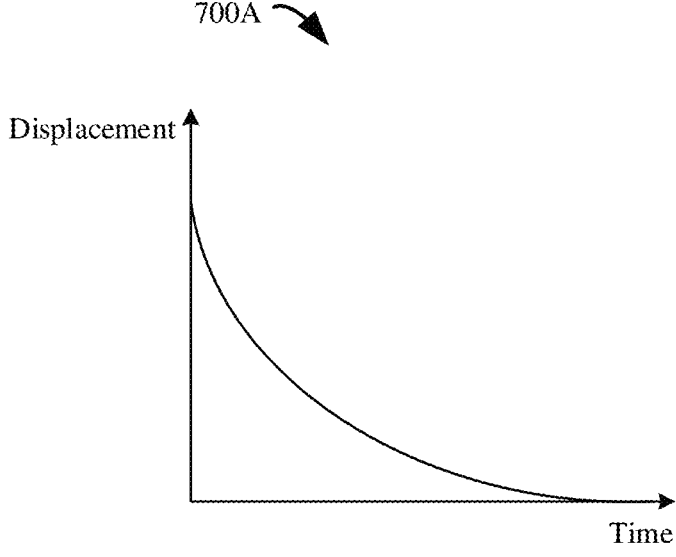
FIG. 7A to FIG. 7C are respectively schematic diagrams of example curves in which a deformation amount x of a spring in a critically damped state, an underdamped state, and an overdamped state changes over time t according to some embodiments of the present disclosure.
Figure 7B:
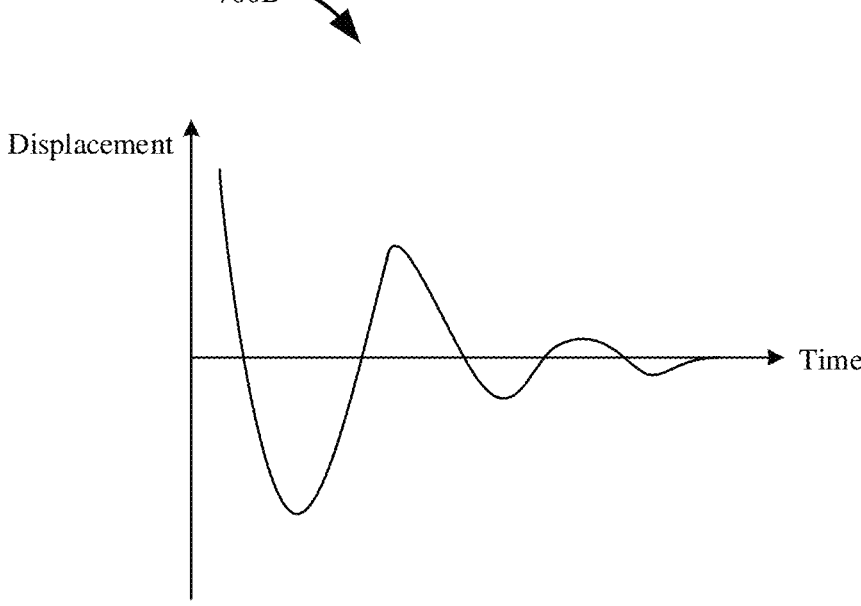
Figure 7C:
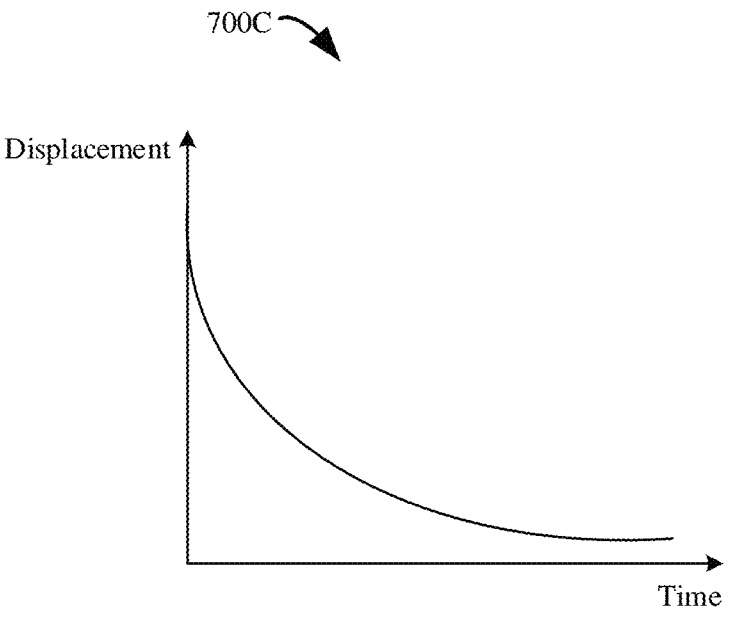

In different damping states, displacement-time curves of the UI element are different. FIG. 7A to FIG. 7C are respectively schematic diagrams of example curves 700A to 700C in which a deformation amount x of a spring in a critically damped state, an underdamped state, and an overdamped state changes over time t according to some embodiments of the present disclosure. As shown in FIG. 7A, in the critically damped state, the spring stops moving and does not oscillate after returning to the equilibrium position at a most stable speed and in a shortest time. As shown in FIG. 7B, in the underdamped state, an amplitude of the spring decreases slowly and gradually through a plurality of oscillations, and the spring finally returns to the equilibrium position. As shown in FIG. 7C, in the overdamped state, the spring almost does not vibrate, the amplitude decreases gradually, and the spring reaches the equilibrium position.

As described above, the curve in which the displacement of movement of the UI element changes over time may be an elastic force curve that conforms to the elastic force model. Therefore, it may be considered that movement of the UI element may simulate the motion rule of the spring. In other words, a change rule of the displacement of the UI element may simulate a change rule of the deformation amount of the spring. The change rule of the displacement of the UI element may be adjusted by adjusting the damping coefficient and/or the elasticity coefficient, so that the UI element simulates the motion rule of the spring in the critically damped state, the overdamped state, or the underdamped state.

Further, as described above, the spring parameter of another UI element that move accordingly may be determined based on the spring parameter (for example, the elasticity coefficient or the damping coefficient) of the dragged UI element by using the transmission manner described in detail below. In this way, in the movement process of the dragged UI element and the UI element that moves accordingly, each UI element is controlled to move in compliance with the elastic force model based on the spring parameter of each UI element. In this way, the dragged UI element and the UI element that moves accordingly may simulate motion rules of springs having different spring parameters, to present an animation effect that a spacing between UI elements in a dragging direction is first shortened and then restored (similar to that the spring is first compressed and then restored), and a spacing between UI elements in a direction opposite to the dragging direction is first prolonged and then restored (similar to that the spring is first stretched and then restored). This increases a dynamic feedback to a dragging action of the user.

An animation effect of the UI element that moves accordingly is determined based on the animation effect of movement of the dragged UI element and a distance between the dragged UI element and the UI element that moves accordingly. Because the animation effect of movement of the UI element that moves accordingly changes with the distance, it may also be considered that the animation effect of movement of the UI element is transmitted with the distance. In some embodiments, transmission may be non-linear transmission. Optionally, transmission may alternatively be linear transmission.

For example, in a case of non-linear transmission, the animation effect of movement of the UI element that moves accordingly may be determined by using the following equation (6):

$$x'' = x \times (n+1)^{-0.18 \times g} \qquad (6)$$

$x''$ represents the animation effect of movement of the UI element that moves accordingly. x represents the animation effect of movement of the dragged UI element. n represents the distance between the dragged UI element and the UI element that moves accordingly. g represents a transmission coefficient. When the transmission coefficient is 0, the animation effect of movement of the UI element that moves accordingly is the same as the animation effect of movement of the dragged UI element. The constant in the equation (6) is merely an example, and is configurable by the electronic device or the user.

When the curve in which the displacement of movement of the UI element changes over time is an elastic force curve, the animation effect of movement may be controlled by the damping coefficient and/or the elasticity coefficient. Therefore, x may be determined based on at least one of the damping coefficient and the elasticity coefficient.

For example, x may be a ratio of the elasticity coefficient to the damping coefficient of the dragged UI element. In this case, the ratio of the elasticity coefficient to the damping coefficient of the dragged UI element is transmitted to the UI element that moves accordingly based on the distance n, so that a ratio $x''$ of the elasticity coefficient to the damping coefficient of the UI element that moves accordingly is obtained. Therefore, the animation effect of movement of the dragged UI element may be transmitted to the UI element that moves accordingly based on the distance. A larger ratio of the elasticity coefficient to the damping coefficient indicates a weaker association between movement of UI elements, and larger differences between spring characteristics and movement of the UI elements. In this way, the spring may be considered as "soft". On the contrary, a smaller ratio of the elasticity coefficient to the damping coefficient indicates a stronger association between movement of the UI elements, and smaller differences between spring characteristics and movement of the UI elements. In this way, the spring may be considered as "hard".

It should be understood that x that represents the ratio of the elasticity coefficient to the damping coefficient of the dragged UI element is merely an example. x may be any appropriate factor. In another example, x may be the elasticity coefficient of the dragged UI element. In still another example, x may alternatively be the damping coefficient of the dragged UI element.

Furthermore, although the elastic force curve is described in detail above, the animation effect of movement of the UI element may follow any appropriate predetermined curve, such as a Bessel curve. Depending on a quantity of orders of the Bessel curve, the Bessel curve may have control points corresponding to the orders. For example, in a case of a two-order Bessel curve, the Bessel curve may have two control points. Similarly, in a case of a one-order Bessel curve, the Bessel curve may have one control point, and in a case of a three-order Bessel curve, the Bessel curve may have three control points, and so on. When the curve in which the displacement of movement of the UI element changes over time is a Bessel curve, the animation effect of movement may be controlled by using coordinates of at least one of at least one control point of the Bessel curve. For example, in the case of the two-order Bessel curve, one or both of the two control points of the two-order Bessel curve may be used to control the animation effect of movement. Therefore, x may be determined based on the coordinates of at least one of at least one control point.

The foregoing describes non-linear transmission in detail. In a case of linear transmission, the animation effect of movement of the UI element that moves accordingly may be determined by using the following equation (7):

$$x = x - g \times n \qquad (7)$$

$x''$ represents the animation effect of movement of the UI element that moves accordingly. x represents the animation effect of movement of the dragged UI element. n represents the distance between the dragged UI element and the UI element that moves accordingly. g represents the transmission coefficient. When the transmission coefficient is 0, the animation effect of movement of the UI element that moves accordingly is the same as the animation effect of movement of the dragged UI element.

Similar to non-linear transmission, when the curve in which the displacement of movement of the UI element changes over time is an elastic force curve, the animation effect of movement may be controlled by the damping coefficient and/or the elasticity coefficient. Therefore, x may be determined based on at least one of the damping coefficient and the elasticity coefficient. When the curve in which the displacement of movement of the UI element changes over time is a Bessel curve, the animation effect of movement may be controlled by using the coordinates of at least one of at least one control point of the Bessel curve. Therefore, x may be determined based on the coordinates of at least one of at least one control point.

The foregoing describes the principle of dragging linkage in detail. The following further describes a process of controlling linked movement of UI elements by using the principle of dragging linkage.

Figure 8:
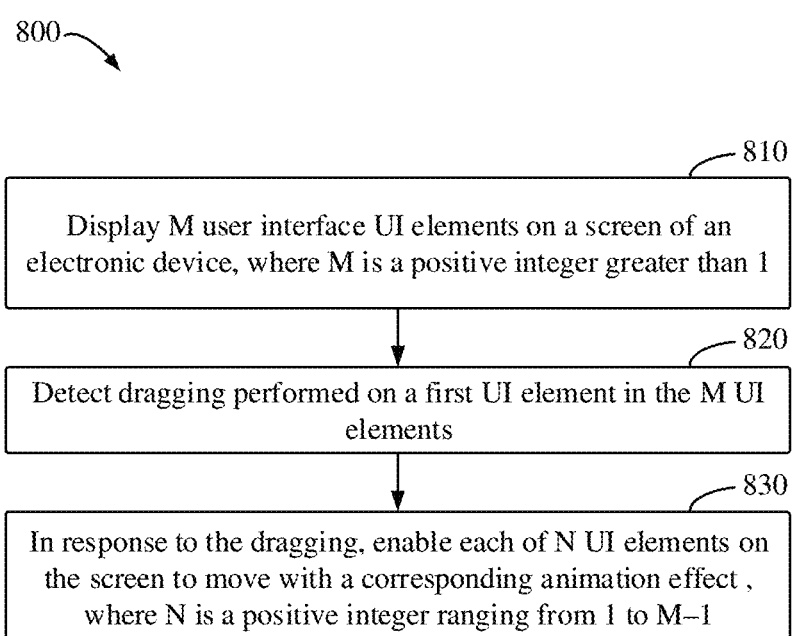
FIG. 8 is a flowchart of a graphical interface display method according to an embodiment of the present disclosure.

FIG. 8 is a flowchart of a graphical interface display method 800 according to an embodiment of the present disclosure. It should be understood that the method 800 may be performed by the electronic device 100 described with reference to FIG. 1 or the electronic device 200 described with reference to FIG. 2. The method 800 is described herein with reference to the UI 300A in FIG. 3A. However, it should be understood that the UI 300A is merely an example, and the method 800 is applicable to any suitable interface, including but not limited to the UIs 300B and 300C.

Figure 9:
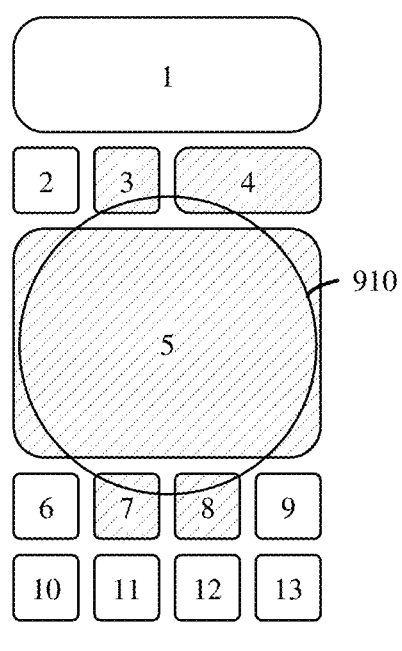
FIG. 9 is a schematic diagram of an example impact area of a UI element according to an embodiment of the present disclosure.

In a block 810, M user interface UI elements are displayed on a screen of an electronic device. M is a positive integer greater than 1. Refer to FIG. 9. For example, the M UI elements may be the UI elements 1 to 13.

In a block 820, dragging performed on a first UI element in the M UI elements is detected. For example, the first UI element may be the UI element 5. Dragging performed on the first UI element enables the first UI element to move with an animation effect, to present a dragging effect.

In a block 830, in response to the dragging performed on the first UI element, each of N UI elements on the screen is enabled to move with a corresponding animation effect. N is a positive integer ranging from 1 to M−1. Therefore, linked dragging is visually indicated.

In some embodiments, dragging linkage may be used in all UI elements on the screen. In this case, it may be determined that M−1 UI elements in the M UI elements other than the first UI element is the N UI elements. Optionally, dragging linkage may be applied only to a part of UI elements on the screen. In this case, an impact area of the first UI element may be determined based on a size of the first UI element, and UI elements that are in the M UI elements and that are in the impact area are determined as the N UI elements. For example, a larger size of the first UI element may indicate a larger impact area of the first UI element. Optionally, the impact area may also be narrowed with size reduction. This is not limited herein in the present disclosure. For example, the impact area may be a circle that uses a reference point of the first UI element as a center and that has a predetermined radius. It should be understood that the impact area may be any suitable area having any shape. For example, the impact area is a rectangle, a diamond, or the like having a predetermined size. The impact area may be configurable by the electronic device and the user. This is not limited herein in the present disclosure.

In addition, in some embodiments, a UI element that intersects with the impact area may be considered as in the impact area. Optionally, when the impact area is a circle having a predetermined radius, if a distance between a UI element and the first UI element is shorter than the predetermined radius of the impact area, the UI element may be considered as in the impact area.

FIG. 9 is a schematic diagram of an example impact area of a UI element according to an embodiment of the present disclosure. As shown in FIG. 9, because the UI elements 3, 4, 7, and 8 are in an impact area 910 of the UI element 5, the UI elements 3, 4, 7, and 8 move accordingly with the UI element 5. In addition, because the UI elements 1, 2, 6, and 9 to 13 are not in the impact area 910 of the UI element 5, the UI elements 1, 2, 6, and 9 to 13 do not move accordingly with the UI element 5.

Refer to FIG. 8 again. To enable the N UI elements to move with corresponding animation effects, a distance between the first UI element and each of the N UI elements may be determined. The following describes how to determine a distance between the first UI element and a second UI element in the N UI elements.

In some embodiments, distances may be classified into a plurality of distance levels based on a range in which a distance is located. For example, a distance level of an operated UI element may be 0, and a distance level of a linked UI element may be 1, 2, 3, . . . , based on a distance between the linked UI element and the operated UI element. UI elements at a same distance level may be considered as having a same distance to the operated UI element. Therefore, linkage between UI elements may be simplified by using the distance level, so that UI elements at a same distance level are linked in a same manner, thereby improving linkage consistency and coordination. However, it should be understood that during linkage, the distance may alternatively be used, so that UI elements are linked more precisely. In the following, the distance level may be interchangeably referred to as the distance.

Figure 10:
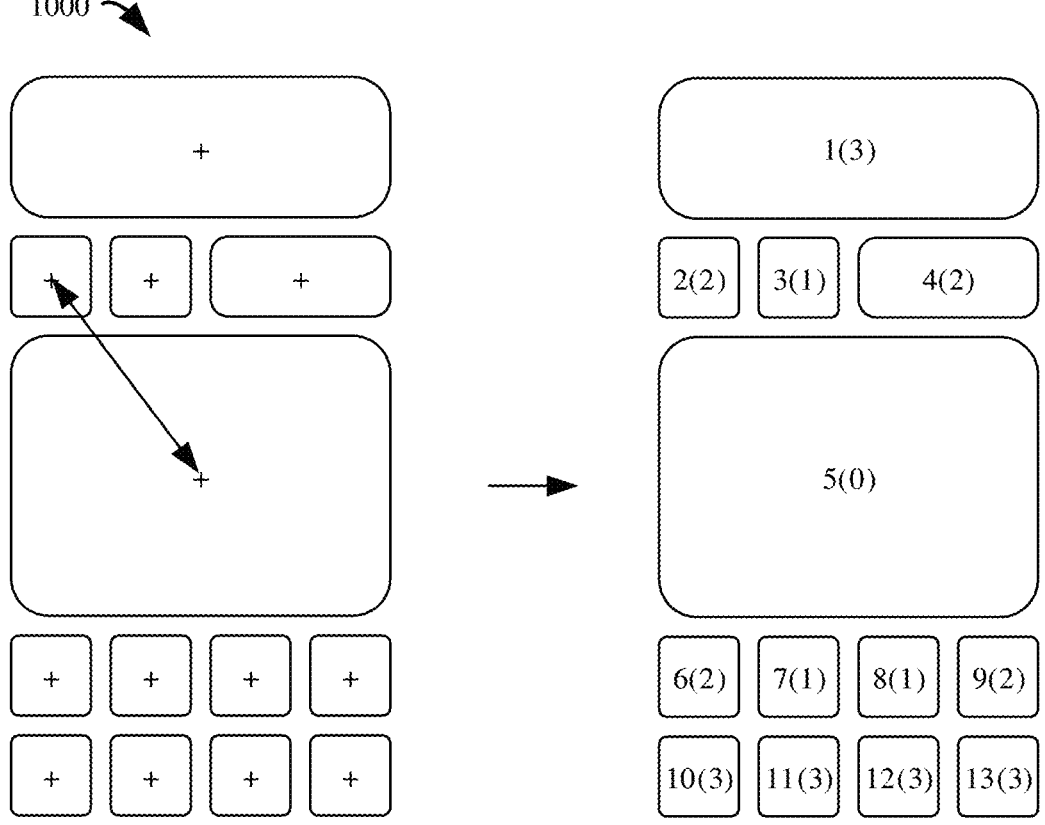
FIG. 10 is a schematic diagram of an example of determining a distance according to an embodiment of the present disclosure.

FIG. 10 is a schematic diagram of an example 1000 of determining a distance according to an embodiment of the present disclosure. As shown in FIG. 10, in some embodiments, a first reference point of the first UI element (for example, the UI element 5) and a second reference point of the second UI element (for example, the UI element 2) may be determined. In FIG. 10, a reference point of each UI element is shown by "+". In some embodiments, it may be determined that a central point of a UI element is a reference point of the UI element. Optionally, the reference point of the UI element may be configurable by the electronic device or the user, so that a position of a reference point may be any suitable position. This is not limited herein in the present disclosure. Therefore, it may be determined that a distance between the first reference point and the second reference point is a distance between the first UI element and the second UI element.

For example, it is assumed that position coordinates of the first reference point on the screen are (x0, y0), and position coordinates of the second reference point on the screen are (x1, y1). In this case, the distance may be determined by using the following equation (8):

$$n=\sqrt{(x1-x0)^2+(y1-y0)^2} \tag{8}$$

n represents the distance, x0 represents a horizontal coordinate of the first reference point, y0 represents a vertical coordinate of the first reference point, x1 represents a horizontal coordinate of the second reference point, and y1 represents a vertical coordinate of the second reference point.

As shown in FIG. 10, a distance between the UI element 5 and another UI element determined by using the foregoing manner is as follows: The distance between the UI element 5 and the UI element 5 is 0. The distance between the UI element 5 and each of the UI elements 3, 7, and 8 is 1. The distance between the UI element 5 and each of the UI elements 2, 4, 6, and 9 is 2. A distance between the UI element 5 and each of the UI elements 1 and 10 to 13 is 3.

Figure 11A:
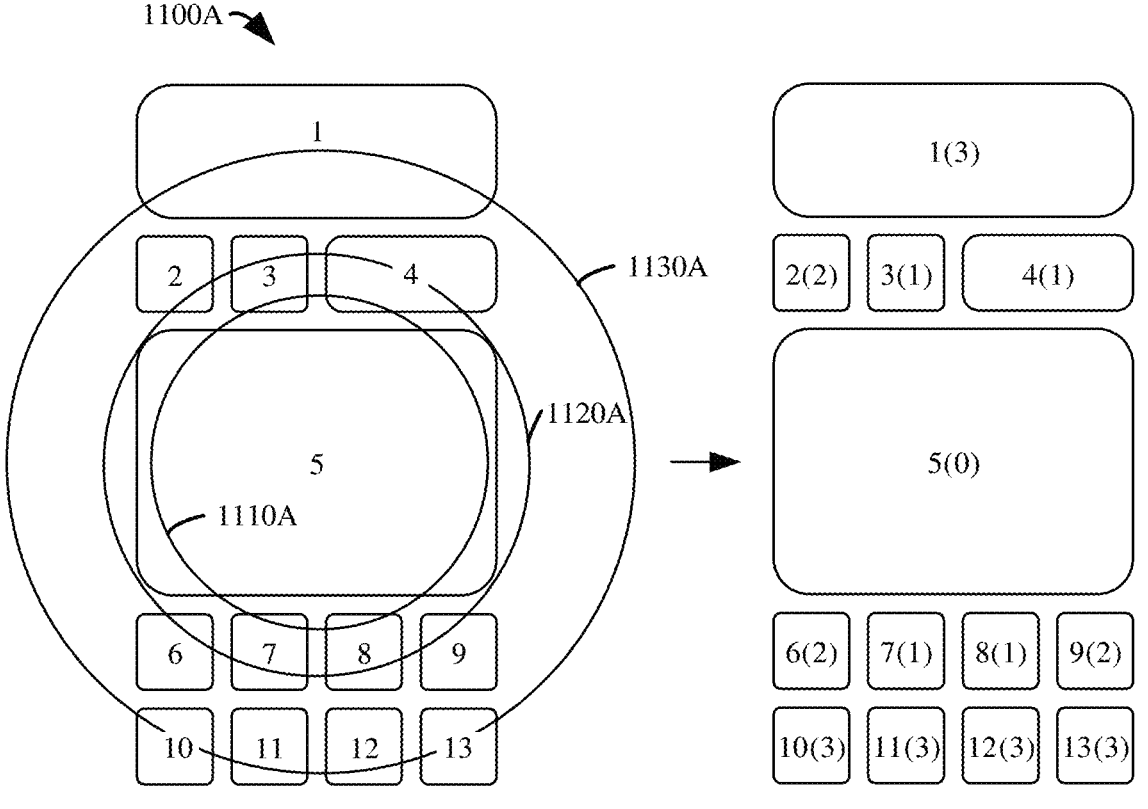
FIG. 11A to FIG. 11C are schematic diagrams of examples of determining a distance according to an embodiment of the present disclosure.
Figure 11B:
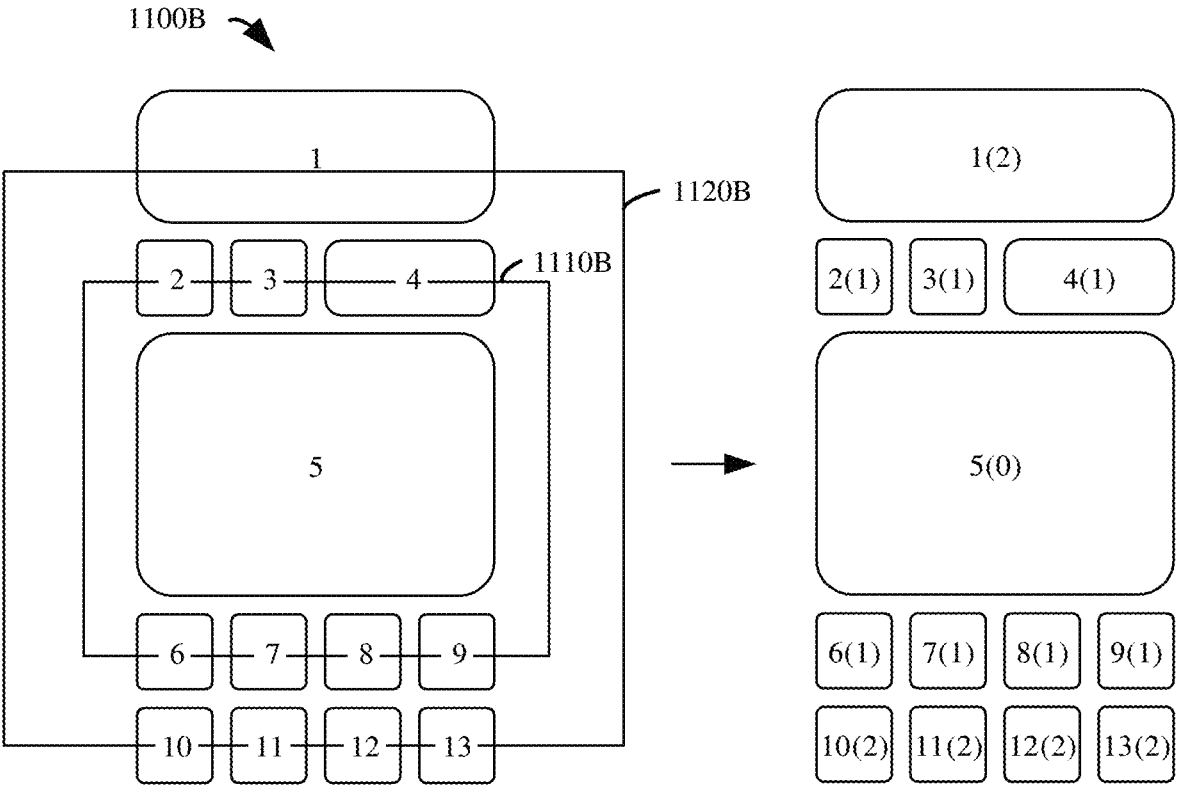
Figure 11C:
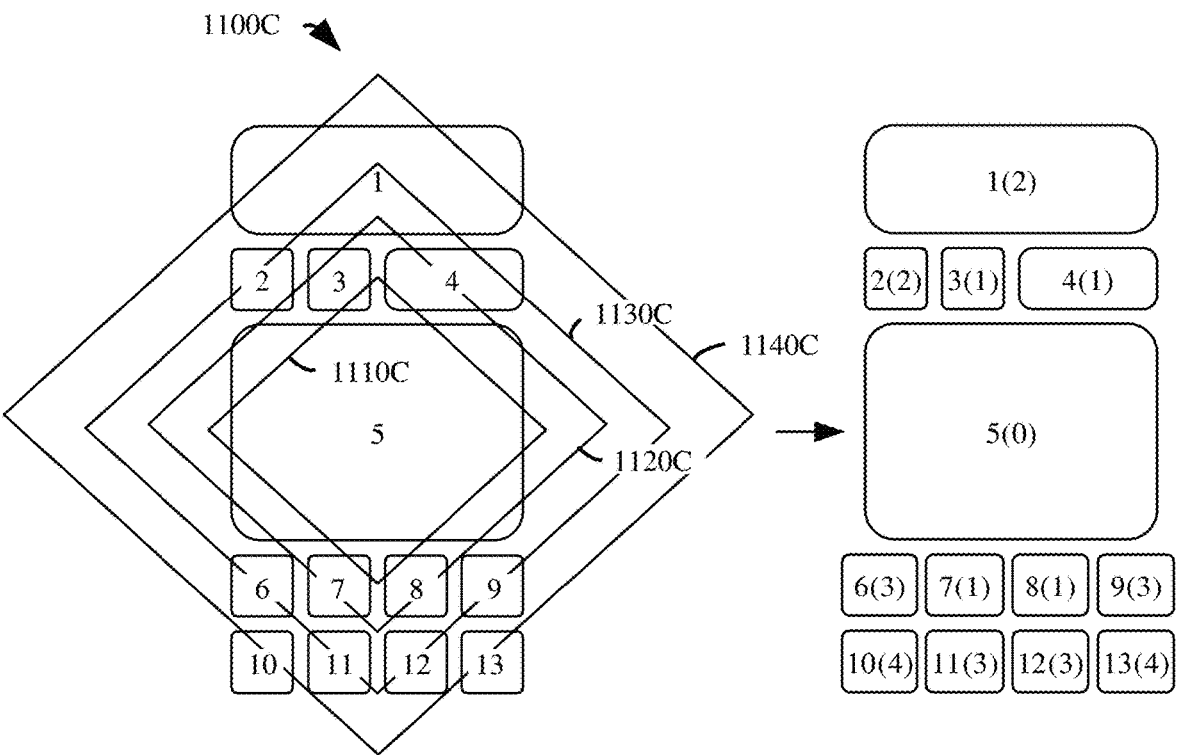

FIG. 11A to FIG. 11C are schematic diagrams of examples 100A to 100C of determining a distance according to an embodiment of the present disclosure. As shown in FIG. 11A, in some embodiments, the first reference point of the first UI element may be determined. A plurality of circles that each use the first reference point as a circle center and that have respective radii, for example, circles 1110A to 1130A may be determined. It should be understood that, in addition to the circle, any other appropriate shapes that use the first reference point as a center and have respective sizes such as a rectangle or a diamond may be determined. This is not limited herein in the present disclosure.

For example, as shown in FIG. 11B, in some embodiments, the first reference point of the first UI element may be determined. A plurality of rectangles that use the first reference point as a center and have respective sizes such as rectangles 1110B and 1120B may be determined. In addition, as shown in FIG. 11C, in some embodiments, the first reference point of the first UI element may be determined. A plurality of rhombuses that use the first reference point as a center and have respective sizes such as rectangles 1110C to 1140C may be determined.

In some embodiments, the radii of the plurality of circles may be increased based on a predetermined size or proportion. Optionally, the radii of the plurality of circles may be configurable by the electronic device or the user. This is not limited herein in the present disclosure.

Therefore, a circle that intersects with the second UI element may be determined from the plurality of circles, and it may be determined that the radius of the intersecting circle is the distance. In some embodiments, if more than one circle intersects with the second UI element, a target circle that intersects with the second UI element and that has a smallest radius may be determined from these circles. Further, in some embodiments, if no circle intersects with the second UI element, a circle closest to the second UI element may be used as the target circle. Therefore, it may be determined that the radius of the target circle is the distance.

As shown in FIG. 11, a distance between the UI element 5 and another UI element determined by using the foregoing manner is as follows: The distance between the UI element 5 and the UI element 5 is 0. Because a circle that intersects with the UI elements 3, 4, 7, and 8 and that has a smallest radius is a circle 1110, the distance between each of the UI elements 3, 4, 7, and 8 and the UI element 5 is 1. Because a circle 1120 intersects with the UI elements 2, 6, and 9, the distance between each of the UI elements 2, 6, and 9 and the UI element 5 is 2. In addition, because a circle 1130 intersects with the UI elements 1 and 10 to 13, the distance between each of the UI elements 1 and 10 to 13 and the UI element 5 is 3.

Figure 12:
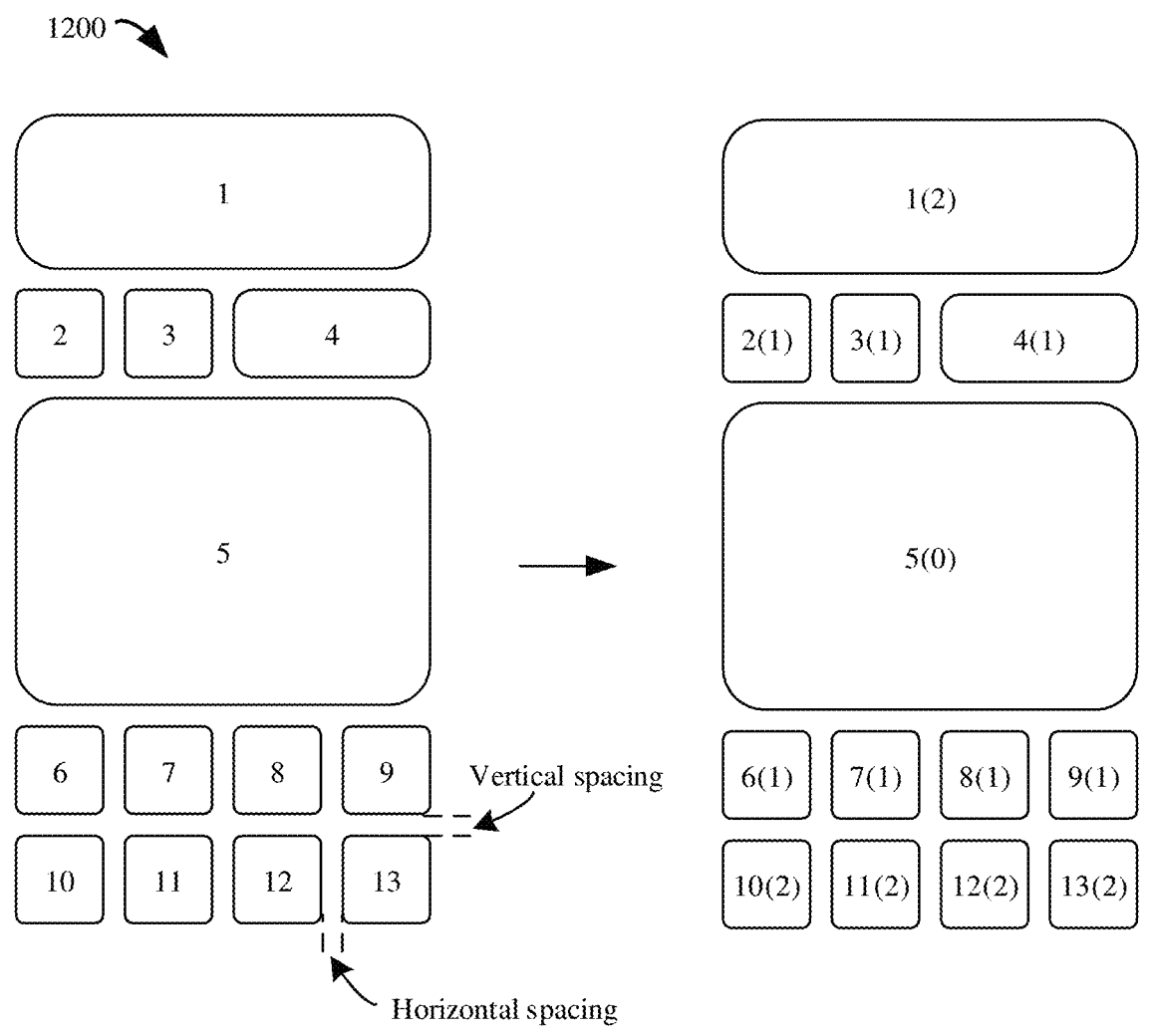
FIG. 12 is a schematic diagram of an example of determining a distance according to an embodiment of the present disclosure.

FIG. 12 is a schematic diagram of an example 1200 of determining a distance according to an embodiment of the present disclosure. As shown in FIG. 12, in some embodiments, a horizontal spacing between the first UI element and the second UI element and/or a vertical spacing between the first UI element and the second UI element may be determined. In some embodiments, the horizontal spacing may represent a sum of lengths of one or more horizontal spacings between the first UI element and the second UI element. The horizontal spacing may represent a spacing between vertical boundaries of two UI elements on the screen. Similar to the horizontal spacing, the vertical spacing may represent a sum of lengths of one or more vertical spacings between the first UI element and the second UI element. The vertical spacing may represent a spacing between horizontal boundaries of two UI elements on the screen. In a case of an irregular layout, lengths of a horizontal spacing and a vertical spacing between UI elements may be irregular. In addition, the lengths of the horizontal spacing and the vertical spacing between the UI elements may be configurable by the electronic device or the user.

Therefore, the distance may be determined based on the horizontal spacing and/or the vertical spacing. For example, there are two vertical spacings between the UI element 5 and the UI element 13. Therefore, a distance between the UI element 5 and the UI element 13 may be a sum of lengths of the two vertical spacings. In another example, there is one horizontal spacing between the UI element 12 and the UI element 13. Therefore, a distance between the UI element 12 and the UI element 13 may be a length of the horizontal spacing.

As shown in FIG. 12, a distance between the UI element 5 and another UI element determined by using the foregoing manner is as follows: The distance between the UI element 5 and the UI element 5 is 0. The distance between the UI element 5 and each of the UI elements 2 to 4 and 6 to 9 is 1. The distance between the UI element 5 and each of the UI elements 1 and 10 to 13 is 2.

Figures 13, 14A:
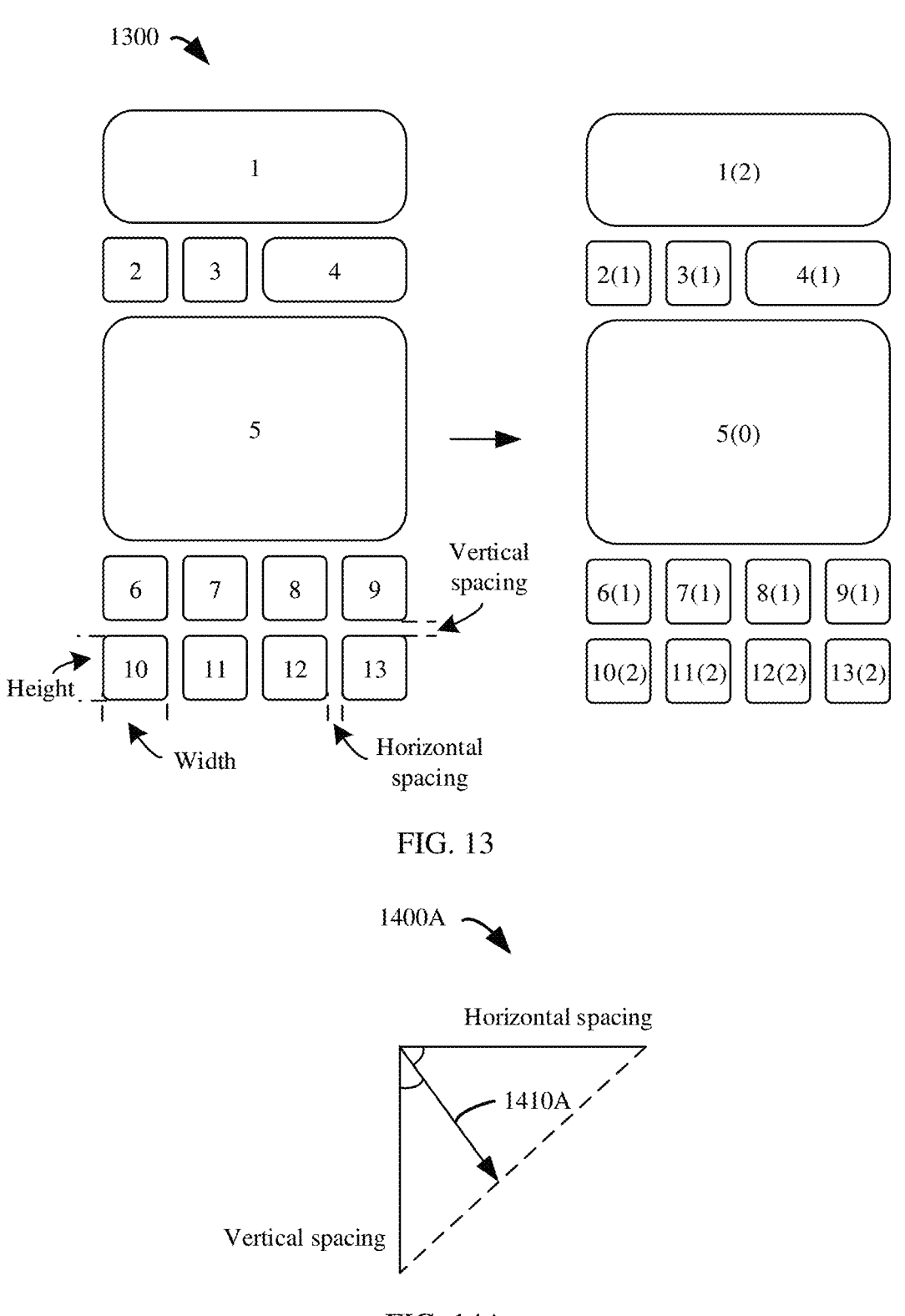
FIG. 13 is a schematic diagram of an example of determining a distance according to an embodiment of the present disclosure.
FIG. 14A and FIG. 14B are schematic diagrams of examples of determining a distance according to an embodiment of the present disclosure.

FIG. 13 is a schematic diagram of an example 1300 of determining a distance according to an embodiment of the present disclosure. In some embodiments, different from FIG. 12 in which only an intermediate spacing (for example, a horizontal spacing and a vertical spacing) between UI elements is considered in the horizontal spacing and the vertical spacing, a size of an intermediate UI element between the UI elements may also be considered in the horizontal spacing and the vertical spacing. As shown in FIG. 13, the horizontal spacing may represent a length of one or more horizontal spacings between the first UI element and the second UI element and a sum of widths of one or more intermediate UI elements. The vertical spacing may represent a sum of a length of one or more vertical spacings between the first UI element and the second UI element and a height of one or more intermediate UI elements.

Therefore, the distance may be determined based on the horizontal spacing and/or the vertical spacing. For example, there are two vertical spacings and one intermediate UI element 9 between the UI element 5 and the UI element 13. Therefore, a distance between the UI element 5 and the UI element 13 may be a sum of lengths of the two vertical spacings and a height of the UI element 9. In another example, there is one horizontal spacing and one intermediate UI element 12 between the UI element 11 and the UI element 13. Therefore, a distance between the UI element 11 and the UI element 13 may be a sum of a length of the horizontal spacing and a width of the UI element 12. In addition, there is one vertical spacing between the UI element 3 and the UI element 5. Therefore, a distance between the UI element 3 and the UI element 5 is a length of the vertical spacing. There are three vertical spacings and two intermediate UI elements 5 and 7 between the UI element 3 and the UI element 11. Therefore, a distance between the UI element 3 and the UI element 11 is a sum of lengths of the three vertical spacings and heights of the two intermediate UI elements 5 and 7. There is one horizontal spacing between the UI element 3 and the UI element 2. Therefore, a distance between the UI element 3 and the UI element 2 is a length of the horizontal spacing.

As shown in FIG. 13, a distance between the UI element 5 and another UI element determined by using the foregoing manner is as follows: The distance between the UI element 5 and the UI element 5 is 0. The distance between the UI element 5 and each of the UI elements 2 to 4 and 6 to 9 is 1. The distance between the UI element 5 and each of the UI elements 1 and 10 to 13 is 2.

Figure 14B:
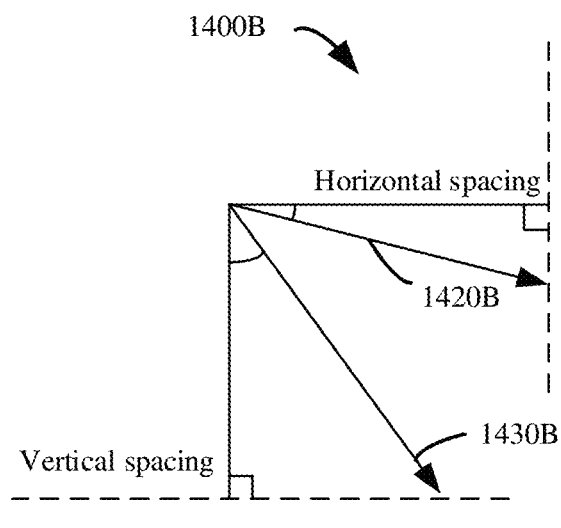

FIG. 14A and FIG. 14B are schematic diagrams of examples 1400A and 1400B of determining a distance according to an embodiment of the present disclosure. In some embodiments, in addition to the lengths of the horizontal spacing and the vertical spacing and the width and height of the intermediate UI element, an operation direction may also be considered in the horizontal spacing and the vertical spacing. For example, when the first UI element is dragged, the operation direction may be a direction of dragging the first UI element. In addition, although a dragging linkage scenario is described herein, a depth linkage scenario and a pressure linkage scenario exist as described below. In the depth linkage scenario and the pressure linkage scenario, a distance determining manner in which the operation direction is considered may also be used. Specifically, in the depth linkage scenario and the pressure linkage scenario, a UI element may be pressed. When the first UI element is pressed, although there is no operation direction, a direction from the second UI element to the first UI element (for example, a direction from the second reference point to the first reference point) may be considered as the operation direction and the operation direction is considered in the horizontal spacing and the vertical spacing.

In this case, the horizontal spacing and/or the vertical spacing may be first determined by using the distance determining manners described with reference to FIG. 12 and FIG. 13. Then, an included angle between the operation direction and a horizontal direction and/or a vertical direction may be determined. Therefore, a distance in the operation direction may be determined by using a trigonometric function principle.

In some embodiments, as shown in FIG. 14A, because an included angle between each of the horizontal spacing, the vertical spacing, and an operation direction 1410A and the horizontal direction or the vertical direction is known, a distance in the operation direction 1410A may be determined by using the trigonometric function principle.

Optionally, the distance in the operation direction may alternatively be determined by selecting the horizontal direction or the vertical direction that is closer to the operation direction as a reference direction based on an included angle between the operation direction and the horizontal direction and an included angle between the operation direction and the vertical direction. For example, as shown in FIG. 14B, because an operation direction 1430B is closer to the vertical direction, the vertical direction may be selected as the reference direction. In addition, a distance in the operation direction 1430B is determined by using the trigonometric function principle based on the vertical spacing and an included angle between the operation direction 1430B and the vertical direction. For another example, because an operation direction 1420B is closer to the horizontal direction, the horizontal direction may be selected as the reference direction. A distance in the operation direction 1420B may be determined by using the trigonometric function principle based on the horizontal spacing and an included angle between the operation direction 1420B and the horizontal direction. In addition, the reference direction may be configurable by the electronic device or the user. This is not limited herein in the present disclosure. For example, the reference direction may be set to the horizontal direction, the vertical direction, or any other appropriate direction.

In the foregoing, the distance in the operation direction is determined by using the horizontal spacing and the vertical spacing. However, as described above, the horizontal spacing and the vertical spacing may be determined by using an intermediate spacing and the size of the intermediate UI element. Therefore, the distance in the operation direction may alternatively be determined by segment for each intermediate spacing and intermediate UI element. Specifically, for each intermediate spacing and intermediate UI element, a size of the intermediate spacing or the intermediate UI element and an included angle between the operation direction and the horizontal direction or the vertical direction may be determined. Therefore, the distance in the operation direction may be determined by using the trigonometric function principle. Then, distances in the operation direction determined for the intermediate spacings and intermediate UI elements may be summed to determine a total distance in the operation direction.

Refer to FIG. 8 again. After the distance between the first UI element and the second UI element is determined, the animation effect of movement of the second UI element may be determined based on the distance. Therefore, in some embodiments, a first animation effect with which the first UI element moves in response to the dragging may be determined. As described above, in some embodiments, the first animation effect of the movement of the first UI element may be controlled by a predefined curve in which a displacement changes over time. For example, the predefined curve may be a Bessel curve or an elastic force curve.

Therefore, the animation effect of movement of the second UI element in response to the dragging may be determined based on the first animation effect and the distance between the first UI element and the second UI element. In some embodiments, when the first animation effect of the movement of the first UI element is controlled by the predefined curve in which the displacement changes over time, a curve in which the displacement changes over time of the second UI element may be determined based on the predefined curve in which the displacement changes over time of the first UI element. For example, in a case of an elastic force curve, the damping coefficient and/or the elasticity coefficient of the spring may be transmitted based on the distance. In a case of a Bessel curve, the coordinates of at least one of at least one control point of the Bessel curve may be transmitted based on the distance. The transmission manner described in detail above may be used to implement how to transmit the animation effect of the first UI element to the second UI element, to obtain the animation effect of the second UI element. Therefore, descriptions thereof are omitted herein.

In this manner, because the animation effect of movement of the second UI element is determined by the animation effect of movement of the first UI element and the distance between the second UI element and the first UI element, dragging linkage that is intuitive and natural and complies with users' use habits may be implemented.

In addition, in some embodiments, a size of the second UI element may also affect the animation effect of movement of the second UI element. In this case, the size of the second UI element may also be considered to determine the animation effect of the second UI element. For example, a larger size of the second UI element indicates smaller possible linkage impact on the second UI element. Therefore, the animation effect of movement of the second UI element may be inversely proportional to the size of the second UI element. Therefore, in some embodiments, the animation effect of movement of the second UI element may be determined based on a first amplitude, the distance, and the size of the second UI element.

In addition, in some embodiments, the size of the first UI element may also affect the animation effect of movement of the second UI element. In this case, the size of the first UI element may also be considered to determine the animation effect of the second UI element. For example, a larger size of the first UI element indicates larger linkage impact that may be generated by the first UI element. Therefore, the animation effect of movement of the second UI element may be in direct proportion to the size of the first UI element. Therefore, in some embodiments, the animation effect of movement of the second UI element may be determined based on the first amplitude, the distance, and the size of the first UI element.

Further, as described above, both the size of the first UI element and the size of the second UI element may affect the animation effect of movement of the second UI element. Therefore, in some embodiments, the animation effect of movement of the second UI element may be determined based on the first amplitude, the distance, the size of the first UI element, and the size of the second UI element.

Refer to FIG. 8 again. After the animation effect of movement of the second UI element is determined, the second UI element may be enabled to move with the animation effect, to visually indicate that the second UI element moves with the first UI element. The N UI elements may move with respective animation effects, to visually indicate dragging on the entire screen or a part of the screen, thereby presenting dragging linkage.

In some embodiments, the movement direction of the UI element that moves accordingly may be associated with the dragging direction, to visually indicate a dragging action. Therefore, in some embodiments, the dragging direction may be determined, and the second UI element may be enabled to move, in association with the direction, with the animation effect.

In addition, in some embodiments, to better present transmission of an animation effect and improve user experience, the first UI element and the second UI element do not start to move simultaneously. For example, the first UI element may start to move when the dragging occurs, and the second UI element may start to move after the dragging occurs for a period of time. Therefore, in some embodiments, a delay time may be determined based on the distance between the first UI element and the second UI element, and the second UI element is enabled to move in response to the dragging after the delay time. Further, in some embodiments, a delay coefficient may be determined, and the delay time is determined based on the distance and the delay coefficient. For example, the delay time may be a quotient of the distance divided by the delay coefficient. The delay coefficient may be configurable by the electronic device and the user.

Figure 15:
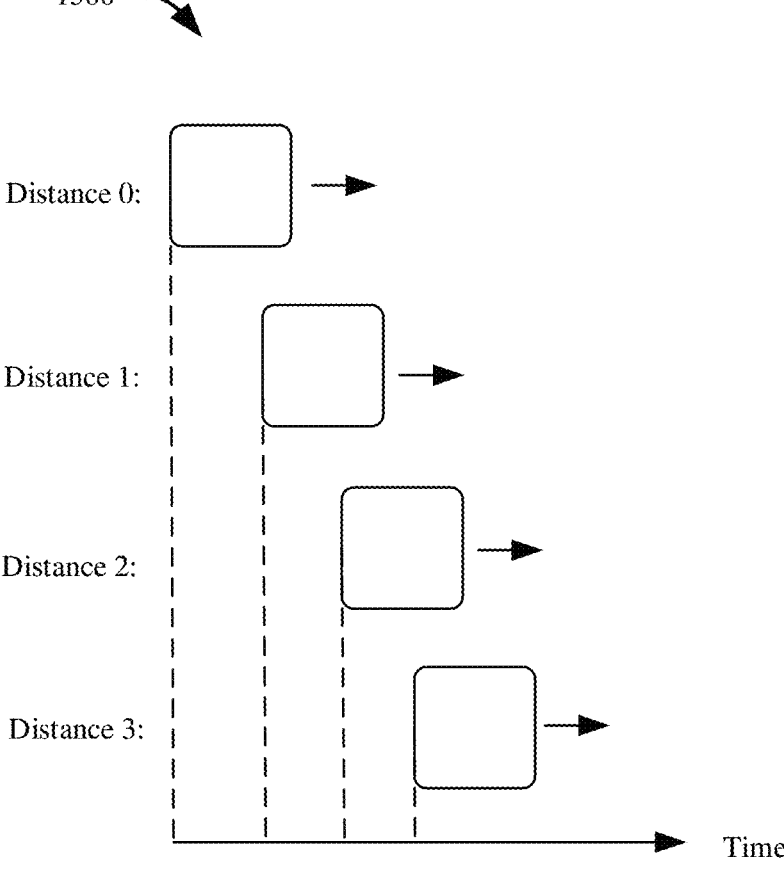
FIG. 15 is a schematic diagram of an example delay time according to an embodiment of the present disclosure.

FIG. 15 is a schematic diagram of an example delay time 1500 according to an embodiment of the present disclosure. As shown in FIG. 15, the first UI element (for example, the UI element 5) starts to move when the dragging occurs, a UI element whose distance is 1 (for example, the UI elements 3, 4, 7, and 8) moves later than the first UI element, a UI element whose distance is 2 (for example, the UI elements 2, 6, and 9) moves later than the UI element whose distance is 1, and a UI element whose distance is 3 (for example, the UI elements 1 and 10 to 13) moves later than the UI element whose distance is 2.

In this manner, linkage between animation effects of different UI elements can be enhanced, and relationships between independent UI elements may be highlighted. Compared with a conventional animation in which animation effects are monotonous and UI elements are independent and unrelated, embodiments of the present disclosure can make an animation effect better comply with a physical rule, and consider a real use scenario and users' use habits, thereby significantly improving user experience.

The foregoing describes in detail a process of implementing dragging linkage. The following further describes dragging linkage in different scenarios. These scenarios include: a scenario in which a UI element completely moves with a hand, a scenario in which a UI element does not completely move with a hand, a scenario in which a UI element continues to move after a hand is released or flicked, and a scenario in which a UI element continues to move and rebounds after a hand is released or flicked. It should be understood that these scenarios may be combined with each other to synthesize richer animation effects. For example, the UI element may not completely move with the hand and continue to move after the hand is released or flicked. For another example, the UI element may not completely move with the hand and continue to move and rebound after the hand is released or flicked. In the following, an example in which the UI element 5 is dragged and the UI elements 2 to 4 and 6 to 9 move accordingly is used for description.

Figure 16A:
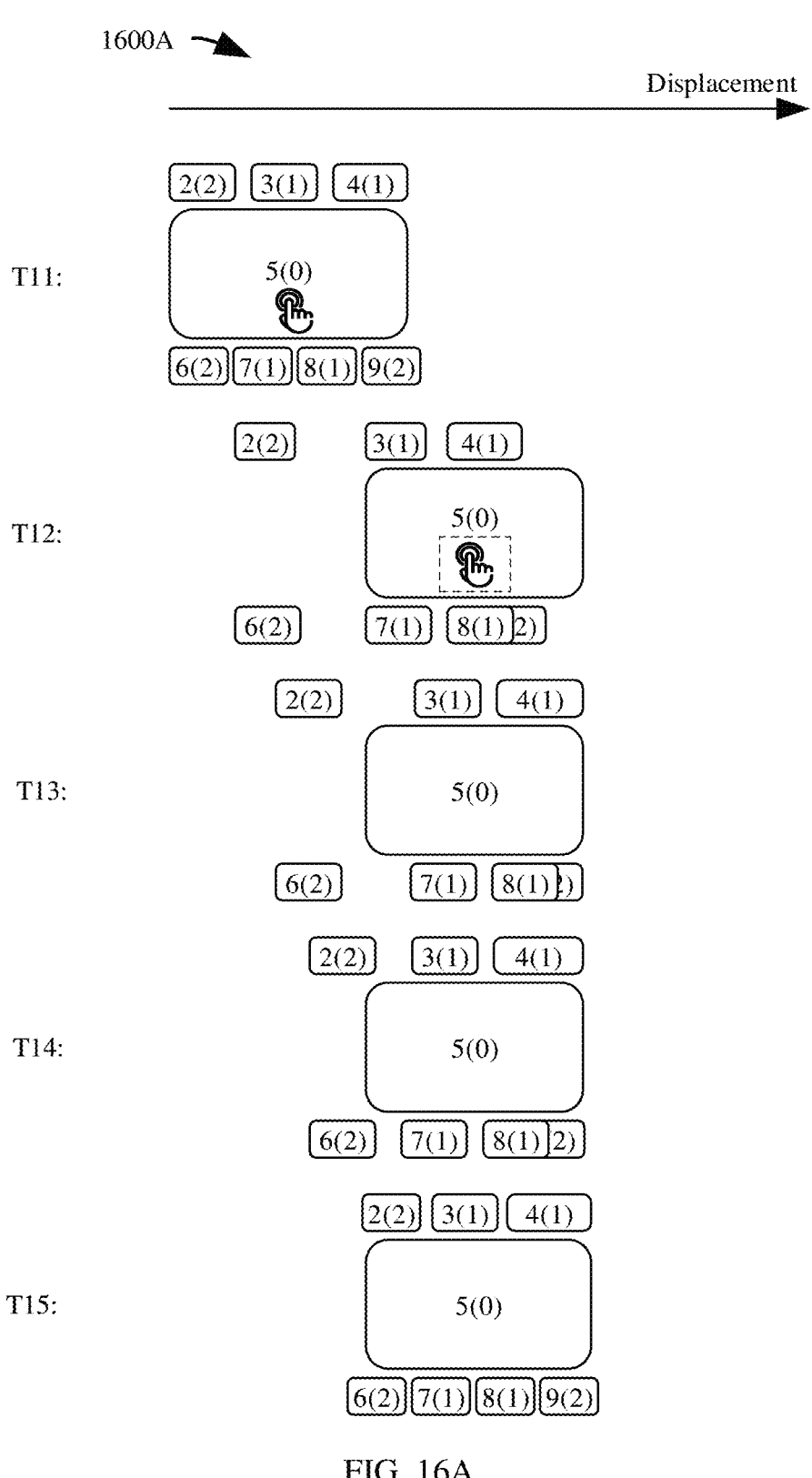
FIG. 16A is a schematic diagram of an example scenario in which a UI element completely moves with a hand according to an embodiment of the present disclosure.
Figure 16B:
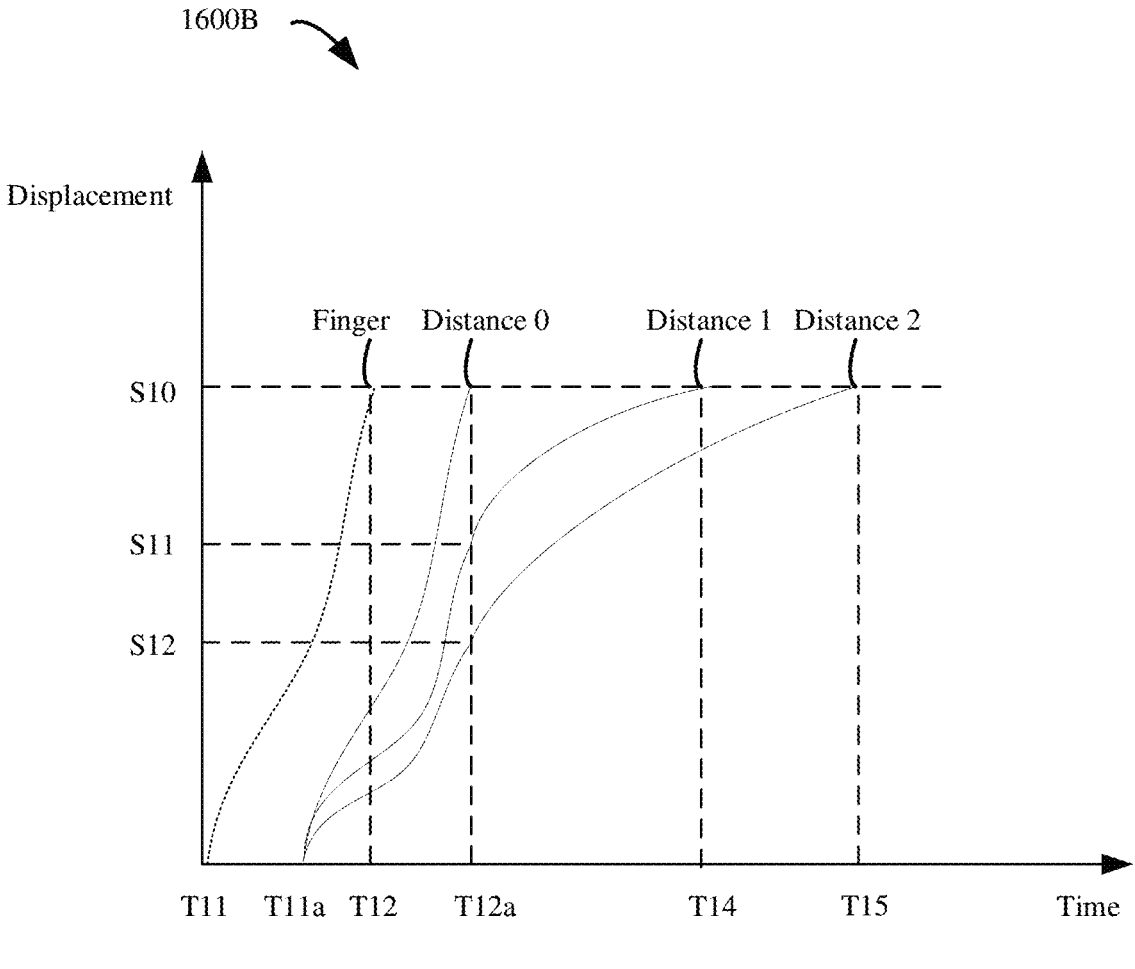
FIG. 16B is a schematic diagram of an example displacement-time curve of a scenario in which a UI element completely moves with a hand according to an embodiment of the present disclosure.

FIG. 16A is a schematic diagram of an example scenario 1600A in which a UI element completely moves with a hand according to an embodiment of the present disclosure. FIG. 16B is a schematic diagram of an example displacement-time curve 1600B of a scenario in which a UI element completely moves with a hand according to an embodiment of the present disclosure.

As shown in FIG. 16A and FIG. 16B, at T11, the UI element 5 is dragged. At T11a, the UI element 5 starts to move along with dragging of a finger. In some embodiments, if the UI element 5 starts to move when the dragging occurs, T11a may be equal to T11. Optionally, if the UI element 5 starts to move after the dragging occurs, T11a may be later than T11. In addition, in addition to the dragged UI element 5, other UI elements (for example, the UI elements 2 to 4 and 6 to 9) also move accordingly. It should be understood that, for clarity, the other UI elements are shown to start moving at the same time as the UI element 5. However, as described above, each of the other UI elements may start to move after a delay time of the UI element.

At T12, the user releases the hand or flicks. In this case, the dragging of the UI element 5 ends. At T12a, the UI element 5 stops moving. In some embodiments, if the UI element 5 stops moving when the hand is released or flicked, T12a may be equal to T12. Optionally, if the UI element 5 stops moving after the hand is released or flicked, T12a may be later than T12. In this case, a displacement of the UI element 5 in the dragging direction is S10. A displacement of the UI elements 3, 4, 7, and 8 whose distances are 1 in the dragging direction is S11. A displacement of the UI elements 2, 6, and 9 whose distances are 2 in the dragging direction is S12. The displacement S10 is greater than the displacement S11, and the displacement S11 is greater than the displacement S12. In this case, the UI element 5 stops moving, and the UI elements 3, 4, 7, and 8 whose distances are 1 and the UI elements 2, 6, and 9 whose distances are 2 continue to move with the animation effects controlled by the predefined curve (for example, an elastic force curve).

At T13, a spacing between the UI element 5 and each of the UI elements 3, 4, 7, and 8 whose distances are 1 is shortened in the dragging direction. In addition, a spacing between each of the UI elements 3, 4, 7, and 8 whose distances are 1 and the UI element 9 whose distance is 2 and that is in the dragging direction is shortened in the dragging direction. In addition, a spacing between each of the UI elements 3, 4, 7, and 8 whose distances are 1 and each of the UI elements 2 and 6 whose distances are 2 and that are in a direction opposite to the dragging direction is prolonged in the dragging direction.

At T14, a displacement of the UI element 5 in the dragging direction remains S10. The UI elements 3, 4, 7, and 8 whose distances are 1 move with the displacement S10 in the dragging direction and then stop moving. A displacement of the UI elements 2, 6, and 9 whose distances are 2 in the dragging direction does not reach S10, and the UI elements 2, 6, and 9 continues to move with the animation effects controlled by the predefined curve. Compared with T13, the spacing between each of the UI elements 3, 4, 7, and 8 whose distances are 1 and the UI element 9 whose distance is 2 and that is in the dragging direction is prolonged in the dragging direction. In addition, the spacing between each of the UI elements 3, 4, 7, and 8 whose distances are 1 and each of the UI elements 2 and 6 whose distances are 2 and that are in a direction opposite to the dragging direction is shortened in the dragging direction.

At T15, a displacement of the UI element 5 and the UI elements 3, 4, 7, and 8 whose distances are 1 in the dragging direction remains S10. The UI elements 2, 6, and 9 whose distances are 2 move with the displacement S10 in the dragging direction and then stop moving. In this case, dragging linkage is complete.

Figure 17A:
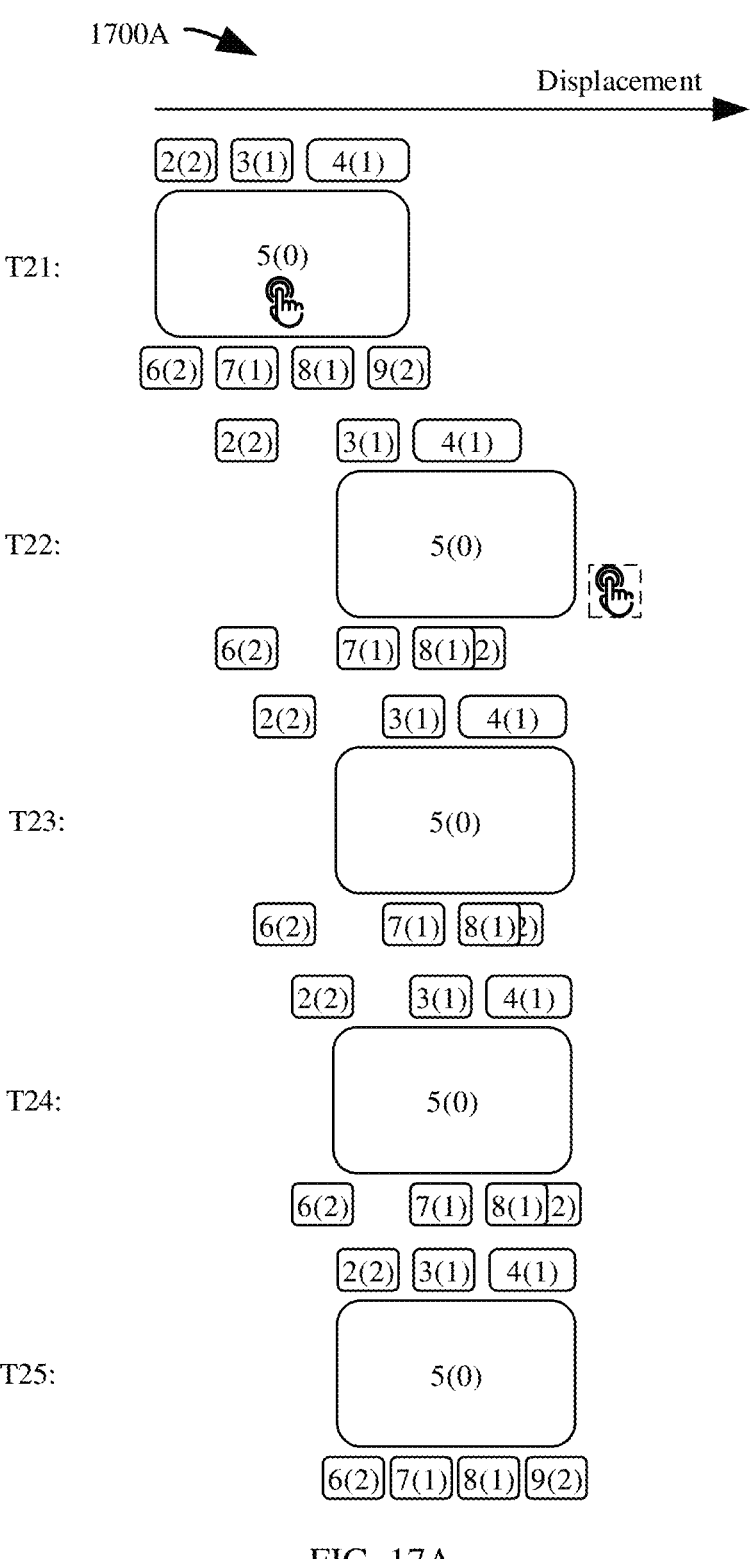
FIG. 17A is a schematic diagram of an example scenario in which a UI element does not completely move with a hand according to an embodiment of the present disclosure.
Figure 17B:
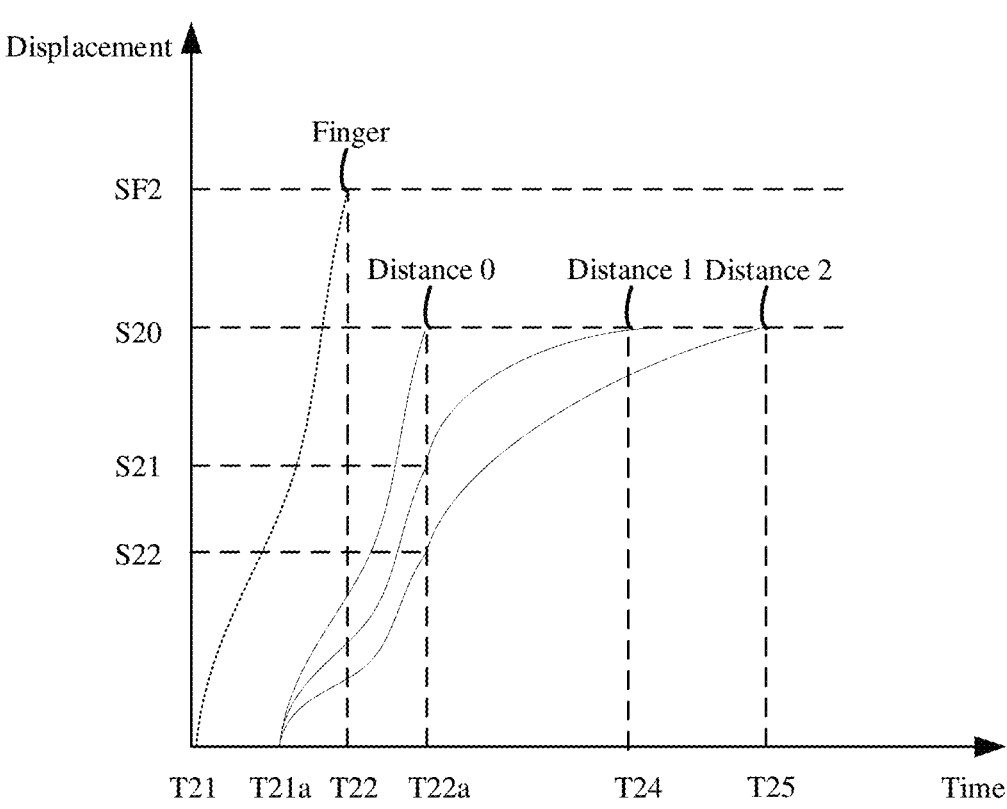
FIG. 17B is a schematic diagram of an example displacement-time curve of a scenario in which a UI element does not completely move with a hand according to an embodiment of the present disclosure.

FIG. 17A is a schematic diagram of an example scenario 1700A in which a UI element does not completely move with a hand according to an embodiment of the present disclosure. FIG. 17B is a schematic diagram of an example displacement-time curve 1700B of a scenario in which a UI element does not completely move with a hand according to an embodiment of the present disclosure.

As shown in FIG. 17A and FIG. 17B, at T21, the UI element 5 is dragged. At T21a, the UI element 5 starts to move along with dragging of a finger. In some embodiments, if the UI element 5 starts to move when the dragging occurs, T21a may be equal to T21. Optionally, if the UI element 5 starts to move after the dragging occurs, T21a may be later than T21. In addition, in addition to the dragged UI element 5, other UI elements (for example, the UI elements 2 to 4 and 6 to 9) also move accordingly. It should be understood that, for clarity, the other UI elements are shown to start moving at the same time as the UI element 5. However, as described above, each of the other UI elements may start to move after a delay time of the UI element.

At T22, the user releases the hand or flicks. In this case, the dragging of the UI element 5 ends. At T22a, the UI element 5 stops moving. In some embodiments, if the UI element 5 stops moving when the hand is released or flicked, T22a may be equal to T22. Optionally, if the UI element 5 stops moving after the hand is released or flicked, T22a may be later than T22. In this case, a displacement of the finger in the dragging direction is SF2. A displacement of the UI element 5 in the dragging direction is S20. A displacement of the UI elements 3, 4, 7, and 8 whose distances are 1 in the dragging direction is S21. A displacement of the UI elements 2, 6, and 9 whose distances are 2 in the dragging direction is S22. The displacement SF2 is greater than the displacement S20, the displacement S20 is greater than the displacement S21, and the displacement S21 is greater than the displacement S22. In this case, the UI element 5 stops moving, and the UI elements 3, 4, 7, and 8 whose distances are 1 and the UI elements 2, 6, and 9 whose distances are 2 continue to move with the animation effects controlled by the predefined curve (for example, an elastic force curve). Compared with T21, the spacing between the UI element 5 and each of the UI elements 3, 4, 7, and 8 whose distances are 1 is prolonged in the dragging direction. The spacing between each of the UI elements 3, 4, 7, and 8 whose distances are 1 and the UI element 9 whose distance is 2 and that is in the dragging direction is shortened in the dragging direction. In addition, the spacing between each of the UI elements 3, 4, 7, and 8 whose distances are 1 and each of the UI elements 2 and 6 whose distances are 2 and that are in a direction opposite to the dragging direction is prolonged in the dragging direction.

At T23, the spacing between the UI element 5 and each of the UI elements 3, 4, 7, and 8 whose distances are 1 is shortened in the dragging direction. In addition, the spacing between each of the UI elements 3, 4, 7, and 8 whose distances are 1 and the UI element 9 whose distance is 2 and that is in the dragging direction is shortened in the dragging direction. In addition, the spacing between each of the UI elements 3, 4, 7, and 8 whose distances are 1 and each of the UI elements 2 and 6 whose distances are 2 and that are in a direction opposite to the dragging direction is prolonged in the dragging direction.

At T24, a displacement of the UI element 5 in the dragging direction remains S20. The UI elements 3, 4, 7, and 8 whose distances are 1 move with the displacement S20 in the dragging direction and then stop moving. A displacement of the UI elements 2, 6, and 9 whose distances are 2 in the dragging direction does not reach S20, and the UI elements 2, 6, and 9 continue to move with the animation effects controlled by the predefined curve. Compared with T23, the spacing between each of the UI elements 3, 4, 7, and 8 whose distances are 1 and the UI element 9 whose distance is 2 and that is in the dragging direction is prolonged in the dragging direction. In addition, the spacing between each of the UI elements 3, 4, 7, and 8 whose distances are 1 and each of the UI elements 2 and 6 whose distances are 2 and that are in a direction opposite to the dragging direction is shortened in the dragging direction.

At T25, a displacement of the UI element 5 and the UI elements 3, 4, 7, and 8 whose distances are 1 in the dragging direction remains S20. The UI elements 2, 6, and 9 whose distances are 2 move with the displacement S20 in the dragging direction and then stop moving. In this case, dragging linkage is complete.

In the scenarios described with reference to FIG. 16A to FIG. 17B, after dragging is stopped, the UI element 5 stops moving. However, the UI element 5 may alternatively continue to move for a distance after the dragging is stopped. In some embodiments, the distance may be determined based on the friction model as described above. Whether the UI element 5 continues to move after the dragging is stopped is configurable by the electronic device and the user. For example, if the electronic device is configured to allow the UI element 5 to continue to move after the hand is released or flicked, the UI element 5 may continue to move. Otherwise, the UI element 5 stops moving as the dragging stops.

Figure 18A:
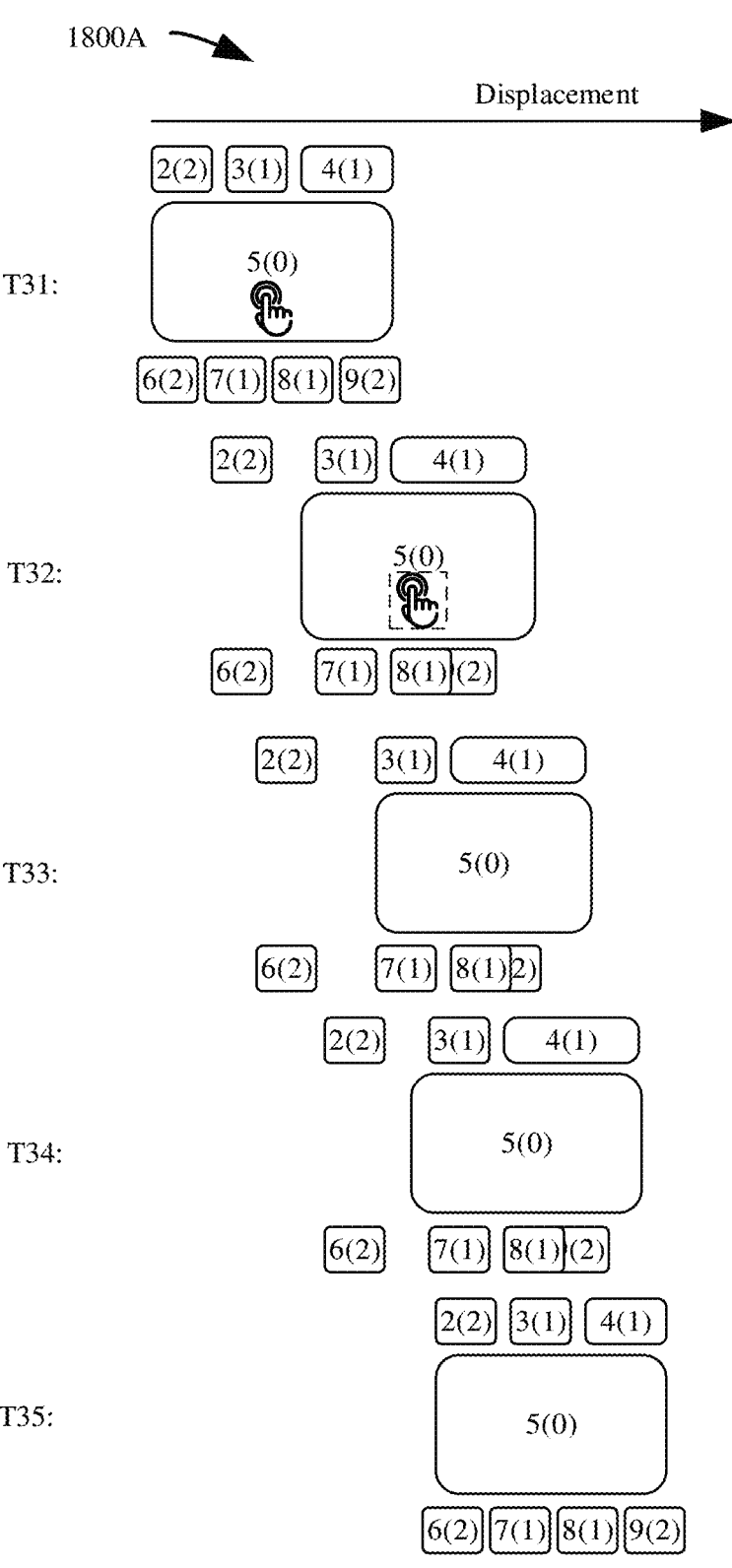
FIG. 18A is a schematic diagram of an example scenario in which a UI element completely moves with a hand according to an embodiment of the present disclosure.
Figure 18B:
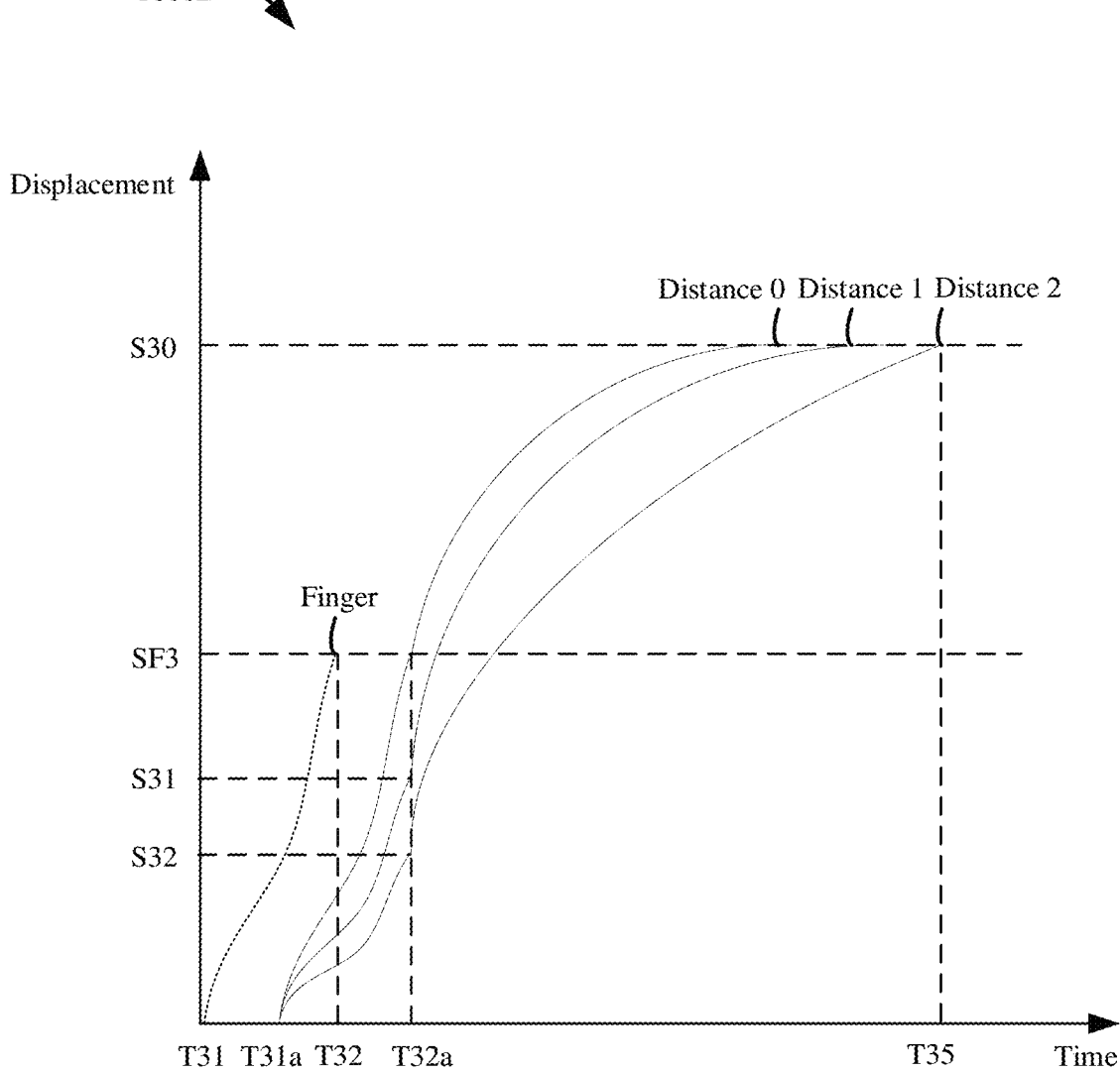
FIG. 18B is a schematic diagram of an example displacement-time curve of a scenario in which a UI element completely moves with a hand according to an embodiment of the present disclosure.

FIG. 18A is a schematic diagram of an example scenario 1800A in which a UI element completely moves with a hand according to an embodiment of the present disclosure. FIG. 18B is a schematic diagram of an example displacement-time curve 1800B of a scenario in which a UI element completely moves with a hand according to an embodiment of the present disclosure.

As shown in FIG. 18A and FIG. 18B, at T31, the UI element 5 is dragged. At T11a, the UI element 5 starts to move along with dragging of a finger. In some embodiments, if the UI element 5 starts to move when the dragging occurs, T31a may be equal to T31. Optionally, if the UI element 5 starts to move after the dragging occurs, T31a may be later than T31. In addition, in addition to the dragged UI element 5, other UI elements (for example, the UI elements 2 to 4 and 6 to 9) also move accordingly. It should be understood that, for clarity, the other UI elements are shown to start moving at the same time as the UI element 5. However, as described above, each of the other UI elements may start to move after a delay time of the UI element.

At T32, the user releases the hand or flicks. In this case, the dragging of the UI element 5 ends. At T32a, the UI element 5 continues to move with the animation effect controlled by the predefined curve (for example, an elastic force curve). In some embodiments, if the UI element 5 moves with the animation effect controlled by the predefined curve when the dragging ends, T32a may be equal to T32. Optionally, if the UI element 5 moves with the animation effect controlled by the predefined curve after the dragging ends, T32a may be later than T32. In this case, a displacement of the UI element 5 in the dragging direction is SF3. A displacement of the UI elements 3, 4, 7, and 8 whose distances are 1 in the dragging direction is S31. A displacement of the UI elements 2, 6, and 9 whose distances are 2 in the dragging direction is S32. The displacement SF3 is greater than the displacement S31, and the displacement S31 is greater than the displacement S32. In addition, the UI elements 3, 4, 7, and 8 whose distances are 1 and the UI elements 2, 6, and 9 whose distances are 2 also continue to move with the animation effects of the predefined curve. Compared with T31, the spacing between the UI element 5 and each of the UI elements 3, 4, 7, and 8 whose distances are 1 is prolonged in the dragging direction. The spacing between each of the UI elements 3, 4, 7, and 8 whose distances are 1 and the UI element 9 whose distance is 2 and that is in the dragging direction is shortened in the dragging direction. In addition, the spacing between each of the UI elements 3, 4, 7, and 8 whose distances are 1 and each of the UI elements 2 and 6 whose distances are 2 and that are in a direction opposite to the dragging direction is prolonged in the dragging direction.

At T33, the spacing between the UI element 5 and each of the UI elements 3, 4, 7, and 8 whose distances are 1 is prolonged in the dragging direction. The spacing between each of the UI elements 3, 4, 7, and 8 whose distances are 1 and the UI element 9 whose distance is 2 and that is in the dragging direction is shortened in the dragging direction. In addition, the spacing between each of the UI elements 3, 4, 7, and 8 whose distances are 1 and each of the UI elements 2 and 6 whose distances are 2 and that are in a direction opposite to the dragging direction is prolonged in the dragging direction.

At T34, all UI elements continue to move with the animation effects controlled by the predefined curve. Compared with T33, the spacing between the UI element 5 and each of the UI elements 3, 4, 7, and 8 whose distances are 1 is shortened in the dragging direction. The spacing between each of the UI elements 3, 4, 7, and 8 whose distances are 1 and the UI element 9 whose distance is 2 and that is in the dragging direction is prolonged in the dragging direction. In addition, the spacing between each of the UI elements 3, 4, 7, and 8 whose distances are 1 and each of the UI elements 2 and 6 whose distances are 2 and that are in a direction opposite to the dragging direction is shortened in the dragging direction.

At T35, all UI elements move with the displacement S30 in the dragging direction and stop moving. A distance in the dragging direction between the displacement S30 at a position where movement is stopped and the displacement SF3 at a position where the hand is released or flicked may be determined based on the friction model as described above. In this case, dragging linkage is complete.

Further, in some embodiments, if the UI element continues to move after the dragging is stopped, the UI element may be rebounded for a distance. As described above, in the underdamped state, a displacement of the spring flaps between positive and negative values over time. Therefore, an elastic force curve of the underdamped state may be used to control a rebound of the UI element.

It should be understood that, in FIG. 18A and FIG. 18B, UI elements are shown to allow overlapping with each other. For example, at time T32 to T34, the UI element 8 and the UI element 9 overlap. However, the UI elements may not be allowed to overlap with each other. Whether overlapping is allowed is configurable by the electronic device or the user. When overlapping is allowed, movement of the UI elements follows the elastic force curve of the underdamped state. When overlapping is not allowed, movement of the UI elements follows an elastic force curve of the overdamped state. Further, whether any two UI elements overlap may further depend on a relative movement amplitude of the two UI elements. For example, when a relative movement amplitude of two UI elements is small, the UI elements usually do not overlap. However, when the relative movement amplitude of the two UI elements is large, the UI elements may overlap.

Figure 19A:
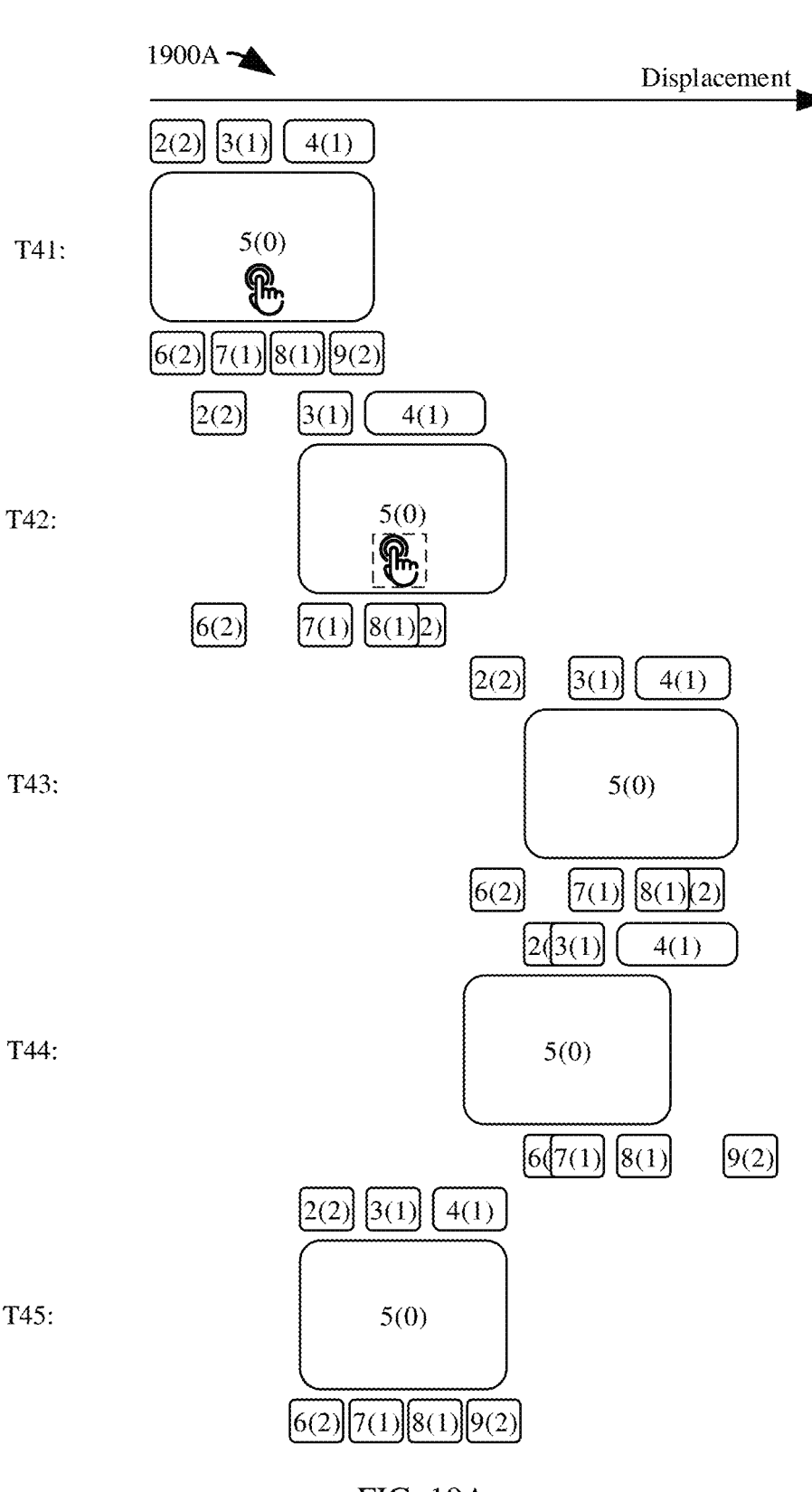
FIG. 19A is a schematic diagram of an example scenario in which a UI element completely moves with a hand according to an embodiment of the present disclosure.
Figure 19B:
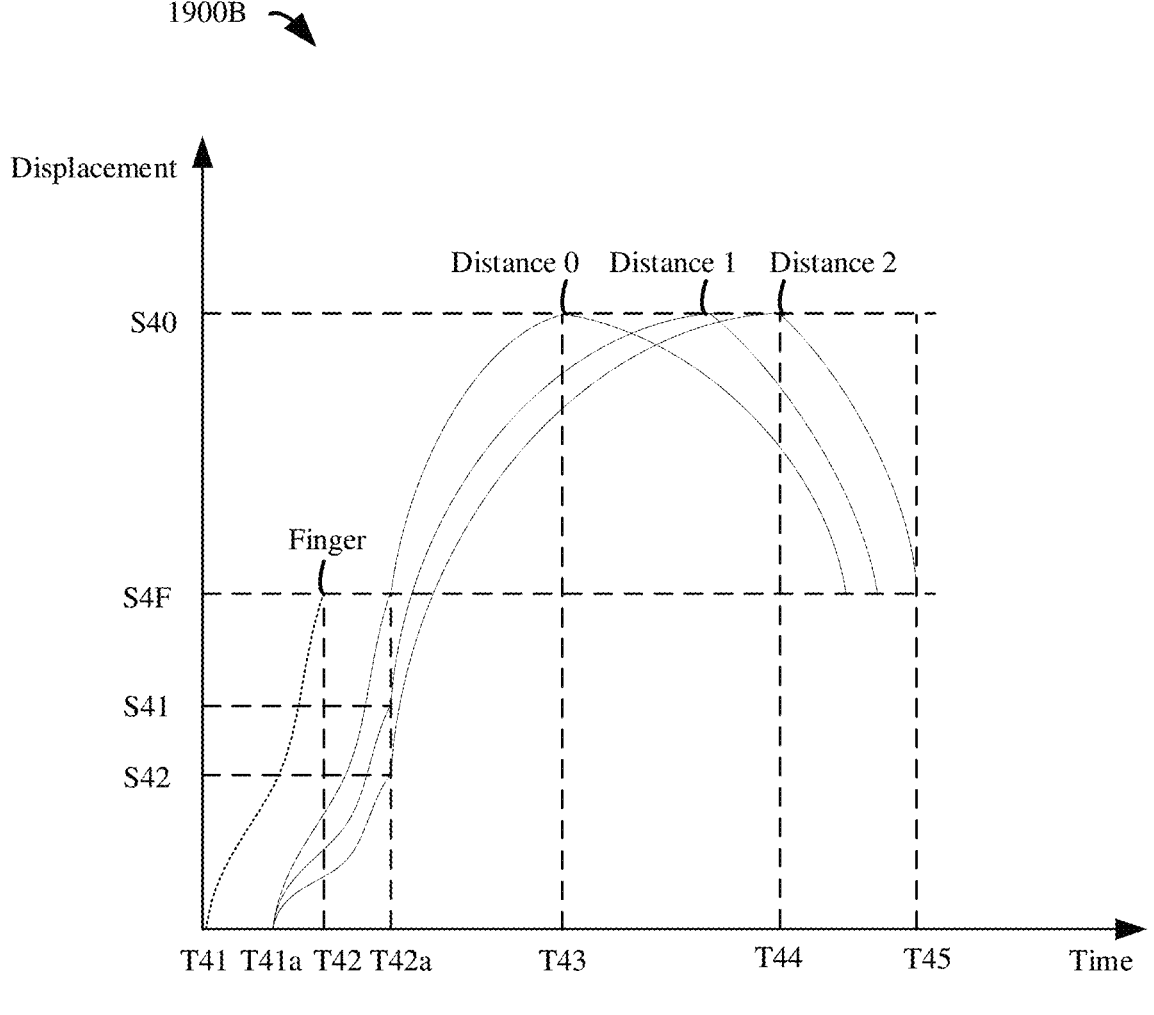
FIG. 19B is a schematic diagram of an example displacement-time curve of a scenario in which a UI element completely moves with a hand according to an embodiment of the present disclosure.

FIG. 19A is a schematic diagram of an example scenario 1900A in which a UI element completely moves with a hand according to an embodiment of the present disclosure. FIG. 19B is a schematic diagram of an example displacement-time curve 1900B of a scenario in which a UI element completely moves with a hand according to an embodiment of the present disclosure.

As shown in FIG. 19A and FIG. 19B, at T41, the UI element 5 is dragged. At T41a, the UI element 5 starts to move along with dragging of a finger. In some embodiments, if the UI element 5 starts to move when the dragging occurs, T41a may be equal to T41. Optionally, if the UI element 5 starts to move after the dragging occurs, T41a may be later than T41. In addition, in addition to the dragged UI element 5, other UI elements (for example, the UI elements 2 to 4 and 6 to 9) also move accordingly. It should be understood that, for clarity, the other UI elements are shown to start moving at the same time as the UI element 5. However, as described above, each of the other UI elements may start to move after a delay time of the UI element.

At T42, the user releases the hand or flicks. In this case, the dragging of the UI element 5 ends. At T42a, the UI element 5 continues to move with the animation effect controlled by the predefined curve (for example, an elastic force curve). In some embodiments, if the UI element 5 moves with the animation effect controlled by the predefined curve when the dragging ends, T42a may be equal to T42. Optionally, if the UI element 5 moves with the animation effect controlled by the predefined curve after the dragging ends, T42a may be later than T42. In this case, a displacement of the UI element 5 in the dragging direction is SF4. A displacement of the UI elements 3, 4, 7, and 8 whose distances are 1 in the dragging direction is S41. A displacement of the UI elements 2, 6, and 9 whose distances are 2 in the dragging direction is S42. The displacement SF4 is greater than the displacement S41, and the displacement S41 is greater than the displacement S42. In addition, the UI elements 3, 4, 7, and 8 whose distances are 1 and the UI elements 2, 6, and 9 whose distances are 2 also continue to move with the animation effects of the predefined curve. Compared with T41, the spacing between the UI element 5 and each of the UI elements 3, 4, 7, and 8 whose distances are 1 is prolonged in the dragging direction. The spacing between each of the UI elements 3, 4, 7, and 8 whose distances are 1 and the UI element 9 whose distance is 2 and that is in the dragging direction is shortened in the dragging direction. In addition, the spacing between each of the UI elements 3, 4, 7, and 8 whose distances are 1 and each of the UI elements 2 and 6 whose distances are 2 and that are in a direction opposite to the dragging direction is prolonged in the dragging direction.

At T43, the UI element 5 moves with a displacement S40 in the dragging direction and starts to rebound. In some embodiments, a distance between the displacement S40 in the dragging direction at a position of rebounding and the displacement SF4 in the dragging direction at a position of the release or flick may be determined based on the friction model as described above.

At T44, the UI element 9 whose distance is 2 moves with the displacement S40 in the dragging direction and also starts to rebound.

At T45, all UI elements rebound with the displacement SF4 in the dragging direction and stop moving. In this case, dragging linkage is complete.

It should be understood that, although the UI element 5 is shown to rebound before the UI elements 3, 4, 7, and 8 whose distances are 1, and the UI elements 3, 4, 7, and 8 whose distances are 1 are shown to rebound before the UI elements 2, 6, and 9 whose distances are 2, all the UI elements may rebound together. For example, the UI element 5 may stop moving and wait for the other UI elements to move with the displacement S40 and then start to rebound together. In addition, although all the UI elements are shown to rebound to the position of the release or flick, all the UI elements may rebound with a greater amplitude or a smaller amplitude. This is not limited in this embodiment of the present disclosure.

Depth Linkage

Embodiments of the present disclosure relate to linkage of UI elements on a UI in a depth direction, which is also referred to as depth linkage. The depth direction is a direction perpendicular to a screen of an electronic device. During depth linkage, a pressed target UI element may affect another UI element that is not pressed. Specifically, during depth linkage, triggering an animation effect of the target UI element may jointly trigger an animation effect of one or more other UI elements, or even other UI elements on the entire UI, so that all the other UI elements are affected by the target UI element. For example, during depth linkage, when the target UI element is pressed for a period of time, in addition to the target UI element that is scaled over time, another UI element may also be scaled with a corresponding amplitude, to visually present linked scaling.

In this way, linkage between animation effects of different UI elements can be enhanced, and relationships between independent UI elements may be highlighted. Compared with a conventional animation in which animation effects are monotonous and UI elements are independent and unrelated, embodiments of the present disclosure can make an animation effect better comply with a physical rule, and consider a real use scenario and users' use habits, thereby significantly improving user experience.

The following describes some example embodiments of depth linkage with reference to FIG. 20 to FIG. 33.

Depth linkage may occur on a UI with any appropriate regular or irregular layout, and UI elements on the UI may have any appropriate size and shape. For example, depth linkage may occur on the UIs 300A to 300C shown in FIG. 3A to FIG. 3C.

A UI element on the UI may be pressed. For example, when a user expects to perform an operation associated with the UI element, the user may press the UI element. For example, when the user expects to enter an application represented by the UI element, open a menu associated with the UI element, or the like, the user may press the UI element. When pressing performed on the UI element is detected, the UI element may be changed. For example, the UI element may be scaled to present a pressing action in the depth direction. For example, the UI element may be scaled down to present a distance in the depth direction. Optionally, the UI element may be scaled up to present proximity in the depth direction. The following describes scaling by using scaling down the UI element as an example. However, it should be understood that the UI element may alternatively be scaled up.

Figure 20:
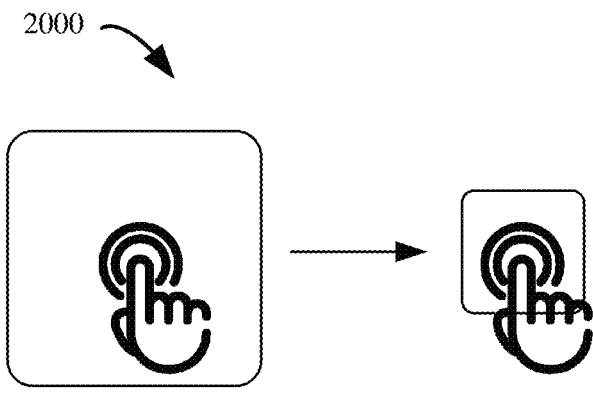
FIG. 20 is a schematic diagram of an example change of a UI element when pressed according to some embodiments of the present disclosure.

FIG. 20 is a schematic diagram of an example change 2000 of a UI element when the UI element is pressed according to some embodiments of the present disclosure. As shown in FIG. 20, when pressing performed on the UI element is detected, the UI element may be scaled down to present a distance in the depth direction.

The change of the UI element may conform to a surface pressure model. In the surface pressure model, pressure is the same at each part of the UI element (for example, each pixel or each part divided in any other appropriate manner). In other words, regardless of which part of the UI element is pressed (for example, whether a center or an edge of the UI element is pressed), the pressure is the same for all parts of the UI element. Therefore, regardless of which part of the UI element is pressed, the UI element has a same change.

Figure 21:
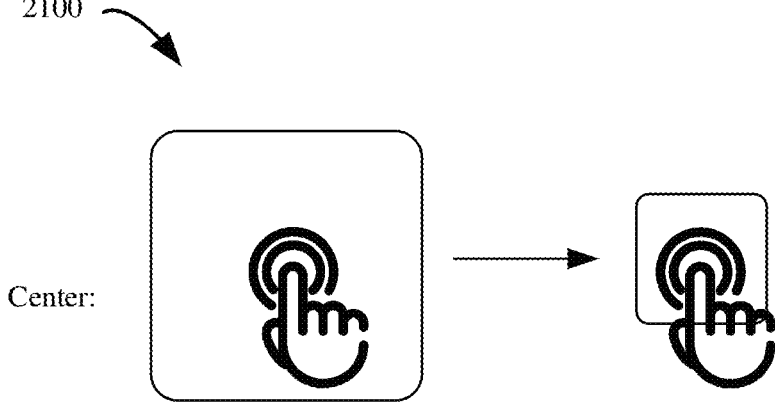
FIG. 21 is a schematic diagram of an example change of a UI element when pressed at different positions according to some embodiments of the present disclosure.
Figure 21:
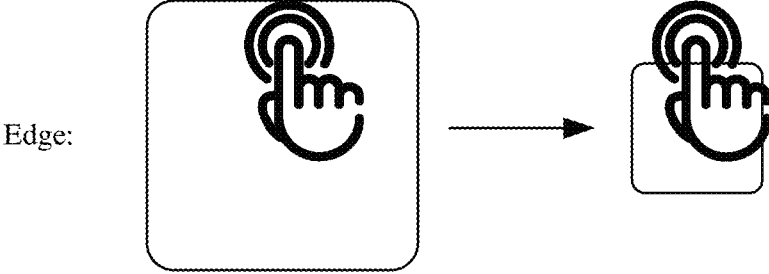

FIG. 21 is a schematic diagram of an example change 2100 of a UI element when the UI element is pressed at different positions according to some embodiments of the present disclosure. As shown in FIG. 21, regardless of whether pressing is detected at a center of the UI element or at an edge of the UI element, the UI element may be scaled down with a same amplitude to present a distance in the depth direction.

In addition, as shown in FIG. 21, after the UI element is scaled down, a pressed position may not be within a scope of the scaled-down UI element. In this case, because the pressed position is still within a scope of the UI element before the scale-down, or in any other appropriate scope, the pressing may continue to be detected as pressing on the UI element. Optionally, because the pressed position is no longer within the scope of the scaled-down UI element, the pressing is not detected as pressing on the UI element. In this case, it may be considered that the pressing ends.

In addition, in some embodiments, to enable a change of the UI element to comply with a natural law and users' use habits, a change amplitude may depend on a magnitude of a pressing force. In the real world, the magnitude of the force is usually a magnitude of a real force. In this case, a greater pressing force indicates a greater change in the depth direction. In some embodiments, the pressing force may be a pressing force that is applied by the user and that is detected by the electronic device. Optionally, the pressing force may alternatively be a preset pressing force set by the electronic device or the user.

Figures 22, 23:
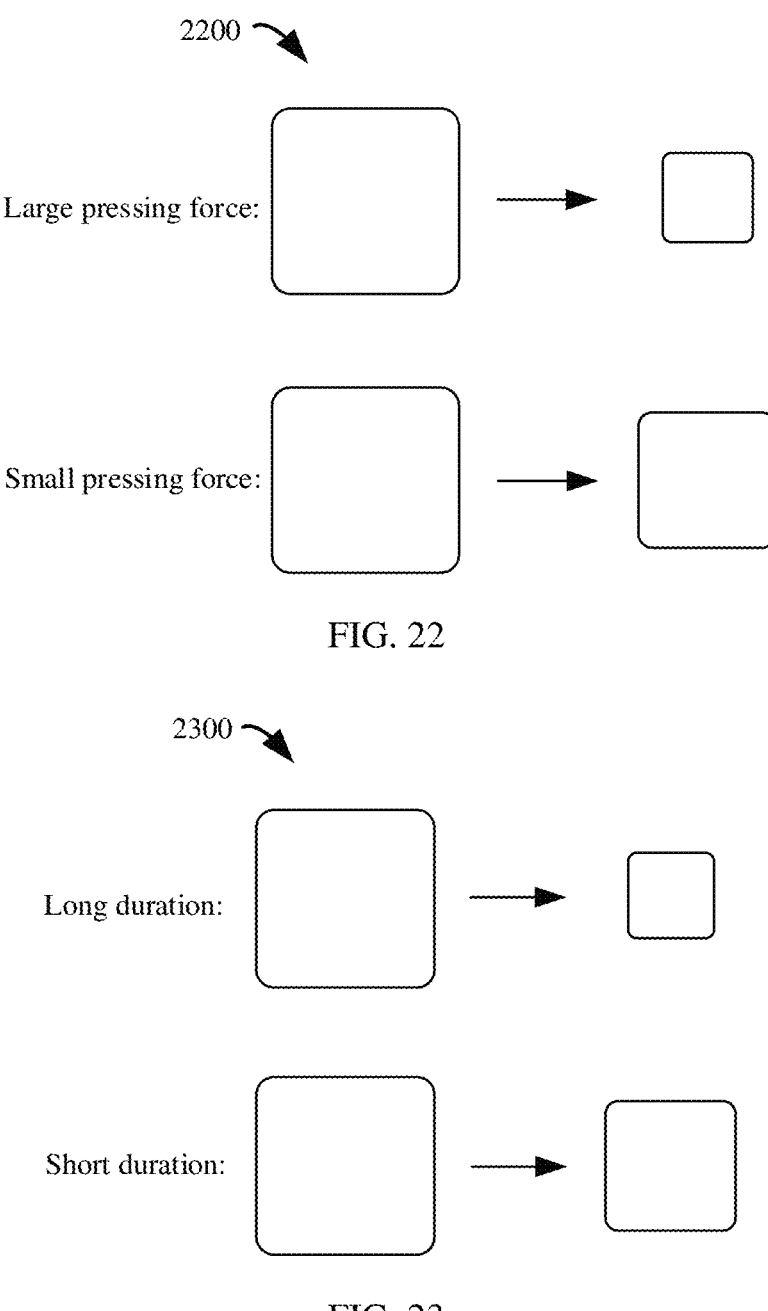
FIG. 22 is a schematic diagram of an example change of a UI element when pressed by using different forces according to some embodiments of the present disclosure.
FIG. 23 is a schematic diagram of an example change of a UI element when pressed for different duration according to some embodiments of the present disclosure.

FIG. 22 is a schematic diagram of an example change 2200 of a UI element when pressed by using different forces according to some embodiments of the present disclosure. As shown in FIG. 22, when the pressing force is large, the UI element may be scaled down to a larger extent, to present a longer distance in the depth direction. In some embodiments, the UI element may even be scaled down to disappear from the UI, that is, scaled down to a size of 0, to present a maximum distance in the depth direction. In contrast, when the pressing force is small, the UI element may be scaled down to a smaller extent, to present a shorter distance in the depth direction.

However, this is not limited thereto in embodiments of the present disclosure. A scaling manner of the UI element in response to different forces of pressing is configurable by the electronic device or the user. For example, when the pressing force is large, the UI element may be scaled down to a smaller extent, and when the pressing force is small, the UI element may be scaled down to a larger extent.

Further, in the electronic device, there may be a relatively high requirement on the user for a change in the depth direction completely based on a real pressing force, and the electronic device may need to be equipped with related hardware. Therefore, in some embodiments, the pressing force may be simulated or replaced by pressing duration. For example, if the pressing duration is longer, it may be considered that the pressing force is larger, and therefore, a change in the depth direction is greater.

FIG. 23 is a schematic diagram of an example change 2300 of a UI element when pressed for different duration according to some embodiments of the present disclosure. As shown in FIG. 23, when the pressing duration is long, the UI element may be scaled down to a larger extent, to present a longer distance in the depth direction. In some embodiments, the UI element may even be scaled down to disappear from the UI, that is, scaled down to a size of 0, to present a maximum distance in the depth direction. In contrast, when the pressing duration is short, the UI element may be scaled down to a smaller extent, to present a shorter distance in the depth direction.

However, this is not limited thereto in embodiments of the present disclosure. A scaling manner of the UI element in response to different duration of pressing is configurable by the electronic device or the user. For example, when the pressing duration is long, the UI element may be scaled down to a smaller extent, and when the pressing duration is short, the UI element may be scaled down to a larger extent.

In addition, in some embodiments, to further enable a change of the UI element to comply with a natural law and users' use habits, a change amplitude may depend on a size of the UI element. For example, visually, under same pressing, it may be difficult to press a large UI element but it is easy to press a small UI element. In this case, impact of pressing on a relatively large UI element may be small, and impact of pressing on a relatively small UI element may be large.

Figures 24, 25:
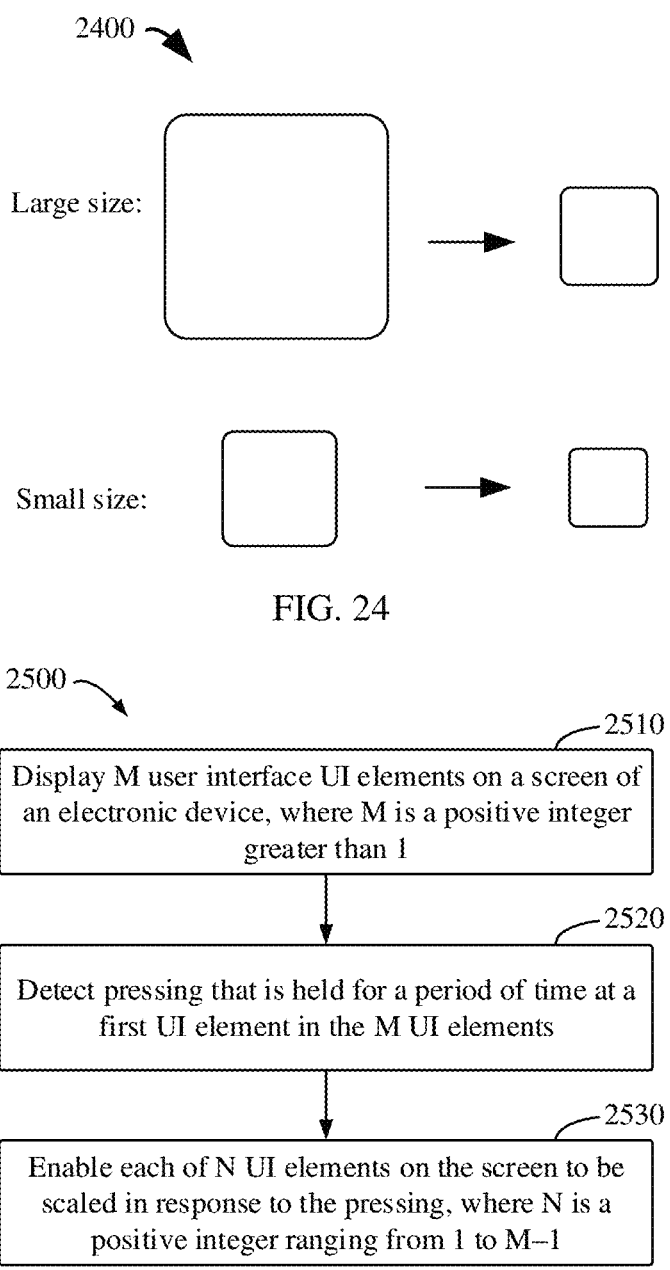
FIG. 24 is a schematic diagram of an example change of a UI element at different sizes according to some embodiments of the present disclosure.
FIG. 25 is a flowchart of a graphical interface display method according to an embodiment of the present disclosure.

FIG. 24 is a schematic diagram of an example change 2400 of a UI element at different sizes according to some embodiments of the present disclosure. As shown in FIG. 24, when the size of the UI element is large, the UI element may be scaled down to a larger extent, to present a longer distance in the depth direction. In contrast, when the size of the UI element is small, the UI element may be scaled down to a smaller extent, to present a shorter distance in the depth direction.

However, this is not limited thereto in embodiments of the present disclosure. A scaling manner of the UI element at different sizes is configurable by the electronic device or the user. For example, to make sizes of scaled UI elements more balanced, impact of pressing on a relatively large UI element may be large, and impact of pressing on a relatively small UI element may be small. Therefore, when the size of the UI element is large, the UI element may be scaled down to a smaller extent, and when the size of the UI element is small, the UI element may be scaled down to a larger extent, to present a shorter distance in the depth direction.

In addition, in some embodiments, to improve user experience, an amplitude of scaling the UI element may be limited, so that the UI element can be scaled only within an allowed amplitude range. For example, the amplitude range may be any appropriate range, such as 10% to 90% of the size of the UI element, 100 to 10,000 pixels, or 2% to 50% f of a screen-to-body ratio. For example, it is assumed that the amplitude range is 10% to 90% of the size of the UI element. In this case, regardless of the pressing force and pressing duration, the pressed UI element can only be scaled down to 10% of the original size at most and cannot disappear from the screen.

The foregoing describes in detail scaling of the pressed UI element. As described above, during depth linkage, the pressed target UI element may affect another UI element that is not pressed. Specifically, during depth linkage, triggering an animation effect of the target UI element may jointly trigger an animation effect of one or more other UI elements, or even other UI elements on the entire UI, so that all the other UI elements are affected by the target UI element. For example, during depth linkage, when the target UI element is pressed for a period of time, in addition to the target UI element that is scaled over time, another UI element may also be scaled with a corresponding amplitude, to visually present linked scaling. Therefore, the following describes depth linkage in detail with reference to FIG. 25 to FIG. 33.

FIG. 25 is a flowchart of a graphical interface display method 2500 according to an embodiment of the present disclosure. It should be understood that the method 2500 may be performed by the electronic device 100 described with reference to FIG. 1 or the electronic device 200 described with reference to FIG. 2. The method 2500 is described herein with reference to the UI 300A in FIG. 3A. However, it should be understood that the UI 300A is merely an example, and the method 2500 is applicable to any suitable interface, including but not limited to the UIs 300B and 300C.

In a block 2510, M user interface UI elements are displayed on a screen of an electronic device. M is a positive integer greater than 1. For example, the M UI elements may be the UI elements 1 to 13.

In a block 2520, pressing that is held for a period of time at a first UI element in the M UI elements is detected. For example, the first UI element may be the UI element 5. As described above, the pressing that is held for a period of time at the first UI element enables the first UI element to be scaled over time, to present a pressing effect in the depth direction.

In a block 2530, each of N UI elements on the screen is enabled to be scaled in response to the pressing that is detected at the first UI element and that is held for a period of time. N is a positive integer ranging from 1 to M−1. Therefore, linked pressing is visually indicated.

Figure 26:
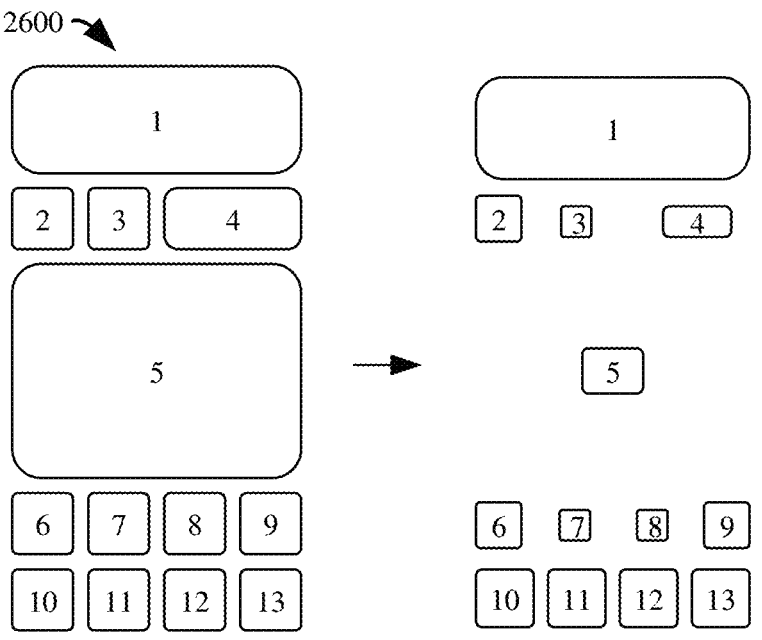
FIG. 26 is a schematic diagram of an example of depth linkage of N UI elements according to an embodiment of the present disclosure.

FIG. 26 is a schematic diagram of an example of depth linkage 2600 of N UI elements according to an embodiment of the present disclosure. As shown in FIG. 26, the UI element 5 is pressed for a period of time, so that the UI element 5 is scaled over time, to present the pressing effect in the depth direction. In addition, in response to the pressing, other UI elements on the screen (for example, the UI elements 1 to 4 and 6 to 13) are also scaled with different amplitudes over time, to present the pressing effect in the depth direction. Therefore, linked pressing is visually presented. For clarity, FIG. 26 shows depth linkage of only the UI elements 1 to 13 on the UI 300A. It should be understood that depth linkage may occur between any at least two UI elements on any UI, for example, between any at least two UI elements on the UIs 300A to 300C.

In some embodiments, depth linkage may be used in all UI elements on the screen. In this case, it may be determined that M−1 UI elements in the M UI elements other than the first UI element is the N UI elements. Optionally, depth linkage may be applied only to some UI elements on the screen. In this case, an impact area of the first UI element may be determined based on a size of the first UI element, and UI elements that are in the M UI elements and that are in the impact area are determined as the N UI elements. For example, a larger size of the first UI element may indicate a larger impact area of the first UI element. Optionally, the impact area may also be narrowed with size reduction. This is not limited herein in the present disclosure. For example, the impact area may be a circle that uses a reference point of the first UI element as a center and that has a predetermined radius. It should be understood that the impact area may be any suitable area having any shape. For example, the impact area is a rectangle, a diamond, or the like having a predetermined size. The impact area may be configurable by the electronic device and the user. This is not limited herein in the present disclosure.

In addition, in some embodiments, a UI element that intersects with the impact area may be considered as in the impact area. Optionally, when the impact area is a circle having a predetermined radius, if a distance between a UI element and the first UI element is shorter than the predetermined radius of the impact area, the UI element may be considered as in the impact area.

Figure 27:
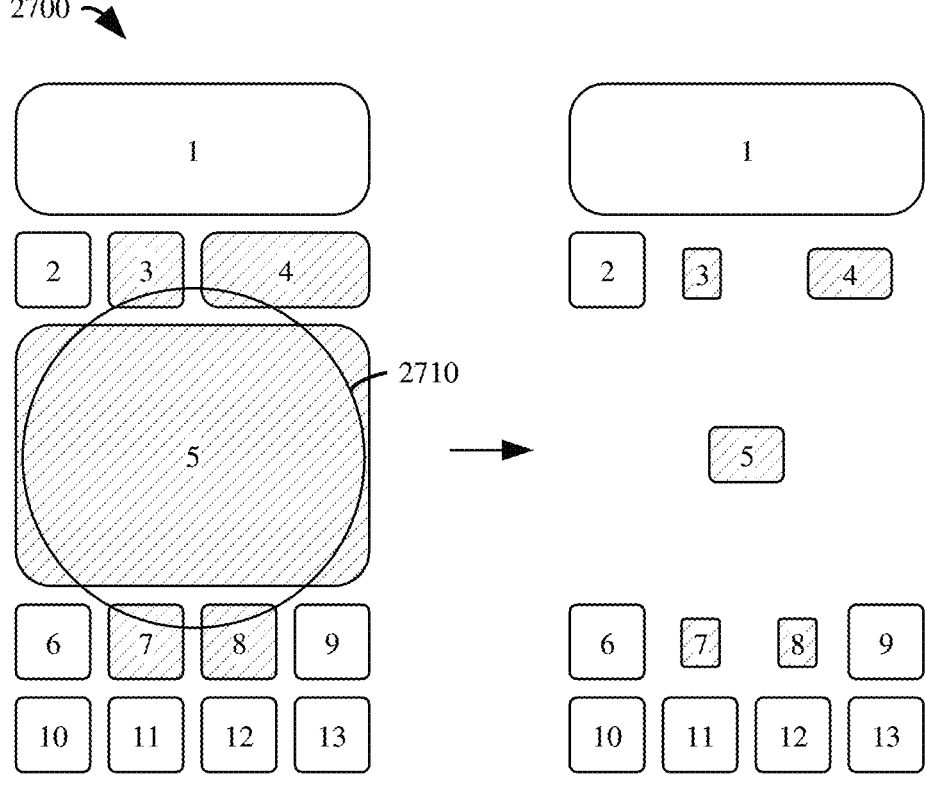
FIG. 27 is a schematic diagram of an example impact area of a UI element according to an embodiment of the present disclosure.

FIG. 27 is a schematic diagram of an example impact area 2700 of a UI element according to an embodiment of the present disclosure. As shown in FIG. 27, because the UI elements 3, 4, 7, and 8 are in an impact area 2710 of the UI element 5, the UI elements 3, 4, 7, and 8 are scaled accordingly with the UI element 5. In addition, because the UI elements 1, 2, 6, and 9 to 13 are not in the impact area 2710 of the UI element 5, the UI elements 1, 6, and 9 to 13 are not scaled accordingly with the UI element 5.

Refer to FIG. 25 again. To enable the N UI elements to be scaled with corresponding amplitudes, a distance between the first UI element and each of the N UI elements may be determined. As described above, in some embodiments, distances may be classified into a plurality of distance levels based on a range in which a distance is located. For example, a distance level of an operated UI element may be 0, and a distance level of a linked UI element may be 1, 2, 3, . . . , based on a distance between the linked UI element and the operated UI element. UI elements at a same distance level may be considered as having a same distance to the operated UI element. Therefore, linkage between UI elements may be simplified by using the distance level, so that UI elements at a same distance level are linked in a same manner, thereby improving linkage consistency and coordination. However, it should be understood that during linkage, the distance may alternatively be used, so that UI elements are linked more precisely. In the following, the distance level may be interchangeably referred to as the distance.

In the foregoing, a manner of determining the distance between the first UI element and a second UI element in the N UI elements is described with reference to FIG. 10 to FIG. 14B. Therefore, descriptions thereof are omitted herein.

Refer to FIG. 25 again. After the distance between the first UI element and the second UI element is determined, an amplitude of scaling the second UI element may be determined based on the distance. Optionally, if the distance between the first UI element and the second UI element is longer, the amplitude of scaling the second UI element may be smaller, to visually indicate smaller impact of pressing on a remote UI element. Optionally, if the distance between the first UI element and the second UI element is longer, the amplitude of scaling the second UI element may also be greater, to visually indicate greater impact of pressing on a remote UI element.

In some embodiments, to determine the amplitude of scaling the second UI element, a first amplitude of scaling the first UI element in response to the pressing may be determined. In some embodiments, the first amplitude of scaling the first UI element may be determined based on various factors associated with the first UI element. These factors may include but are not limited to the size of the first UI element, an amplitude range of changing the first UI element, pressing duration, and the predetermined pressing force. The foregoing describes in detail impact of these factors on an amplitude of scaling a UI element. Therefore, descriptions thereof are omitted herein.

Then, the amplitude of scaling the second UI element in response to the pressing may be determined based on the first amplitude and the distance between the first UI element and the second UI element. The transmission manner described in detail above may be used to implement how to transmit the amplitude of scaling the first UI element to the second UI element, to obtain the amplitude of scaling the second UI element. A difference lines in that during depth linkage, $x''$ in the transmission equations (7) and (8) represents an amplitude of scaling a UI element (for example, the second UI element) that is scaled accordingly, and x in the transmission equations (7) and (8) represents an amplitude of scaling a pressed UI element (for example, the first UI element). Therefore, descriptions thereof are omitted herein.

In this way, because the amplitude of scaling the second UI element is determined by the amplitude of scaling the first UI element and the distance between the second UI element and the first UI element, depth linkage that is intuitive and natural and complies with users' use habits may be implemented.

In this way, because the amplitude of scaling the second UI element is determined by the amplitude of scaling the first UI element and the distance between the second UI element and the first UI element, depth linkage that is intuitive and natural and complies with users' use habits may be implemented.

In this way, because the amplitude of scaling the second UI element is determined by the amplitude of scaling the first UI element and the distance between the second UI element and the first UI element, depth linkage that is intuitive and natural and complies with users' use habits may be implemented.

Further, as described above, both the size of the first UI element and the size of the second UI element may affect the amplitude of scaling the second UI element. Therefore, in some embodiments, the amplitude of scaling the second UI element may be determined based on the first amplitude, the distance, the size of the first UI element, and the size of the second UI element.

Refer to FIG. 25 again. After the amplitude of scaling the second UI element is determined, the second UI element may be enabled to be scaled with the amplitude, to visually indicate that the second UI element is scaled with the pressing performed on the first UI element. The N UI elements may be enabled to be scaled with respective amplitudes, to visually indicate the pressing on the entire screen or a part of the screen, thereby presenting pressing linkage.

Figure 28:
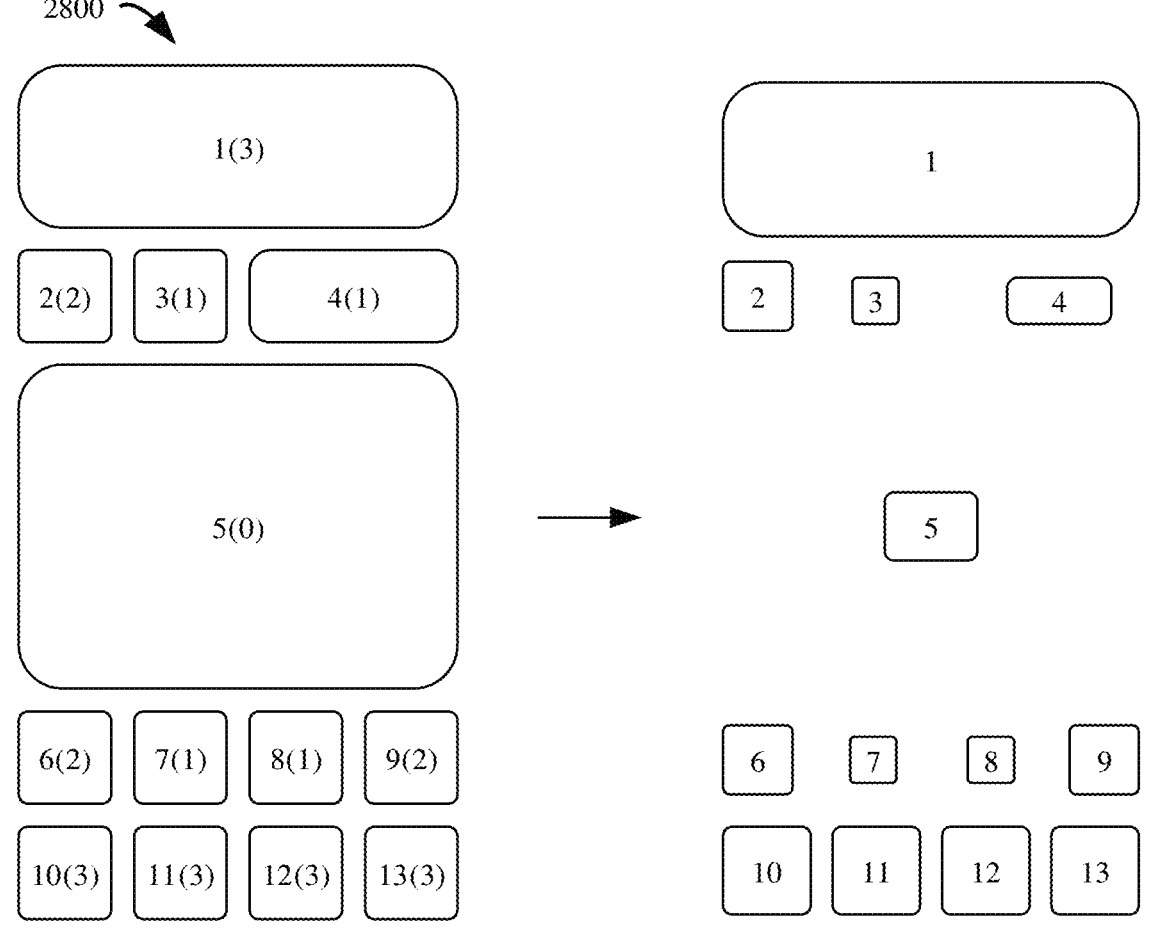
FIG. 28 is a schematic diagram of an example of scaling a UI element based on a distance according to an embodiment of the present disclosure.

FIG. 28 is a schematic diagram of example scaling 2800 of a UI element based on a distance according to an embodiment of the present disclosure. As shown in FIG. 2800, an amplitude of scaling a UI element (for example, the UI element 5) whose distance is 0 is greater than that of a UI element (for example, the UI elements 3, 4, 7, and 8) whose distance is 1, the amplitude of scaling the UI element whose distance is 1 is greater than that of a UI element (for example, the UI elements 2, 6, and 9) whose distance is 2, and the amplitude of scaling the UI element whose distance is 2 is greater than that of a UI element whose distance is 3 (for example, the UI elements 1 and 10 to 13).

In addition, in some embodiments, to better present transmission of an animation effect and improve user experience, the first UI element and the second UI element are not scaled at the same time. For example, the first UI element may start to be scaled when the pressing occurs, and the second UI element may start to be scaled after the pressing occurs for a period of time. Therefore, in some embodiments, a delay time may be determined based on the distance between the first UI element and the second UI element, and the second UI element may be enabled to be scaled in response to the pressing after the delay time. Further, in some embodiments, a delay coefficient may be determined, and the delay time is determined based on the distance and the delay coefficient. For example, the delay time may be a quotient of the distance divided by the delay coefficient. The delay coefficient may be configurable by the electronic device and the user.

Figure 29:
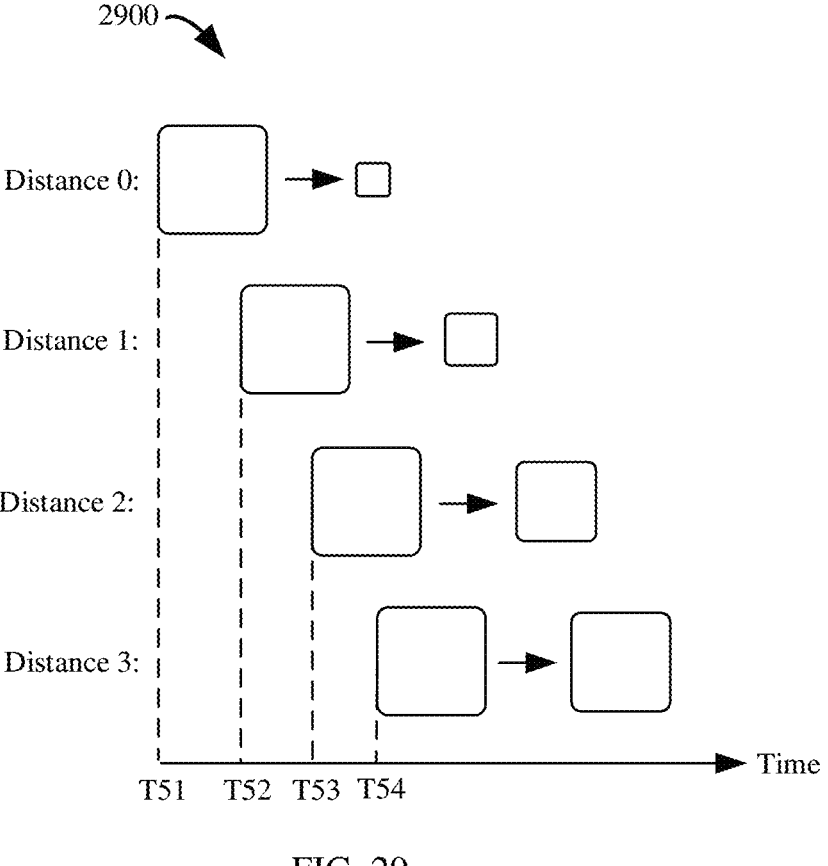
FIG. 29 is a schematic diagram of an example delay time according to an embodiment of the present disclosure.

FIG. 29 is a schematic diagram of an example delay time 2900 according to an embodiment of the present disclosure. As shown in FIG. 29, the first UI element whose distance is 0 starts to be scaled when the pressing occurs, the UI element whose distance is 1 is scaled later than the first UI element, the UI element whose distance is 2 is scaled later than the UI element whose distance is 1, and the UI element whose distance is 3 is scaled later than the UI element whose distance is 2.

Figure 30:
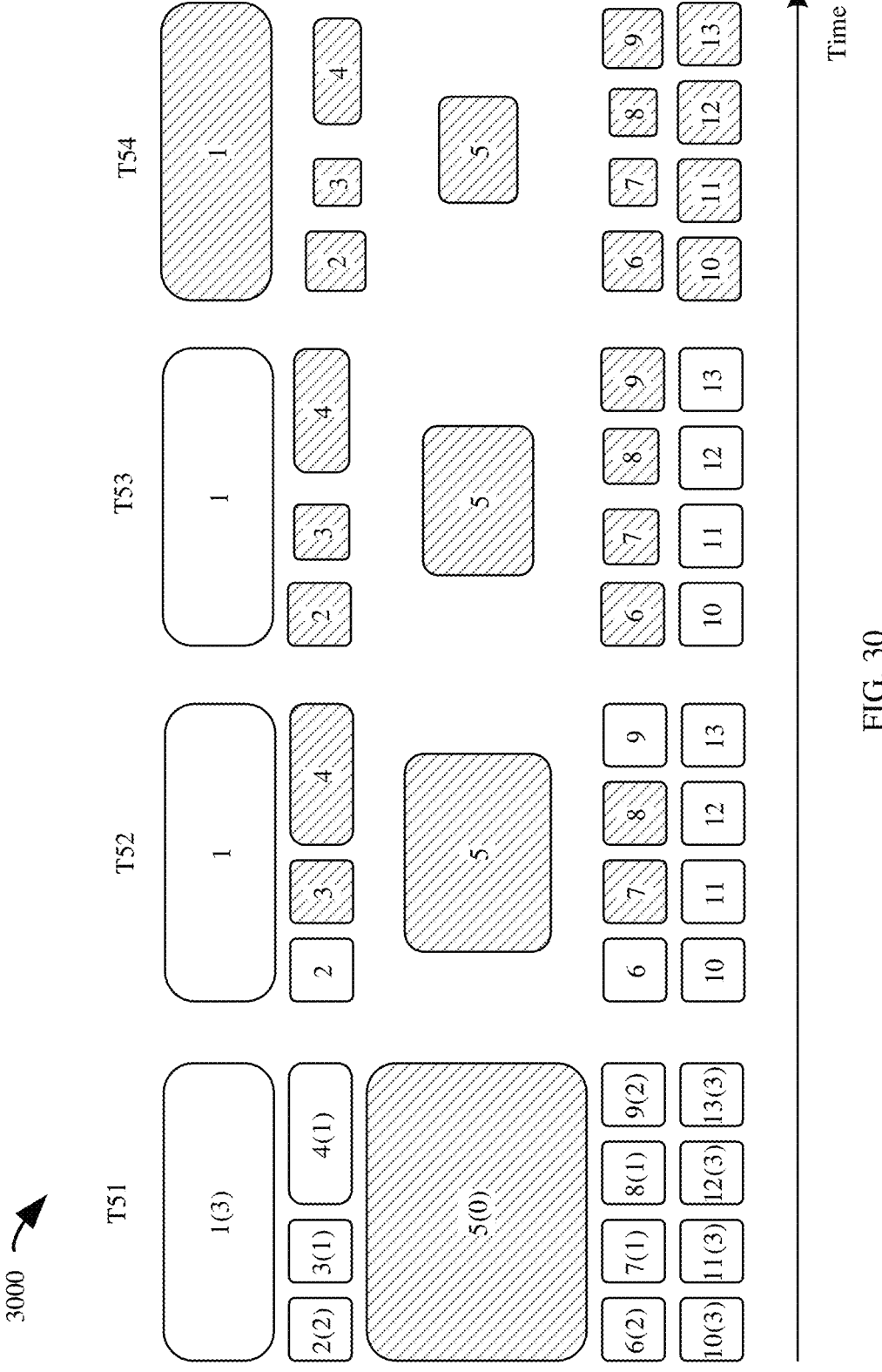
FIG. 30 is a schematic diagram of example scaling of a UI element with a delay time according to the present disclosure.

FIG. 30 is a schematic diagram of example scaling 3000 of a UI element with a delay time according to the present disclosure. As shown in FIG. 30, the UI element 5 whose distance is 0 starts to be scaled at a time T51 when the pressing occurs, the UI elements 3, 4, 7, and 8 whose distances are 1 start to be scaled at a time T52 after the time T51, the UI elements 2, 4, 6, and 9 whose distances are 2 start to be scaled at a later time T53, and the UI elements 1 and 10 to 13 whose distances are 3 start to be scaled at latest T54.

Furthermore, in some embodiments, a scaling speed of a UI element may be controlled by a predefined curve in which an amplitude changes over time. For example, the predefined curve may be a Bessel curve or an elastic force curve. In a case of an elastic force curve, the scaling speed may be controlled by controlling a damping coefficient and a stiffness coefficient of a spring. In a case of a Bessel curve, the scaling speed may be controlled by controlling coordinates of at least one of at least one control point of the Bessel curve.

Further, in some embodiments, to improve user experience, the UI element that is scaled accordingly may further move toward the pressed UI element. Specifically, the N UI elements may move toward the first UI element, to further visually highlight the pressing. For example, a displacement amplitude may depend on at least one of a distance between the UI element that is scaled accordingly and the pressed UI element, pressing duration, the size of the second UI element, and the size of the first UI element. Therefore, in some embodiments, a displacement of movement of the second UI element may be determined based on the distance between the first UI element and the second UI element, pressing duration, the size of the first UI element, and/or the size of the second UI element.

Then, the second UI element may be enabled to move with the displacement in a direction from the second UI element to the first UI element. For example, the second UI element may be enabled to move with the displacement in a direction from the second reference point of the second UI element to the first reference point of the first UI element. A visual effect of this is that the second UI element is attracted by the first UI element. It should be understood this is not limited thereto in embodiments of the present disclosure. For example, the second UI element may alternatively be enabled to move with the displacement in an opposite direction (for example, a direction from the first reference point of the first UI element to the second reference point of the second UI element). A visual effect of this is that the second UI element is excluded by the first UI element.

Figure 31:
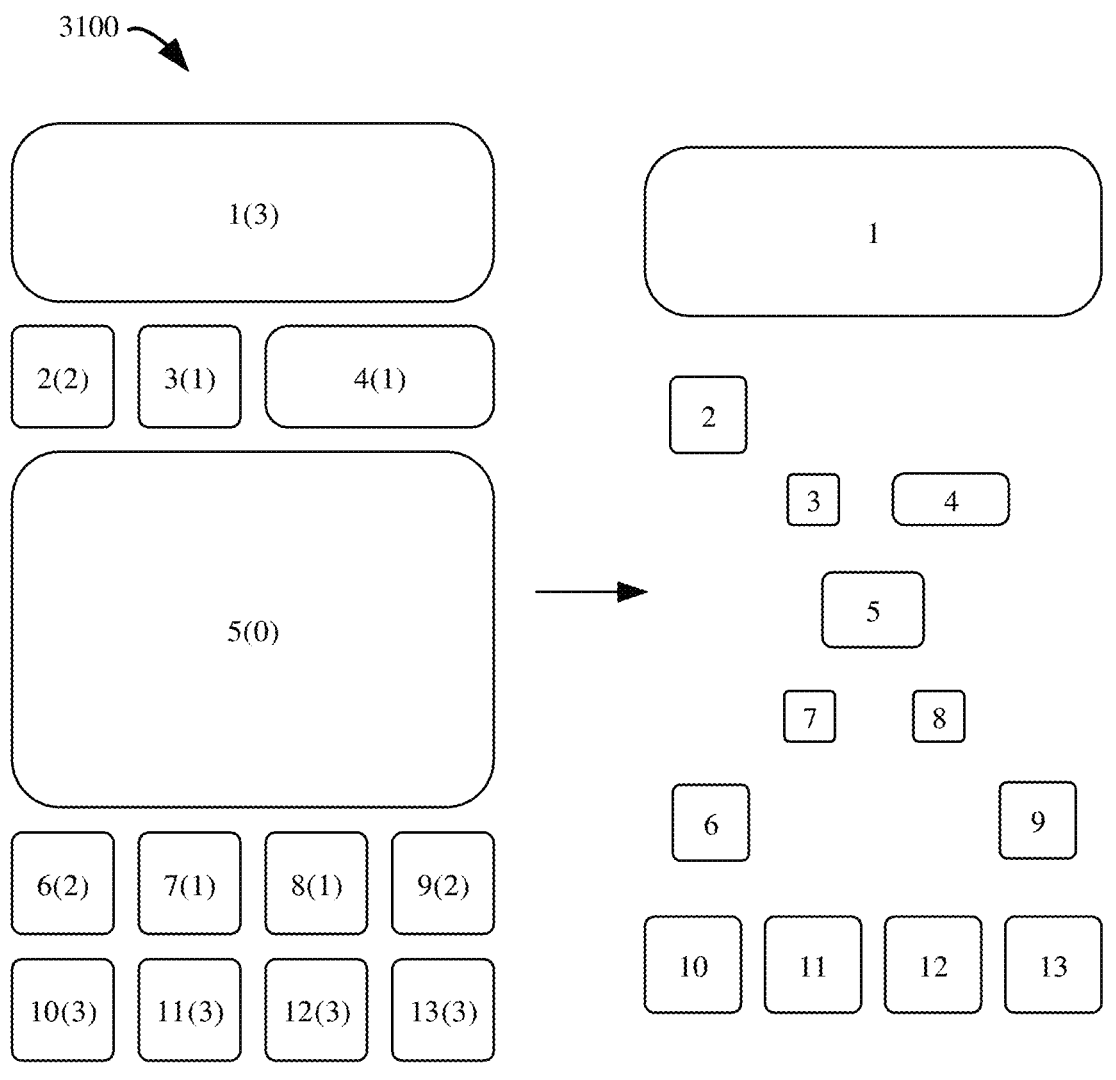
FIG. 31 is a schematic diagram of an example displacement of movement of a UI element according to an embodiment of the present disclosure.

FIG. 31 is a schematic diagram of an example displacement 3100 of movement of a UI element according to an embodiment of the present disclosure. As shown in FIG. 3100, a displacement amplitude of the UI element (for example, the UI elements 3, 4, 7, and 8) whose distance is 1 is greater than that of the UI element (for example, the UI elements 2, 6, and 9) whose distance is 2, and the displacement amplitude of the UI element whose distance is 2 is greater than a displacement amplitude of the UI element (for example, the UI elements 1 and 10 to 13) whose distance is 3.

In addition, in some embodiments, a scaled UI element may be restored after the pressing ends (for example, after the user lifts the finger away from the screen). Specifically, both the pressed UI element and the N UI elements that are scaled accordingly may be restored. Therefore, in some embodiments, the scaled second UI element may be restored to the second UI element before the scaling. A restoration process may be an inverse process of scaling, and therefore detailed description thereof is omitted herein.

FIG. 31 is a schematic diagram of an example displacement 3100 of movement of a UI element according to an embodiment of the present disclosure. As shown in FIG. 3100, a displacement amplitude of the UI element (for example, the UI elements 3, 4, 7, and 8) whose distance is 1 is greater than that of the UI element (for example, the UI elements 2, 6, and 9) whose distance is 2, and the displacement amplitude of the UI element whose distance is 2 is greater than a displacement amplitude of the UI element (for example, the UI elements 1 and 10 to 13) whose distance is 3.

In addition, in some embodiments, a scaled UI element may be restored after the pressing ends (for example, after the user lifts the finger away from the screen). Specifically, both the pressed UI element and the N UI elements that are scaled accordingly may be restored. Therefore, in some embodiments, the scaled second UI element may be restored to the second UI element before the scaling. A restoration process may be an inverse process of scaling, and therefore detailed description thereof is omitted herein.

Figure 32A:
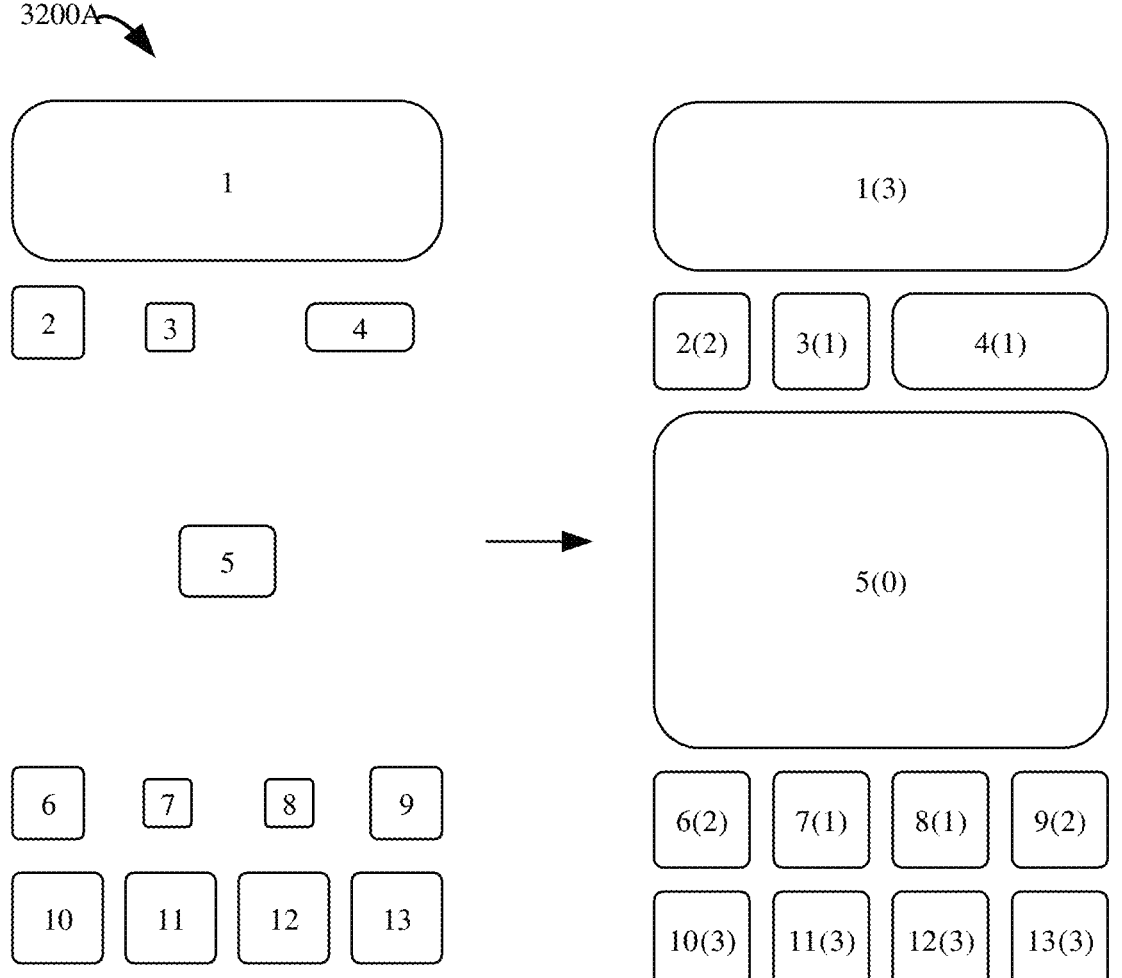
FIG. 32A and FIG. 32B are respectively schematic diagrams of examples of restoring a UI element without a displacement and restoring a UI element with a displacement according to an embodiment of the present disclosure.
Figure 32B:
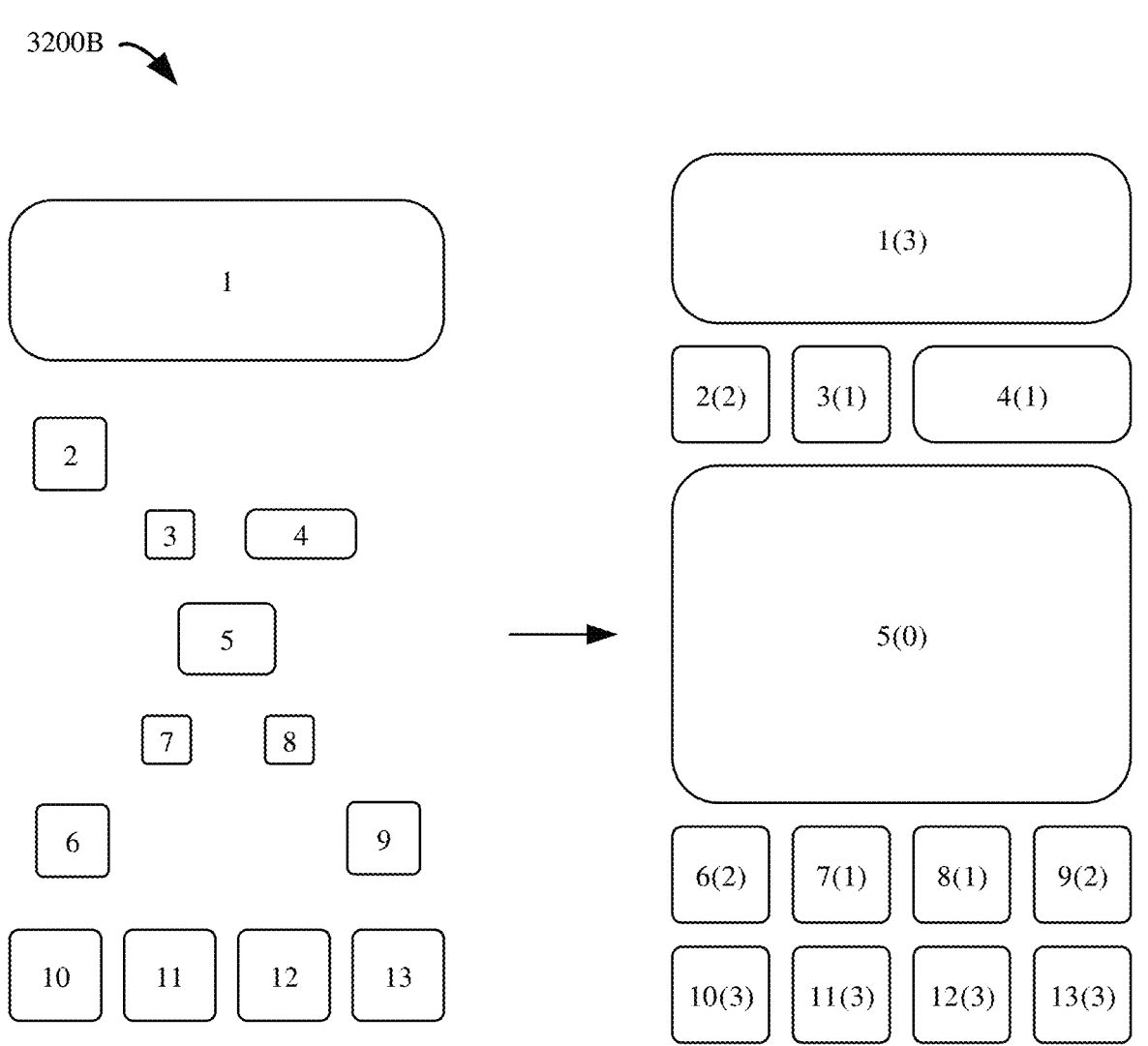

FIG. 32B is a schematic diagram of an example of restoration 3200B of a UI element with a displacement according to an embodiment of the present disclosure. As shown in FIG. 32B, a moved and scaled UI element (for example, the UI elements 1 to 13) is restored to a position before movement and an initial size before scaling.

In some embodiments, restoration of scaling or restoration of movement may have a rebound effect. For example, with respect to restoration of scaling, after the user releases the hand, a size of a UI element may be first increased to be greater than an initial size and then decreased to the initial size. In addition, with respect to restoration of movement, after the user releases the hand, a UI element that moves accordingly may first move away from the pressed UI element to a position farther than an initial position before movement and then return to the initial position.

Figure 33A:
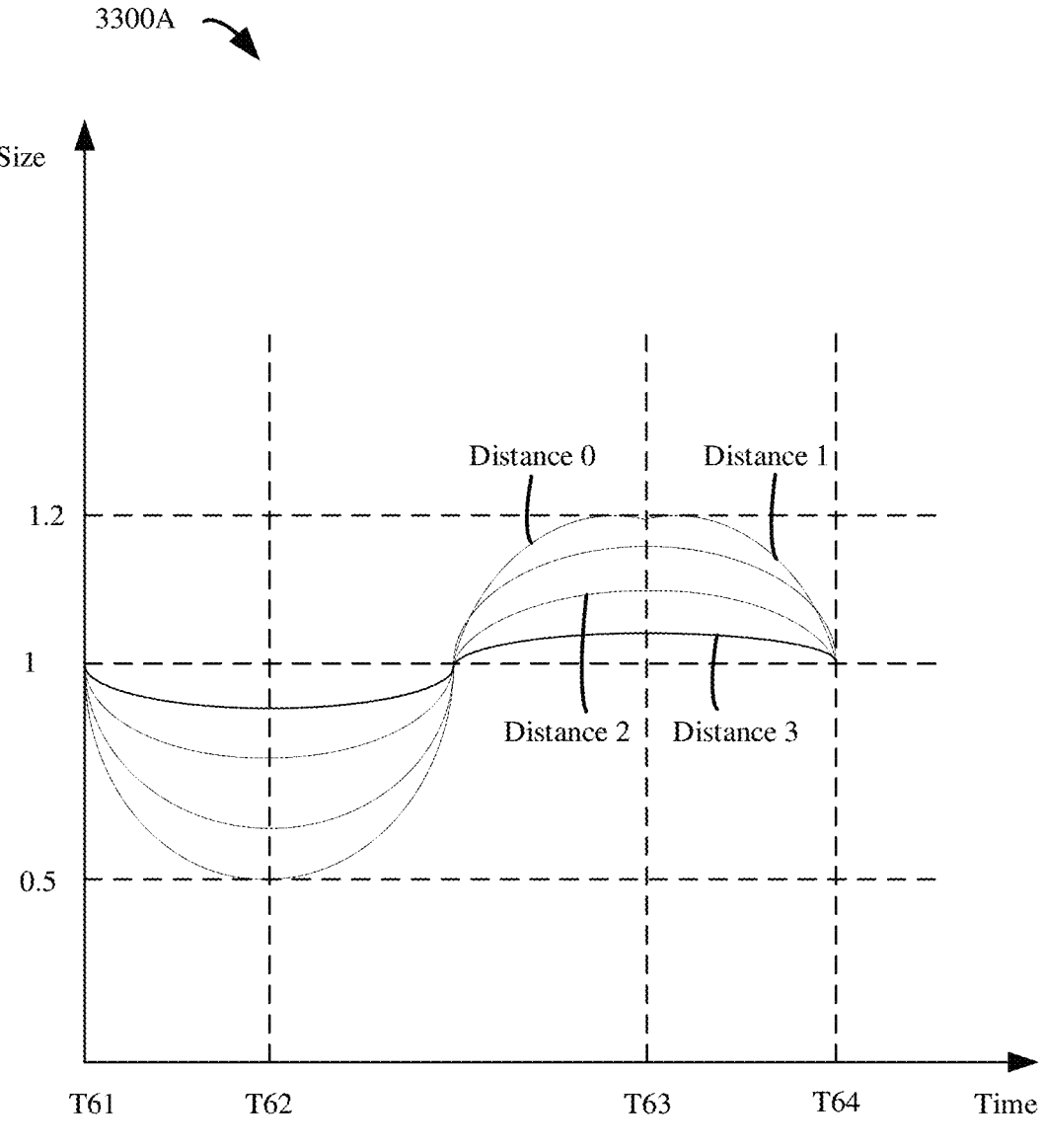
FIG. 33A and FIG. 33B are respectively schematic diagrams of an example size-time curve and an example displacement-time curve of restoring a UI element with a rebound effect according to an embodiment of the present disclosure.
Figure 33B:
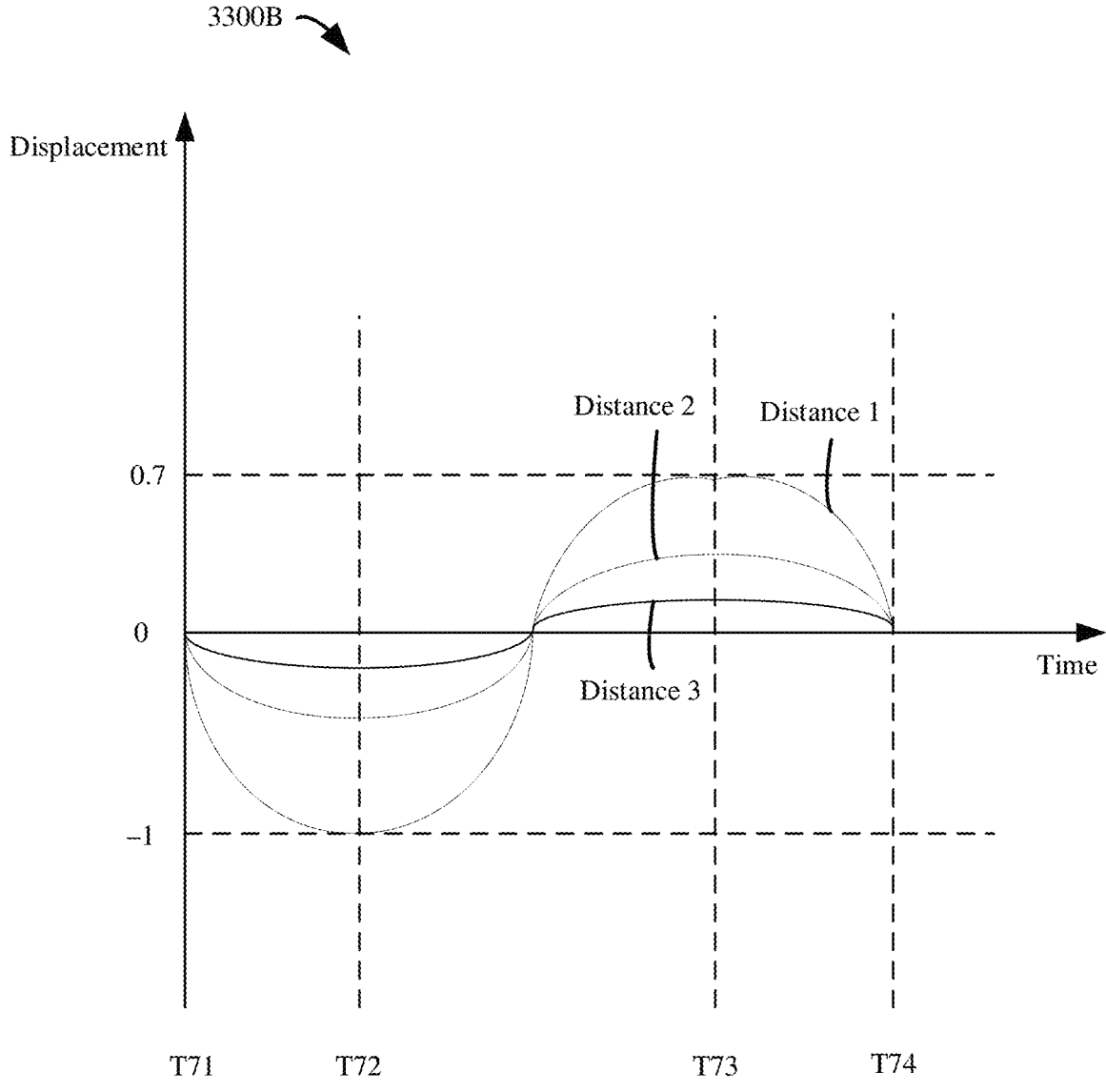

FIG. 33A and FIG. 33B are respectively schematic diagrams of an example size-time curve 3300A and an example displacement-time curve 3300B of restoring a UI element with a rebound effect according to an embodiment of the present disclosure.

With respect to a rebound for scaling, as shown in FIG. 33A, at T61, the UI element 5 is pressed and scaled down. In addition, another UI element (for example, the UI elements 1 to 4 and 6 to 13) is also scaled down accordingly.

At T62, the user releases the hand. In this case, the UI element 5 is scaled down to 0.5 times of an initial size. In addition, the UI element (for example, the UI elements 3, 4, 7, and 8) whose distance is 1 is scaled down accordingly, but a scale-down amplitude of the UI element is less than that of the UI element 5. In addition, the UI element (for example, the UI elements 2, 6, and 9) whose distance is 2 is also scaled down accordingly, but a scale-down amplitude of the UI element is less than that of the UI element whose distance is 1. Further, the UI element (for example, the UI elements 1 and 10 to 13) whose distance is 3 is also scaled down accordingly, but a scale-down amplitude of the UI element is less than that of the UI element whose distance is 2.

During T62 and T63, the UI elements start to rebound for scaling.

At T63, the size of the UI element 5 is increased to 1.2 times of the initial size. In addition, a size of the UI element (for example, the UI elements 3, 4, 7, and 8) whose distance is 1 is increased accordingly, but an increase amplitude of the UI element is less than that of the UI element 5. In addition, a size of the UI element (for example, the UI elements 2, 6, and 9) whose distance is 2 is also increased accordingly, but an increase amplitude of the UI element is less than that of the UI element whose distance is 1. Further, a size of the UI element (for example, the UI elements 1 and 10 to 13) whose distance is 3 is also increased accordingly, but an increase amplitude of the UI element is less than that of the UI element whose distance is 2.

At T64, sizes of all UI elements are restored to initial sizes.

In addition, with respect to a rebound for movement, as shown in FIG. 33B, at T71, the UI element 5 is pressed. Other UI elements move toward the UI element 5.

At T72, the user releases the hand. In this case, a displacement of movement of the UI element (for example, the UI elements 3, 4, 7, and 8) whose distance is 1 toward the UI element 5 is −1. In addition, the UI element (for example, the UI elements 2, 6, and 9) whose distance is 2 also moves toward the UI element 5, but a displacement amplitude of the UI element is less than that of the UI element whose distance is 1. Further, the UI element (for example, the UI elements 1 and 10 to 13) whose distance is 3 also moves toward the UI element 5, but a displacement amplitude of the UI element is less than that of the UI element whose distance is 2.

During T72 and T73, the UI elements start to rebound for movement.

At T73, a displacement of the UI element (for example, the UI elements 3, 4, 7, and 8) whose distance is 1 exceeds an initial position and is +0.7. In addition, a displacement of the UI element (for example, the UI elements 2, 6, and 9) whose distance is 2 also exceeds an initial position, but the displacement amplitude of the UI element is less than that of the UI element whose distance is 1. Further, a displacement of the UI element (for example, the UI elements 1 and 10 to 13) whose distance is 3 also exceeds an initial position, but the displacement amplitude of the UI element is less than that of the UI element whose distance is 2.

At T74, positions of all UI elements are restored to initial positions.

It should be understood that the scaling size (for example, 0.5 times or 1.2 times) and the movement displacement (for example, the displacement of −1 or the displacement of 0.7) in FIG. 33A and FIG. 33B are merely examples, and a UI element may be scaled by a small amplitude with any appropriate size or may move with any appropriate displacement. Further, although a rebound effect of only one rebound is shown in FIG. 33A and FIG. 33B, a rebound effect of a plurality of rebounds may be implemented. A quantity of rebounds may be any appropriate quantity of rebounds. This is not limited herein in the present disclosure. In some embodiments, a rebound amplitude of a plurality of rebounds may be decreased over time.

Figure 33C:
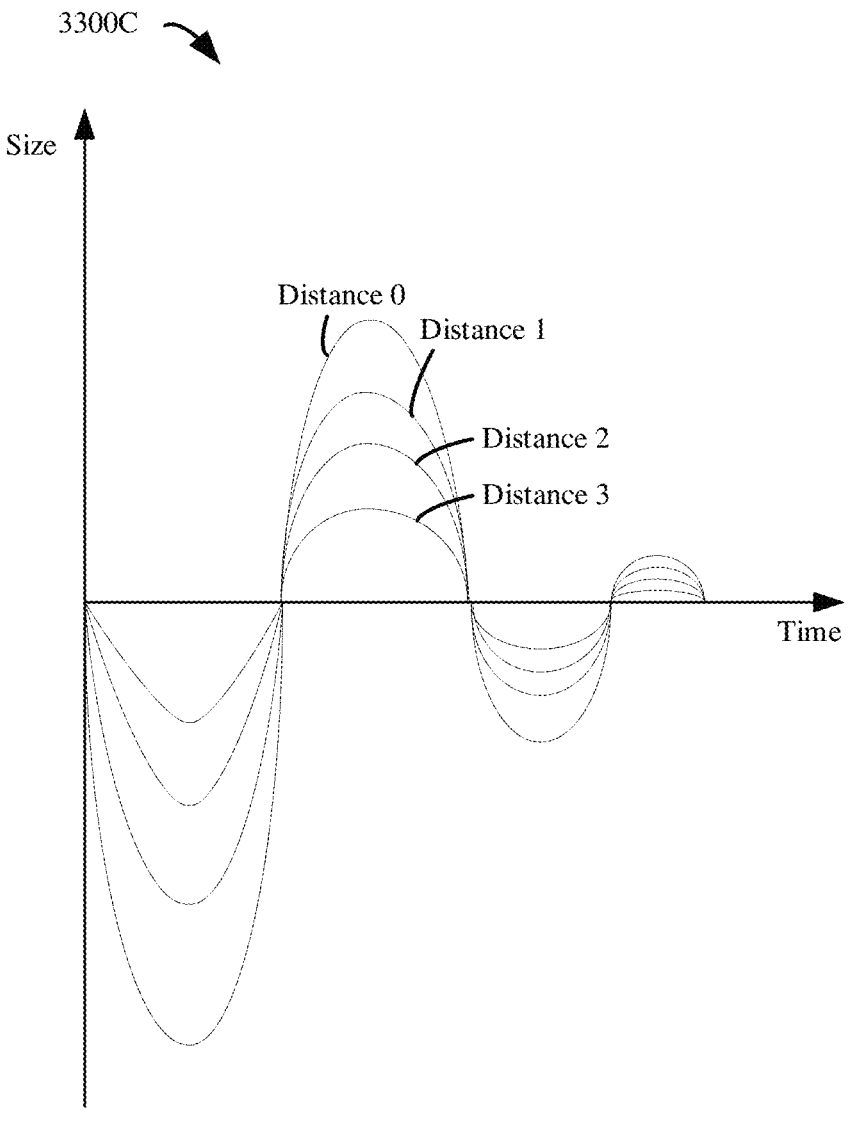
FIG. 33C and FIG. 33D are respectively schematic diagrams of an example size-time curve and an example displacement-time curve of restoring a UI element with a rebound effect of a plurality of rebounds with a decreased rebound amplitude according to an embodiment of the present disclosure.
Figure 33D:
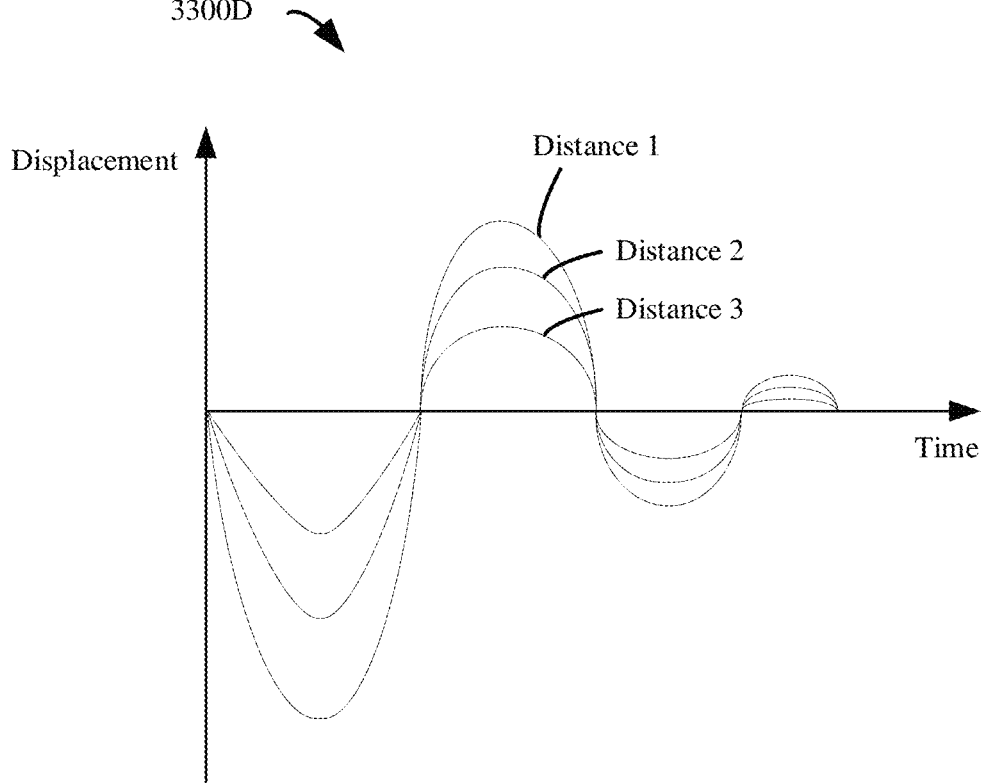
Figure 34:
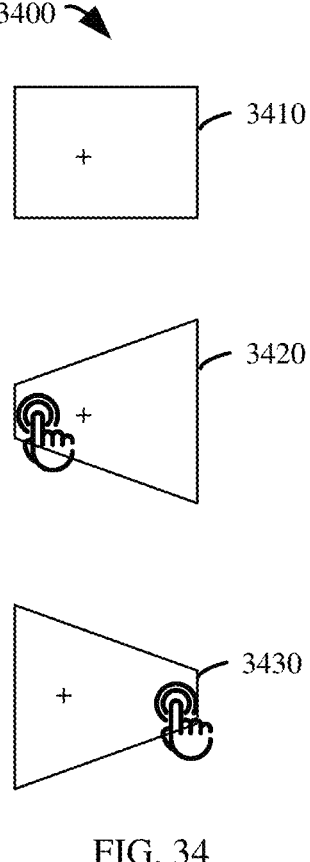
FIG. 34 is a schematic diagram of an example change of a UI element as a rigid body when pressed according to some embodiments of the present disclosure.

FIG. 33C and FIG. 33D are respectively schematic diagrams of an example size-time curve 3300C and a displacement-time curve 3300D of restoring a UI element with a rebound effect of a plurality of rebounds with a decreased rebound amplitude according to an embodiment of the present disclosure.

As shown in FIG. 33C, a UI element is restored to an initial size after a plurality of rebounds. A scaling amplitude of a rebound of the UI element (for example, the UI element 5) whose distance is 0 is greater than that of the UI element (for example, the UI elements 3, 4, 7, and 8) whose distance is 1. The scaling amplitude of the rebound of the UI element whose distance is 1 is greater than that of the UI element (for example, the UI elements 2, 6, and 9) whose distance is 2. The scaling amplitude of the rebound of the UI element whose distance is 2 is greater than that of the UI element (for example, the UI elements 1 and 10 to 13) whose distance is 3.

Similarly, as shown in FIG. 33D, a UI element is restored to an initial position after a plurality of rebounds. A displacement amplitude of a rebound of the UI element (for example, the UI element 5) whose distance is 0 is greater than that of the UI element (for example, the UI elements 3, 4, 7, and 8) whose distance is 1. The displacement amplitude of the rebound of the UI element whose distance is 1 is greater than that of the UI element (for example, the UI elements 2, 6, and 9) whose distance is 2. The displacement amplitude of the rebound of the UI element whose distance is 2 is greater than that of the UI element (for example, the UI elements 1 and 10 to 13) whose distance is 3.

Further, in some embodiments, a rebound effect may also be controlled by a predefined curve (for example, an elastic force curve, a Bessel curve, or the like). For example, these UI elements may rebound for scaling or movement with animation effects controlled by the predefined curve.

Pressure Linkage

Embodiments of the present disclosure relate to linkage of UI elements on a UI for animation effects of pressing, which is also referred to as pressure linkage. During pressure linkage, a pressed target UI element may affect another UI element that is not pressed. Specifically, during pressure linkage, triggering an animation effect of the target UI element may jointly trigger an animation effect of one or more other UI elements, or even other UI elements on the entire UI, so that all the other UI elements are affected by the target UI element. For example, during pressure linkage, when the target UI element is pressed, in addition to the target UI element that presents a pressing effect with an animation effect, another UI element may also present the pressing effect with a corresponding animation effect, to visually present linked pressing.

In this way, linkage between animation effects of different UI elements can be enhanced, and relationships between independent UI elements may be highlighted. Compared with a conventional animation in which animation effects are monotonous and UI elements are independent and unrelated, embodiments of the present disclosure can make an animation effect better comply with a physical rule, and consider a real use scenario and users' use habits, thereby significantly improving user experience.

The following describes some example embodiments of pressure linkage with reference to FIG. 34 to FIG. 46.

Pressure linkage may occur on a UI with any appropriate regular or irregular layout, and UI elements on the UI may have any appropriate size and shape. For example, pressure linkage may occur on the UIs 300A to 300C shown in FIG. 3A to FIG. 3C.

In this way, linkage between animation effects of different UI elements can be enhanced, and relationships between independent UI elements may be highlighted. Compared with a conventional animation in which animation effects are monotonous and UI elements are independent and unrelated, embodiments of the present disclosure can make an animation effect better comply with a physical rule, and consider a real use scenario and users' use habits, thereby significantly improving user experience.

The following describes some example embodiments of pressure linkage with reference to FIG. 34 to FIG. 46.

Pressure linkage may occur on a UI with any appropriate regular or irregular layout, and UI elements on the UI may have any appropriate size and shape. For example, pressure linkage may occur on the UIs 300A to 300C shown in FIG. 3A to FIG. 3C.

In this case, the UI element may be considered as a warped plate with both ends connected to springs, and pressing the UI element may be considered as pressing the spring on one side and stretching the spring on the other side, thereby implementing an overall animation effect that the UI element is rotated around the reference point of the UI element.

Figure 35:
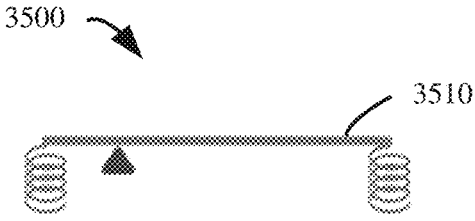
FIG. 35 is a schematic diagram of an example of pressing and stretching springs to simulate pressing of a UI element according to some embodiments of the present disclosure.
Figure 35:
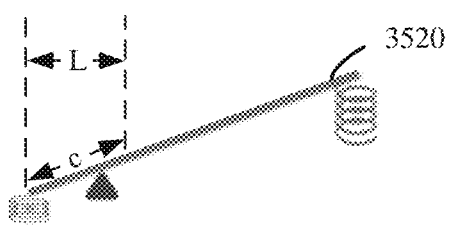
Figure 35:
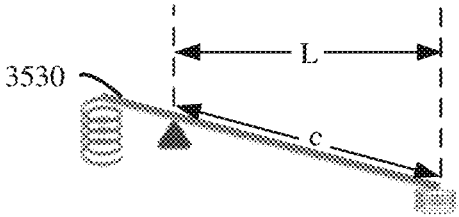

FIG. 35 is a schematic diagram of an example of pressing and stretching springs 3500 to simulate pressing of a UI element according to some embodiments of the present disclosure. 3510 shows springs on two sides in initial states. 3520 shows that when the pressed position is on the left side of the UI element, the spring on the left side is pressed, and the spring on the right side is stretched. 3530 shows that when the pressed position is on the right side of the UI element, the spring on the right side is pressed and the spring on the left side is stretched.

In this case, a spring model may be represented by using the following equation (9):

$$k' = \frac{L}{c} \tag{9}$$

L represents a horizontal distance between the pressed position and the reference point of the UI element, c represents a straight-line distance between the pressed position and the reference point, and k' represents an elasticity coefficient of the spring.

Further, the foregoing equation (9) may be transformed into a form of the following equation (10):

$$-k'x' - g'\frac{dx'}{dT} = m'\frac{d^2x'}{dT^2} \tag{10}$$

k' represents the elasticity coefficient of the spring, x' represents a deformation amount of the spring, g' represents a damping coefficient of the spring, T represents deformation time, and m' represents a size of the UI element.

Further, in some embodiments, the UI element may be considered as a non-rigid body. In this case, when pressing performed on the UI element is detected, the UI element may be visually depressed or protruded relative to the pressed position, to present the pressing effect.

Figures 36, 37:
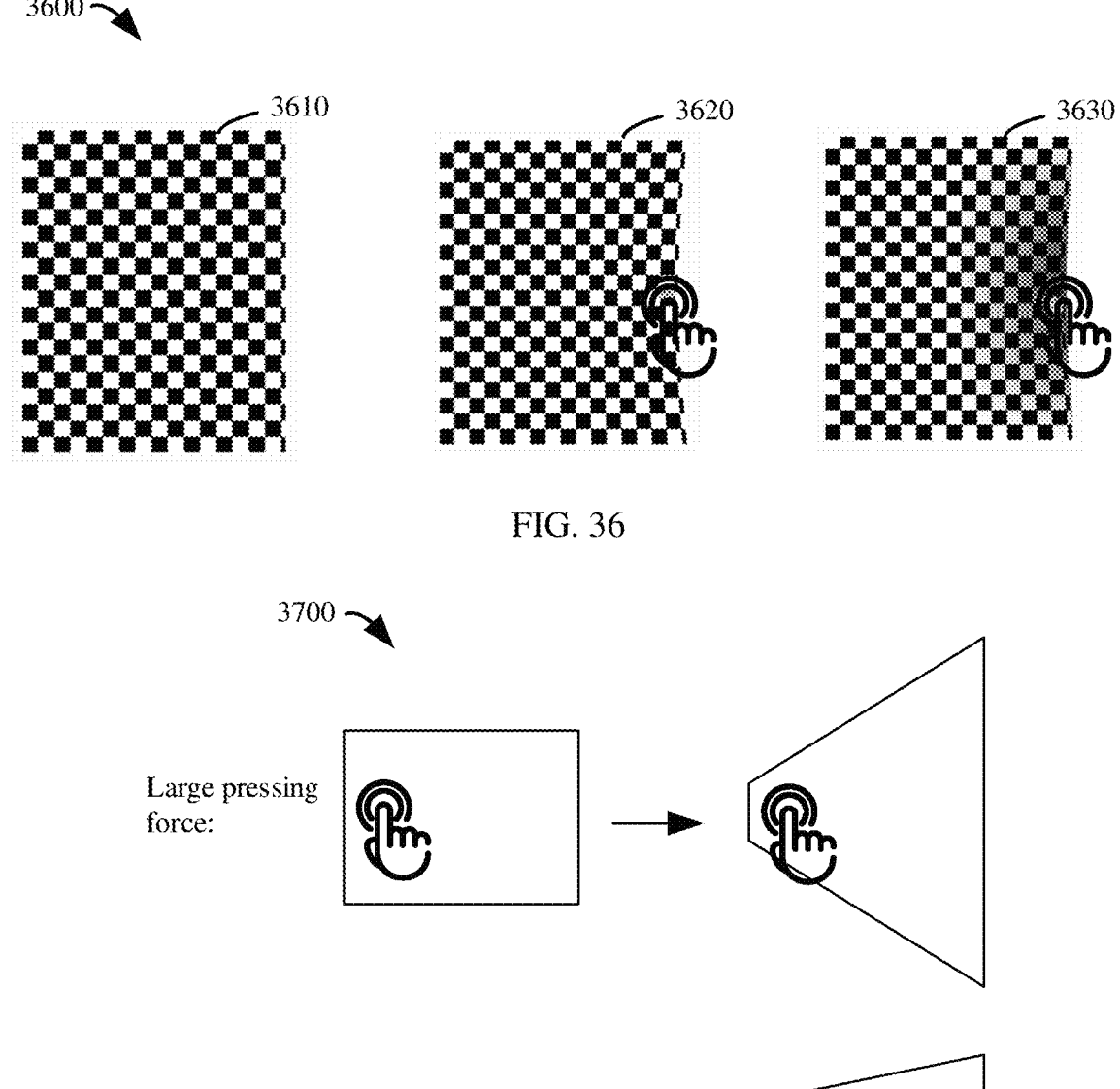
FIG. 36 is a schematic diagram of an example change of a UI element as a non-rigid body when pressed according to some embodiments of the present disclosure.
FIG. 37 is a schematic diagram of an example change of a UI element when pressed by using different forces according to some embodiments of the present disclosure.

FIG. 36 is a schematic diagram of an example change 3600 of a UI element as a non-rigid body when pressed according to some embodiments of the present disclosure. As shown in FIG. 36, the UI element may be considered as a grid diagram. When pressing performed on the UI element is detected, an initial UI element 3610 may be changed with an animation effect, to visually be depressed or protruded relative to the pressed position. For example, coordinates of a grid in the initial UI element 3610 may be changed, thereby changing to a UI element 3620 that is depressed relative to the pressed position. In addition, in some embodiments, a color (for example, hue, brightness, and saturation) of the UI element may also be changed to highlight the pressing. For example, the initial UI element 3610 may alternatively be changed to a UI element 3630 that is depressed relative to the pressed position and whose color is deeper. It should be understood that a color change may also be applicable to a UI element as a rigid body.

In some embodiments, after the UI element is changed, the pressed position may no longer be within a scope of a changed UI element. In this case, because the pressed position is still within a scope of the UI element before the change, or in any other appropriate scope, the pressing may continue to be detected as pressing on the UI element. Optionally, because the pressed position is no longer within the scope of the changed UI element, the pressing is not detected as pressing on the UI element. In this case, it may be considered that the pressing ends.

The following describes embodiments of the present disclosure by using an example in which the UI element moves its position relative to the pressed position in a warping manner visually. However, it should be understood that the UI element may alternatively be changed in another manner, for example, depressed or protruded visually relative to the pressed position.

In addition, in some embodiments, to enable a change of the UI element to comply with a natural law and users' use habits, a change amplitude may depend on a magnitude of a pressing force. In the real world, the magnitude of the force is usually a magnitude of a real force. In this case, a greater pressing force indicates a greater change of the UI element. In some embodiments, the pressing force may be a pressing force that is applied by the user and that is detected by the electronic device. Optionally, the pressing force may alternatively be a preset pressing force set by the electronic device or the user.

FIG. 37 is a schematic diagram of an example change 3700 of a UI element when pressed by using different forces according to some embodiments of the present disclosure. As shown in FIG. 37, when the pressing force is large, the UI element may be changed (for example, rotated) to a larger extent. In contrast, when the pressing force is small, the UI element may be changed to a smaller extent. However, this is not limited thereto in embodiments of the present disclosure. A change manner of the UI element in response to different forces of pressing is configurable by the electronic device or the user. For example, when the pressing force is large, the UI element may be changed to a smaller extent, and when the pressing force is small, the UI element may be changed to a larger extent.

Further, in the electronic device, there may be a relatively high requirement on the user for a change completely based on a real pressing force, and the electronic device may need to be equipped with related hardware. Therefore, in some embodiments, the pressing force may be simulated or replaced by pressing duration. For example, if the pressing duration is longer, it may be considered that the pressing force is larger, and therefore, a change is greater.

Figures 38, 39:
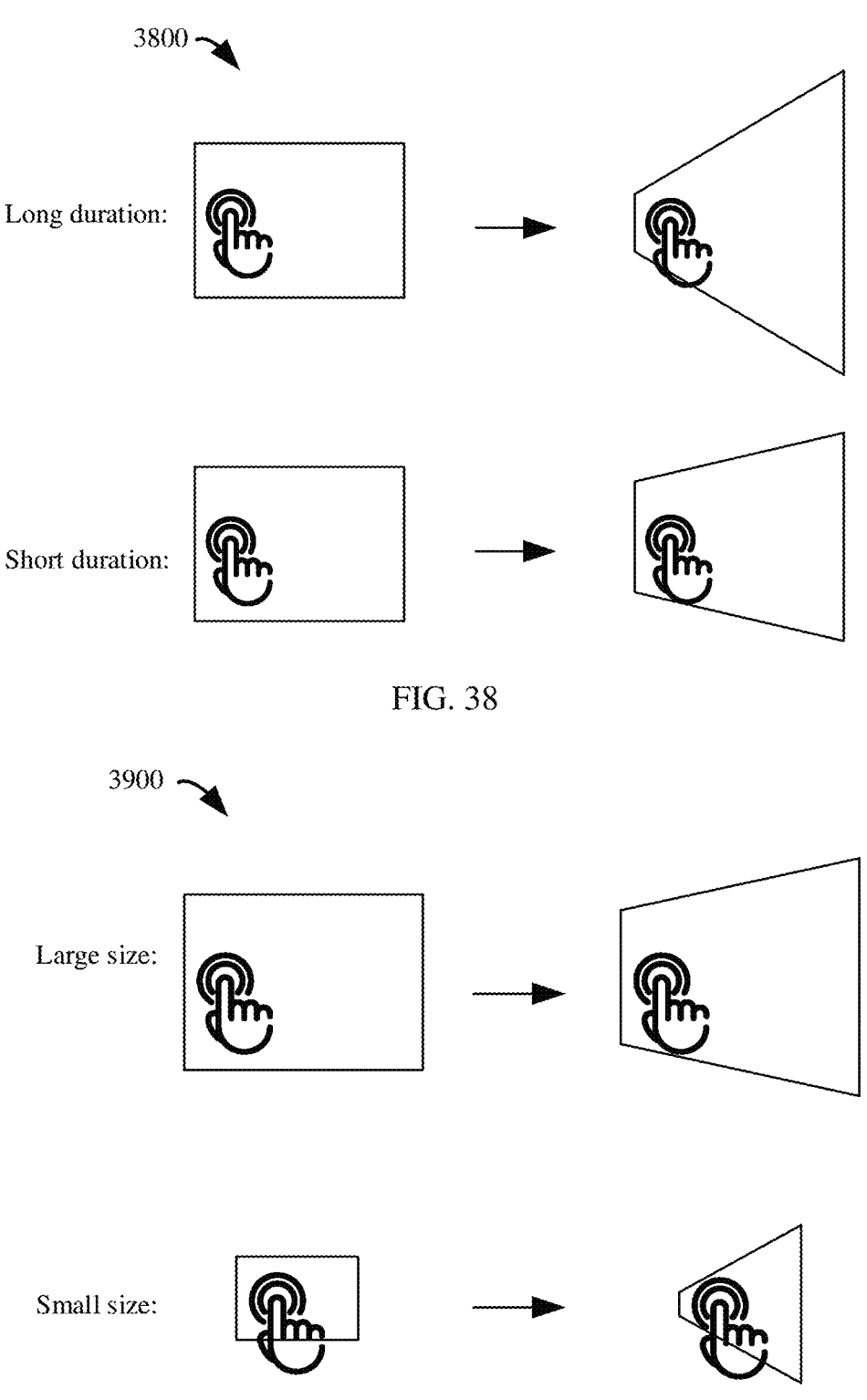
FIG. 38 is a schematic diagram of an example change of a UI element when pressed for different duration according to some embodiments of the present disclosure.
FIG. 39 is a schematic diagram of an example change of a UI element at different sizes according to some embodiments of the present disclosure.

FIG. 38 is a schematic diagram of an example change 3800 of a UI element when pressed for different duration according to some embodiments of the present disclosure. As shown in FIG. 38, when the pressing duration is long, the UI element may be changed (for example, rotated) to a larger extent. In contrast, when the pressing duration is short, the UI element may be changed to a smaller extent.

However, this is not limited thereto in embodiments of the present disclosure. A change manner of the UI element in response to different duration of pressing is configurable by the electronic device or the user. For example, when the pressing duration is long, the UI element may be changed to a smaller extent, and when the pressing duration is short, the UI element may be changed to a larger extent.

In addition, in some embodiments, to further enable a change of the UI element to comply with a natural law and users' use habits, a change amplitude may depend on a size of the UI element. For example, visually, under same pressing, it may be difficult to press a large UI element but it is easy to press a small UI element. In this case, impact of pressing on a relatively large UI element may be small, and impact of pressing on a relatively small UI element may be large.

FIG. 39 is a schematic diagram of an example change 3900 of a UI element at different sizes according to some embodiments of the present disclosure. As shown in FIG. 39, when the size of the UI element is large, the UI element may be changed to a larger extent. In contrast, when the size of the UI element is small, the UI element may be changed to a smaller extent.

However, this is not limited thereto in embodiments of the present disclosure. A change manner of the UI element at different sizes is configurable by the electronic device or the user. For example, when the size of the UI element is large, the UI element may be changed to a smaller extent, and when the size of the UI element is small, the UI element may be changed to a larger extent.

In addition, in some embodiments, to improve user experience, an amplitude of changing the UI element may be limited, so that the UI element can be changed only within an allowed amplitude range. For example, the amplitude range may be any appropriate range, for example, a rotation angle of 0 to 60 degrees of the UI element, a grayscale of 10% to 50% of a color change of the UI element, or a coordinate change of 100 to 10000 pixels of a grid in the UI element. For example, it is assumed that the amplitude range is that the rotation angle of the UI element is from 0 to 60 degrees. In this case, regardless of the predetermined pressing force and pressing duration, the pressed UI element can be rotated only by 60 degrees around the reference point at most, and cannot be rotated with a greater amplitude.

The foregoing describes in detail a change of the pressed UI element. As described above, during pressure linkage, the pressed target UI element may affect another UI element that is not pressed. Specifically, during pressure linkage, triggering an animation effect of the target UI element may jointly trigger an animation effect of one or more other UI elements, or even other UI elements on the entire UI, so that all the other UI elements are affected by the target UI element. For example, during pressure linkage, when the target UI element is pressed for a period of time, in addition to the target UI element that is changed with an animation effect, another UI element may also be changed with a corresponding animation effect, to visually present linked pressing. Therefore, the following describes pressure linkage in detail with reference to FIG. 40 to FIG. 46.

Figure 40:
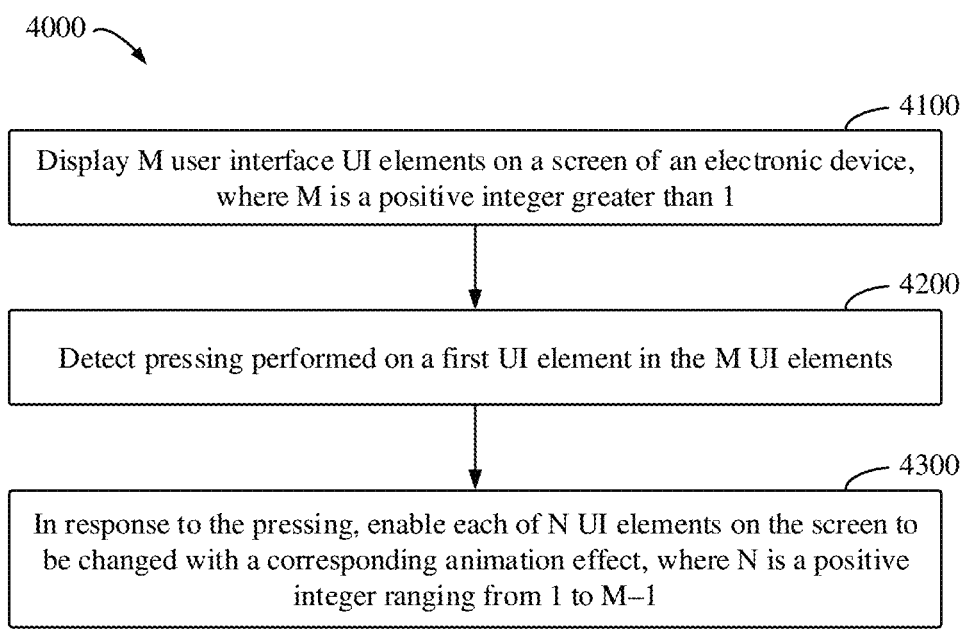
FIG. 40 is a flowchart of a graphical interface display method according to an embodiment of the present disclosure.

FIG. 40 is a flowchart of a graphical interface display method 4000 according to an embodiment of the present disclosure. It should be understood that the method 4000 may be performed by the electronic device 100 described with reference to FIG. 1 or the electronic device 200 described with reference to FIG. 2. The method 4000 is described herein with reference to the UI 300A in FIG. 3A. However, it should be understood that the UI 300A is merely an example, and the method 2500 is applicable to any suitable interface, including but not limited to the UIs 300B and 300C.

In a block 4010, M user interface UI elements are displayed on a screen of an electronic device. M is a positive integer greater than 1. For example, the M UI elements may be the UI elements 1 to 13.

In a block 4020, pressing performed on a first UI element in the M UI elements is detected. For example, the first UI element may be the UI element 5. As described above, pressing performed on the first UI element causes the first UI element to rotate, to present a pressing effect.

In a block 4030, in response to the pressing detected at the first UI element, each of N UI elements on the screen is changed with a corresponding animation effect. N is a positive integer ranging from 1 to M−1. Therefore, linked pressing is visually indicated.

Figure 41:
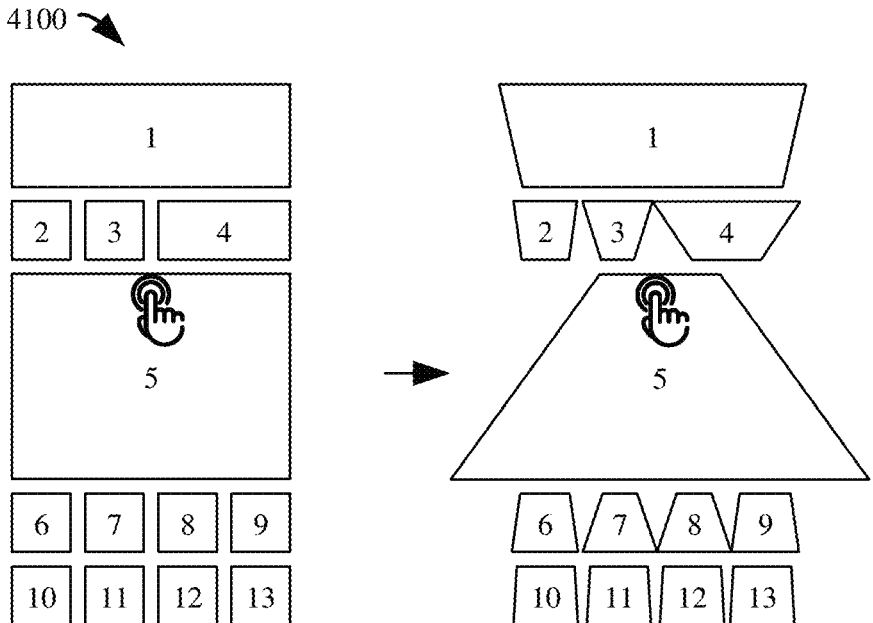
FIG. 41 is a schematic diagram of an example of pressure linkage of N UI elements according to an embodiment of the present disclosure.

In some embodiments, a direction in which the N UI elements are changed relative to the pressed position may be a direction in which each of the N UI elements points to the pressed position. In some embodiments, the direction may be a direction from a corresponding reference point of each of the N UI elements to a reference point of the pressed UI element. In this case, the pressed position is a change reference point for the change of the N elements. In other words, the pressed position is visually indicated as a center of the pressing. FIG. 41 is a schematic diagram of an example of pressure linkage 4000 of N UI elements according to an embodiment of the present disclosure. As shown in FIG. 41, the UI element 5 is pressed, so that the UI element 5 rotates to present a pressing effect. In addition, in response to the pressing, other UI elements (for example, the UI elements 1 to 4 and 6 to 13) on the screen also rotate relative to the pressed position with different amplitudes, to present the pressing effect. Therefore, linked pressing is visually presented.

Figure 42:
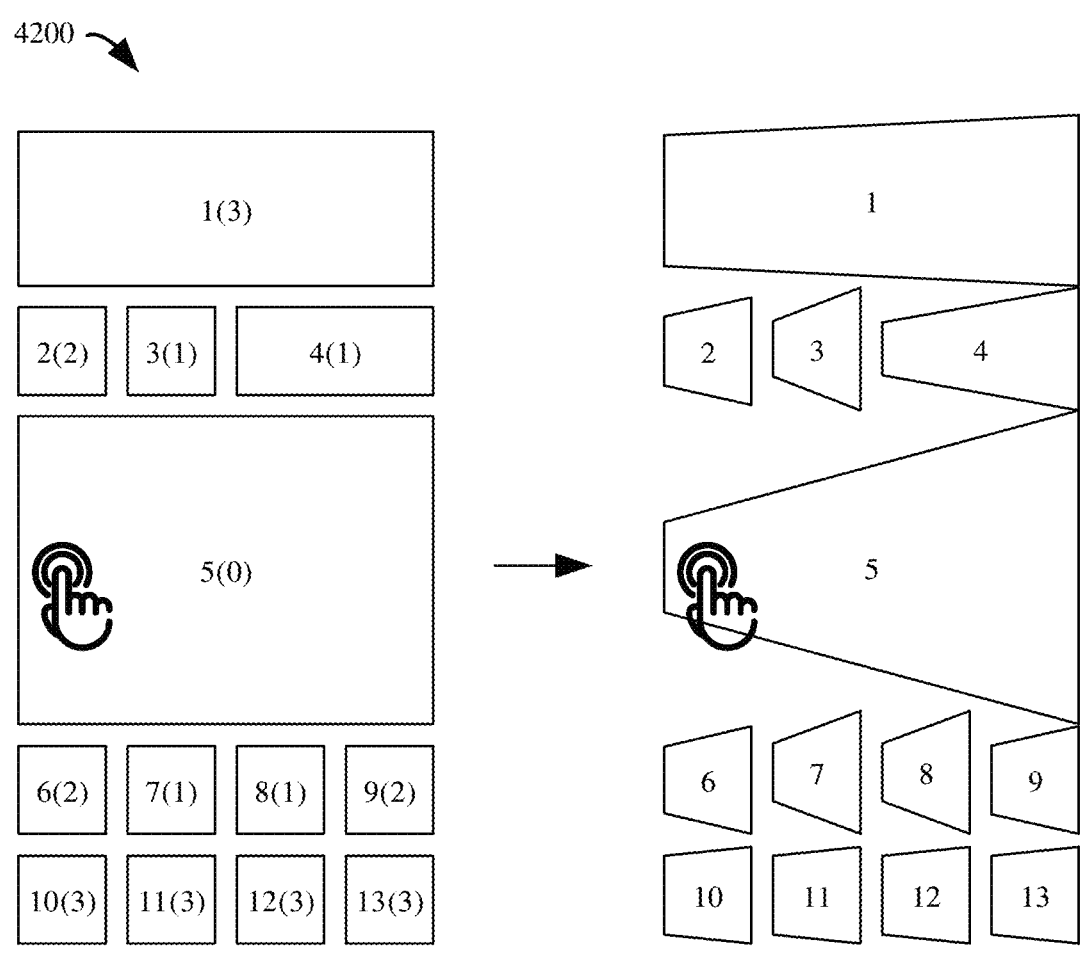
FIG. 42 is a schematic diagram of another example of pressure linkage of N UI elements according to an embodiment of the present disclosure.

Optionally, a change direction of the N UI elements relative to the pressed position may be the same as a change direction of the pressed UI element. FIG. 42 is a schematic diagram of another example of pressure linkage 4000 of N UI elements according to an embodiment of the present disclosure. As shown in FIG. 42, the UI element 5 is pressed, so that the UI element 5 rotates to present a pressing effect. In addition, in response to the pressing, other UI elements (for example, the UI elements 1 to 4 and 6 to 13) on the screen also rotate in a same direction as the UI element 5 and with different amplitudes, to present the pressing effect. In this case, change reference points of the N elements are reference points of the N elements. Therefore, linked pressing is visually presented.

For clarity, FIG. 41 and FIG. 42 show only pressure linkage of the UI elements 1 to 13 on the UI 300A. It should be understood that pressure linkage may occur between any at least two UI elements on any UI, for example, between any at least two UI elements on the UIs 300A to 300C.

In some embodiments, pressure linkage may be used in all UI elements on the screen. In this case, it may be determined that M−1 UI elements in the M UI elements other than the first UI element is the N UI elements. Optionally, pressure linkage may be applied only to some UI elements on the screen. In this case, an impact area of the first UI element may be determined based on a size of the first UI element, and UI elements that are in the M UI elements and that are in the impact area are determined as the N UI elements. For example, a larger size of the first UI element may indicate a larger impact area of the first UI element. Optionally, the impact area may also be narrowed with size reduction. This is not limited herein in the present disclosure. For example, the impact area may be a circle that uses a reference point of the first UI element as a center and that has a predetermined radius. It should be understood that the impact area may be any suitable area having any shape. For example, the impact area is a rectangle, a diamond, or the like having a predetermined size. The impact area may be configurable by the electronic device and the user. This is not limited herein in the present disclosure.

In addition, in some embodiments, a UI element that intersects with the impact area may be considered as in the impact area. Optionally, when the impact area is a circle having a predetermined radius, if a distance between a UI element and the first UI element is shorter than the predetermined radius of the impact area, the UI element may be considered as in the impact area.

Figure 43:
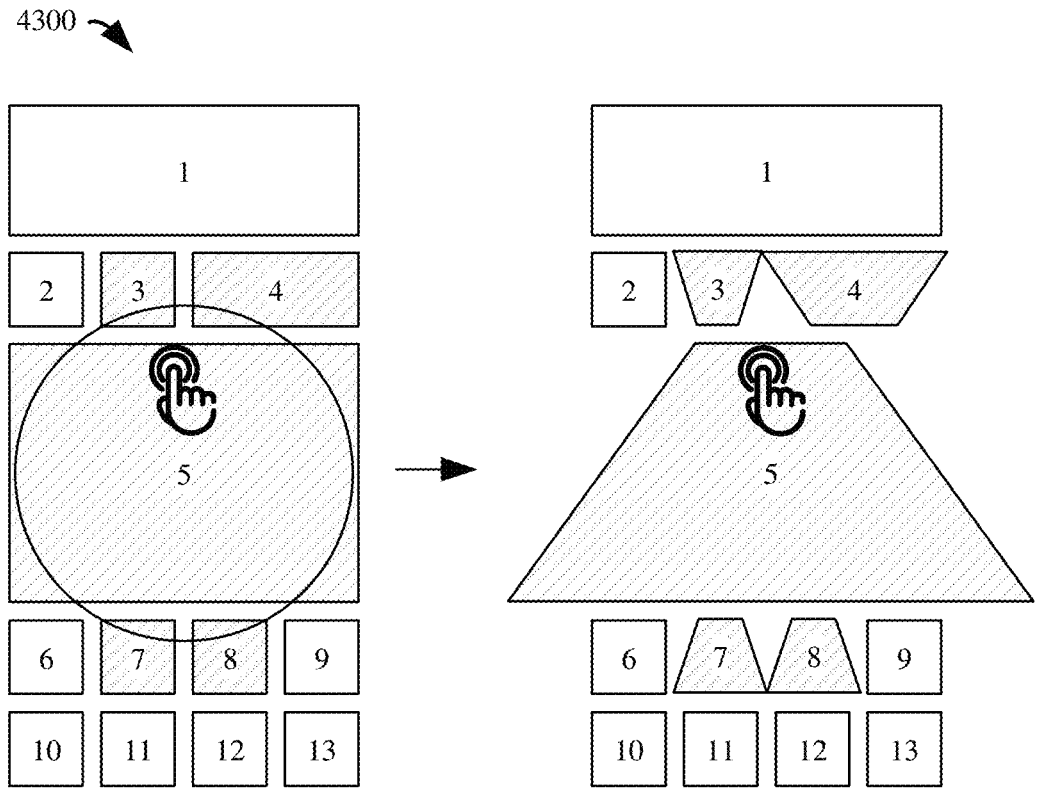
FIG. 43 is a schematic diagram of an example impact area of a UI element according to an embodiment of the present disclosure.

FIG. 43 is a schematic diagram of an example impact area 4300 of a UI element according to an embodiment of the present disclosure. As shown in FIG. 43, because the UI elements 3, 4, 7, and 8 are in an impact area 4310 of the UI element 5, the UI elements 3, 4, 7, and 8 are changed accordingly with the UI element 5. In addition, because the UI elements 1, 2, 6, and 9 to 13 are not in the impact area 4310 of the UI element 5, the UI elements 1, 6, and 9 to 13 are not changed accordingly with the UI element 5.

Refer to FIG. 40 again. To enable the N UI elements to be changed with corresponding animation effects, a distance between the first UI element and each of the N UI elements may be determined. As described above, in some embodiments, distances may be classified into a plurality of distance levels based on a range in which a distance is located. For example, a distance level of an operated UI element may be 0, and a distance level of a linked UI element may be 1, 2, 3, . . . , based on a distance between the linked UI element and the operated UI element. UI elements at a same distance level may be considered as having a same distance to the operated UI element. Therefore, linkage between UI elements may be simplified by using the distance level, so that UI elements at a same distance level are linked in a same manner, thereby improving linkage consistency and coordination. However, it should be understood that during linkage, the distance may alternatively be used, so that UI elements are linked more precisely. In the following, the distance level may be interchangeably referred to as the distance.

In the foregoing, a manner of determining the distance between the first UI element and a second UI element in the N UI elements is described with reference to FIG. 10 to FIG. 14B. Therefore, descriptions thereof are omitted herein.

Refer to FIG. 40 again. After the distance between the first UI element and the second UI element is determined, an animation effect of changing the second UI element may be determined based on the distance. Optionally, if the distance between the first UI element and the second UI element is longer, an amplitude of changing the second UI element may be smaller, to visually indicate smaller impact of pressing on a remote UI element. Optionally, if the distance between the first UI element and the second UI element is longer, the amplitude of changing the second UI element may also be greater, to visually indicate greater impact of pressing on a remote UI element.

In some embodiments, to determine the amplitude of changing the second UI element, a first amplitude of changing the first UI element in response to the pressing may be determined. In some embodiments, the first amplitude of changing the first UI element may be determined based on various factors associated with the first UI element. These factors may include but are not limited to the size of the first UI element, a position of a first reference point of the first UI element, an amplitude range of changing the first UI element, the pressed position, pressing duration, and the predetermined pressing force. The foregoing describes in detail impact of these factors on an amplitude of changing a UI element. Therefore, descriptions thereof are omitted herein.

Then, the amplitude of changing the second UI element in response to the pressing may be determined based on the first amplitude and the distance between the first UI element and the second UI element. The transmission manner described in detail above may be used to implement how to transmit the amplitude of changing the first UI element to the second UI element, to obtain the amplitude of changing the second UI element. A difference lines in that during pressure linkage, $x''$ in the transmission equations (7) and (8) represents an amplitude of changing a UI element (for example, the second UI element) that is changed accordingly, and x in the transmission equations (7) and (8) represents an amplitude of changing a pressed UI element (for example, the first UI element). Therefore, descriptions thereof are omitted herein.

In this way, because the amplitude of changing the second UI element is determined by the amplitude of changing the first UI element and the distance between the second UI element and the first UI element, pressure linkage that is intuitive and natural and complies with users' use habits may be implemented.

In addition, in some embodiments, a size of the second UI element may also affect the animation effect of changing the second UI element. In this case, the size of the second UI element may also be considered to determine the animation effect of changing the second UI element. For example, if the second UI element is larger, the amplitude of changing the second UI element may be greater. Optionally, if the second UI element is larger, the amplitude of changing the second UI element may be smaller. Therefore, in some embodiments, the amplitude of changing the second UI element in response to the pressing may be determined based on the first amplitude, the distance, and the size of the second UI element.

In addition, in some embodiments, the size of the first UI element may also affect the animation effect of changing the second UI element. In this case, the size of the first UI element may also be considered to determine the animation effect of changing the second UI element. For example, a larger size of the first UI element indicates larger linkage impact that may be generated by the first UI element. Therefore, the amplitude of changing the second UI element may be in direct proportion to the size of the first UI element. Therefore, in some embodiments, the amplitude of the second UI element may be determined based on the first amplitude, the distance, and the size of the first UI element.

Further, as described above, both the size of the first UI element and the size of the second UI element may affect the animation effect of changing the second UI element. Therefore, in some embodiments, the amplitude of changing the second UI element may be determined based on the first amplitude, the distance, the size of the first UI element, and the size of the second UI element.

Refer to FIG. 40 again. After the animation effect of changing of the second UI element is determined, the second UI element may be enabled to be changed with the animation effect, to visually indicate that the second UI element is changed with the pressing performed on the first UI element. The N UI elements may be enabled to be changed with respective animation effects, to visually indicate the pressing on the entire screen or a part of the screen, thereby presenting pressing linkage.

Figure 44:
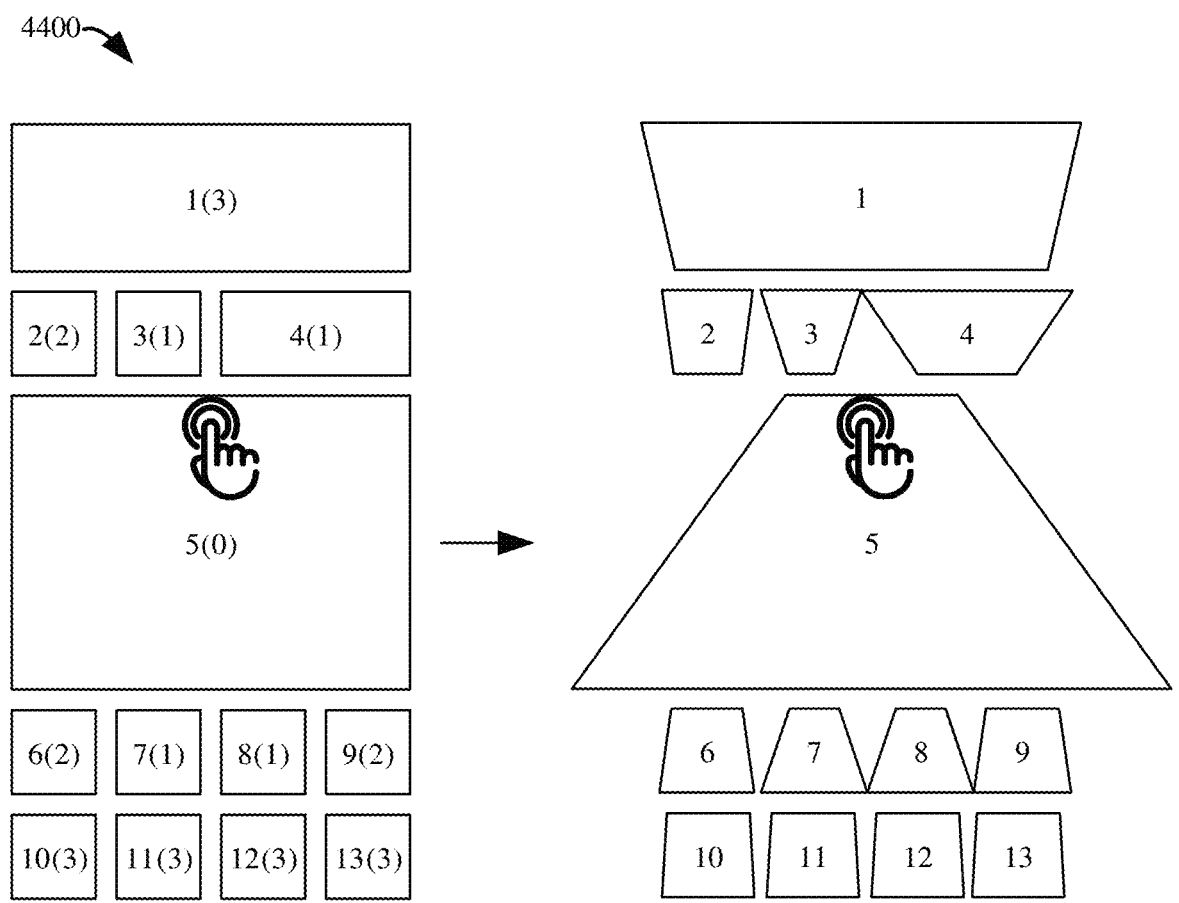
FIG. 44 is a schematic diagram of an example change of a UI element based on a distance according to an embodiment of the present disclosure.

FIG. 44 is a schematic diagram of an example change 4400 of a UI element based on a distance according to an embodiment of the present disclosure. As shown in FIG. 4400, an amplitude of changing the UI element (for example, the UI element 5) whose distance is 0 is greater than that of a UI element (for example, the UI elements 3, 4, 7, and 8) whose distance is 1, the amplitude of changing the UI element whose distance is 1 is greater than that of a UI element (for example, the UI elements 2, 6, and 9) whose distance is 2, and the amplitude of changing the UI element whose distance is 2 is greater than that of a UI element (for example, the UI elements 1 and 10 to 13) whose distance is 3.

In addition, in some embodiments, to better present transmission of an animation effect and improve user experience, the first UI element and the second UI element are not changed at the same time. For example, the first UI element may start to be changed when the pressing occurs, and the second UI element may start to be changed after the pressing occurs for a period of time. Therefore, in some embodiments, a delay time may be determined based on the distance between the first UI element and the second UI element, and the second UI element may be enabled to be changed in response to the pressing after the delay time. Further, in some embodiments, a delay coefficient may be determined, and the delay time is determined based on the distance and the delay coefficient. For example, the delay time may be a quotient of the distance divided by the delay coefficient. The delay coefficient may be configurable by the electronic device and the user.

Figure 45:
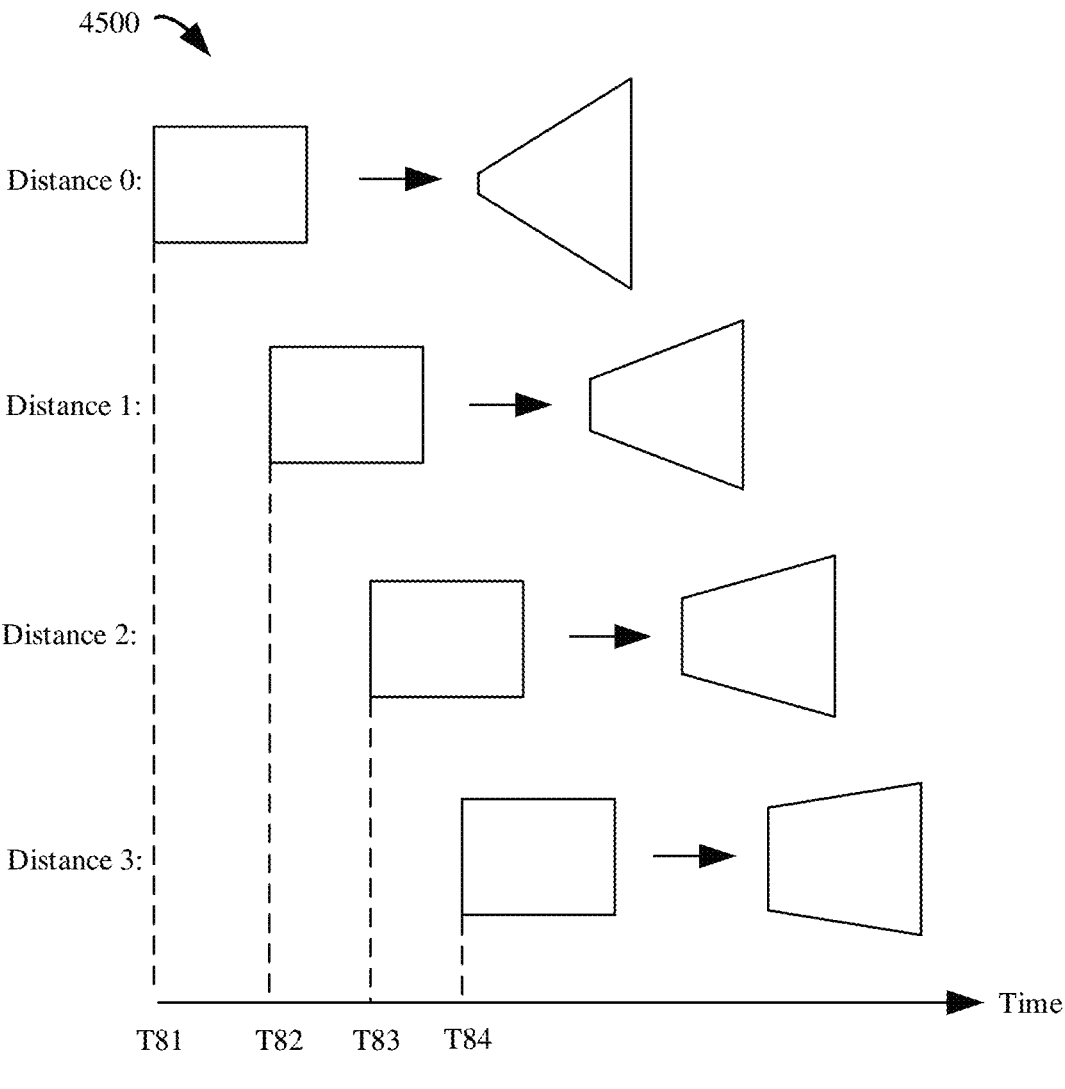
FIG. 45 is a schematic diagram of an example delay time according to an embodiment of the present disclosure.

FIG. 45 is a schematic diagram of an example delay time 4500 according to an embodiment of the present disclosure. As shown in FIG. 45, the first UI element (for example, the UI element 5) whose distance is 0 starts to be changed at a time T81 when the pressing occurs, the UI element (for example, the UI elements 3, 4, 7, and 8) whose distance is 1 starts to be changed at a subsequent time T82, the UI element (for example, the UI elements 2, 4, 6, and 9) whose distance is 2 starts to be changed at a later time T83, and the UI element (for example, the UI elements 1 and 10 to 13) whose distance is 3 starts to be changed at latest T84.

In addition, in some embodiments, a change speed of a UI element may be controlled by a predefined curve in which an amplitude changes over time. For example, the predefined curve may be a Bessel curve or an elastic force curve. In a case of an elastic force curve, the change speed may be controlled by controlling a damping coefficient and a stiffness coefficient of a spring. In a case of a Bessel curve, the change speed may be controlled by controlling coordinates of at least one of at least one control point of the Bessel curve.

In addition, in some embodiments, a changed UI element may be restored after the pressing ends (for example, after the user lifts the finger away from the screen). Specifically, both the pressed UI element and the N UI elements that are changed accordingly may be restored. Therefore, in some embodiments, the changed second UI element may be restored to the second UI element before the change. A restoration process may be an inverse process of the change, and therefore detailed description thereof is omitted herein.

Figure 46A:
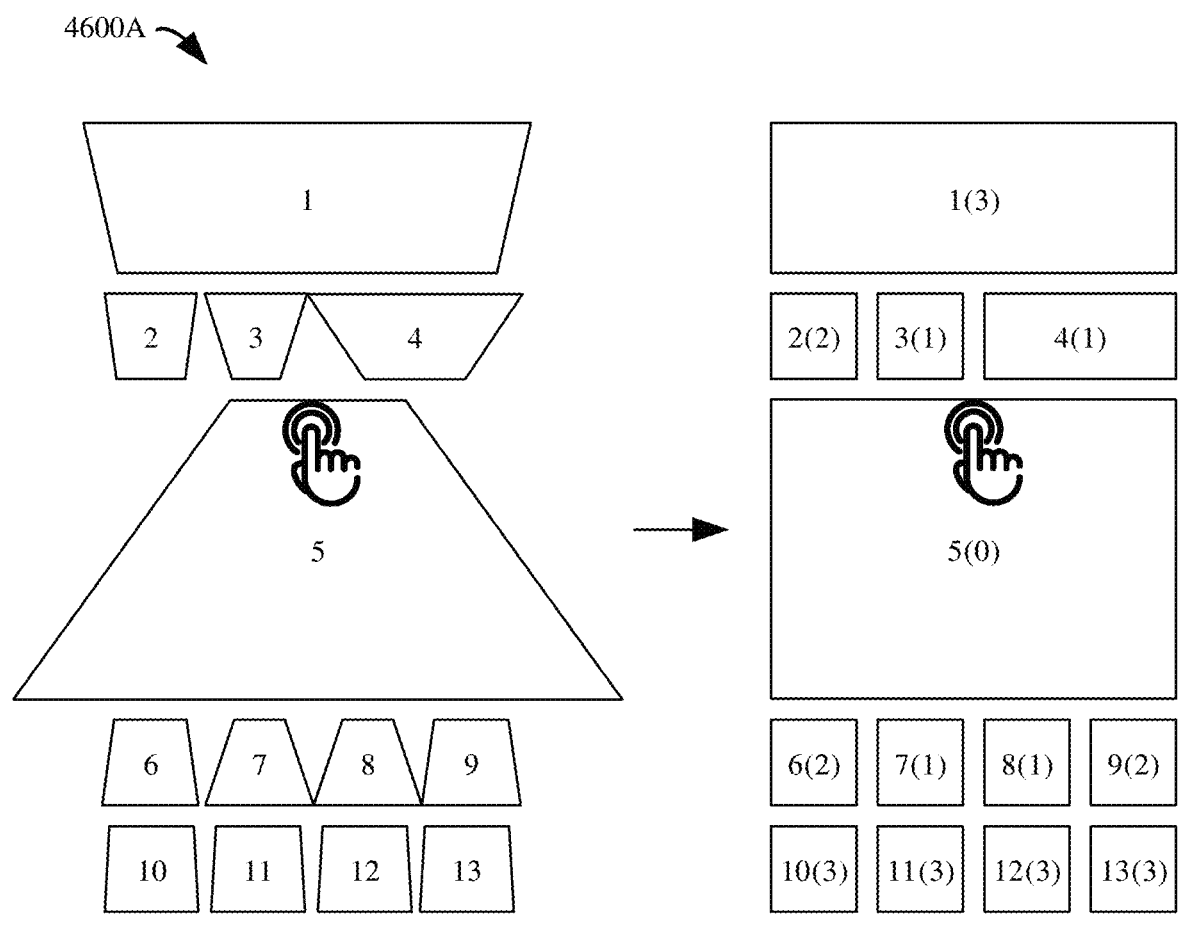
FIG. 46A is a schematic diagram of an example of restoring a UI element according to an embodiment of the present disclosure.

FIG. 46 is a schematic diagram of an example of restoration 4600 of a UI element according to an embodiment of the present disclosure. As shown in FIG. 46, all changed UI elements (for example, the UI elements 1 to 13) are restored to initial forms before the change.

In some embodiments, restoration of the change may have a rebound effect. For example, after the user releases the hand, a change of a UI element may be from the left side being pressed while the right side being tilted, to the left side being tilted while the right side being pressed, and then to an initial shape. In other words, after the user releases the hand, an effect that the UI element is flipped and then restored is visually presented.

Figure 46B:
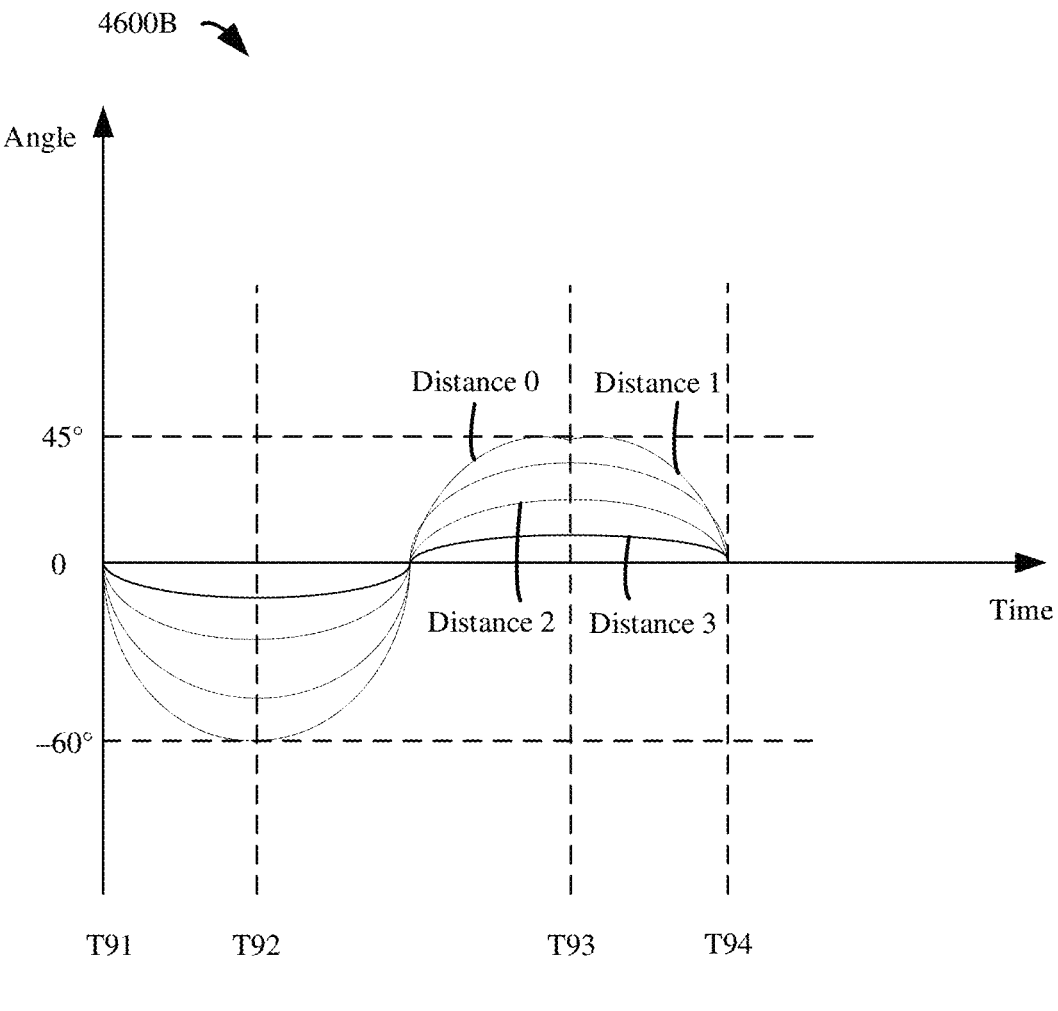
FIG. 46B is a schematic diagram of an example angle-time curve of restoring a UI element with a rebound effect according to an embodiment of the present disclosure.

FIG. 46B is a schematic diagram of an example angle-time curve 4600B of restoring a UI element with a rebound effect according to an embodiment of the present disclosure.

As shown in FIG. 46B, at T91, the UI element 5 is pressed and changed. For example, a left side of the UI element 5 is pressed, and the UI element 5 rotates around a reference point of the UI element 5. Specifically, the left side of the UI element 5 is pressed, and a right side of the UI element 5 is tilted at the same time. In addition, another UI element (for example, the UI elements 1 to 4 and 6 to 13) is also changed accordingly.

At T92, the user releases the hand. In this case, a rotation angle of the UI element 5 is −60°. In addition, the UI element (for example, the UI elements 3, 4, 7, and 8) whose distance is 1 is rotated accordingly, but a rotation amplitude of the UI element is less than that of the UI element 5. In addition, the UI element (for example, the UI elements 2, 6, and 9) whose distance is 2 is also rotated accordingly, but a rotation amplitude of the UI element is less than that of the UI element whose distance is 1. Further, the UI element (for example, the UI elements 1 and 10 to 13) whose distance is 3 is also rotated accordingly, but a rotation amplitude of the UI element is less than that of the UI element whose distance is 2.

During T92 and T93, the UI elements start to rebound for rotation.

At T93, the UI element 5 rebounds by a rotation angle of 45°. In addition, the UI element (for example, the UI elements 3, 4, 7, and 8) whose distance is 1 rebounds for rotation accordingly, but an amplitude of a rotation rebound of the UI element is less than that of the UI element 5. In addition, the UI element (for example, the UI elements 2, 6, and 9) whose distance is 2 also rebounds for rotation accordingly, but an amplitude of a rotation rebound of the UI element is less than that of the UI element whose distance is 1. Further, the UI element (for example, the UI elements 1 and 10 to 13) whose distance is 3 also rebounds for rotation accordingly, but an amplitude of a rotation rebound of the UI element is less than that of the UI element whose distance is 2.

At T94, all UI elements are restored to initial shapes. In other words, rotation angles of all UI elements are restored to 0°.

It should be understood that the rotation angle in FIG. 46B is merely an example, and the UI elements may be changed in any appropriate pattern. Further, although a rebound effect of only one rebound is shown in FIG. 46B, a rebound effect of a plurality of rebounds may be implemented. A quantity of rebounds may be any appropriate quantity of rebounds. This is not limited herein in the present disclosure. In some embodiments, a rebound amplitude of a plurality of rebounds may be decreased over time.

Figure 46C:
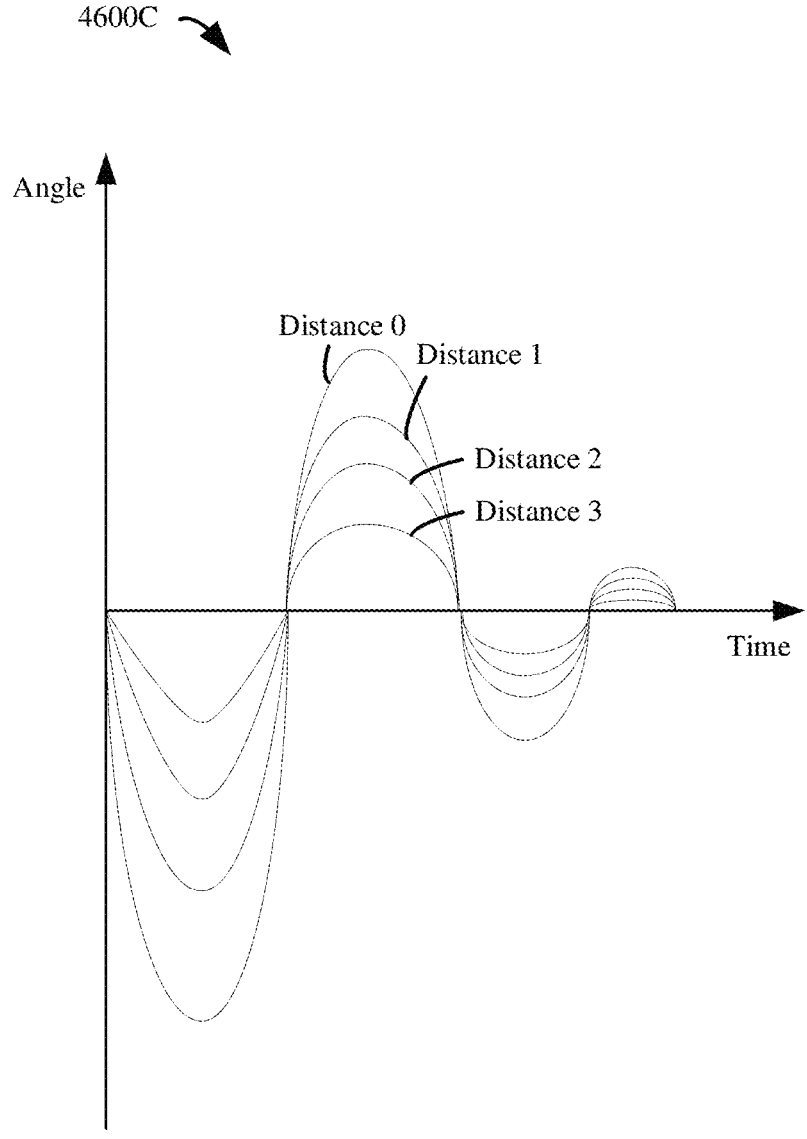
FIG. 46C is a schematic diagram of an example angle-time curve of restoring a UI element with a rebound effect of a plurality of rebounds with a decreased rebound amplitude according to an embodiment of the present disclosure.

FIG. 46C is a schematic diagram of an example angle-time curve 4600C of restoring a UI element with a rebound effect of a plurality of rebounds with a decreased rebound amplitude according to an embodiment of the present disclosure.

As shown in FIG. 46C, the UI element is restored to an initial shape after a plurality of rebounds. A rotation amplitude (for example, a rotation angle) of a rebound of the UI element (for example, the UI element 5) whose distance is 0 is greater than that of the UI element (for example, the UI elements 3, 4, 7, and 8) whose distance is 1. The rotation amplitude of the rebound of the UI element whose distance is 1 is greater than that of the UI element (for example, the UI elements 2, 6, and 9) whose distance is 2. The rotation amplitude of the rebound of the UI element whose distance is 2 is greater than that of the UI element (for example, the UI elements 1 and 10 to 13) whose distance is 3.

Further, in some embodiments, a rebound effect may also be controlled by a predefined curve (for example, an elastic force curve, a Bessel curve, or the like). For example, these UI elements may rebound for the change with animation effects controlled by the predefined curve.

The following describes an implementation principle and a system architecture of a linkage animation according to an embodiment of the present disclosure.

Figure 47:
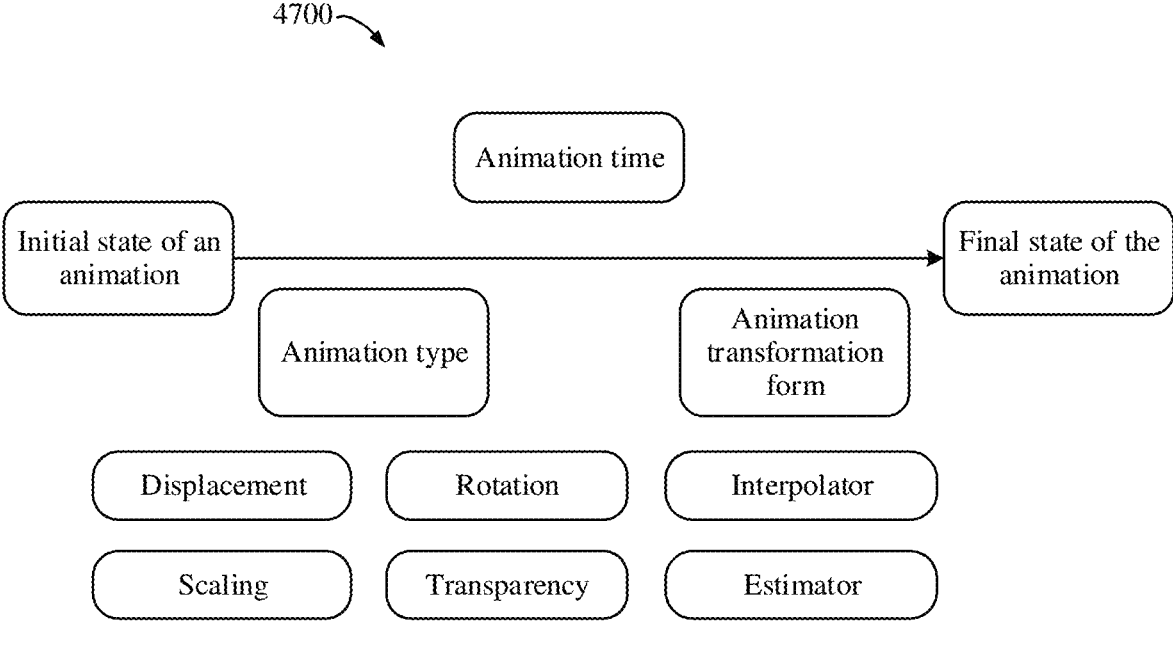
FIG. 47 is a diagram of an animation implementation principle according to an embodiment of the present disclosure.

FIG. 47 is a diagram 4700 of an animation implementation principle according to an embodiment of the present disclosure. As described above, an animation is essentially a real-time display of a UI or UI element based on a refresh rate. Due to a principle of persistence of vision of human beings, a user feels that an image is moving. As shown in FIG. 47, an animation changes from an initial state to a final state of the animation after animation duration. In this transformation process, the animation may be controlled based on an animation type and an animation transformation form. For example, the animation type may include a displacement animation, a rotation animation, a scaling animation, a transparent animation, and the like. The animation transformation form may be controlled by a controller such as an interpolator and an estimator. Such a controller may be configured to control an animation transformation speed during animation duration.

Specifically, the interpolator is configured to set change logic for transition of an animation property value from an initial state to a final state, to control an animation change rate, so that the animation can be changed at one or more of the following rates: a constant speed, an acceleration, a deceleration, and a parabolic rate.

In some embodiments, the electronic device 100 may set the change logic of the animation property value by using a system interpolator or a customized interpolator (for example, an elasticity interpolator or a friction interpolator). When the animation is running, if the electronic device 100 determines, based on the change logic, that the animation property value is changed, the electronic device 100 draws a frame image based on the animation property value, and refreshes a view.

In some embodiments, when determining, based on the change logic of the interpolator, that the animation property value is changed, the electronic device 100 invokes, based on the animation property value, an invalidate( ) function to refresh a view, that is, invoking an onDraw( ) function to redraw a view and display the view.

In some embodiments, the electronic device 100 customizes an elasticity interpolator. For example, parameters in a function of the elasticity interpolator include at least a stiffness coefficient (stiffness) and a damping coefficient (damping). For example, function code of the elasticity interpolator may be expressed as one of the following: "SpringInterpolator(float stiffness, float damping)", "SpringInterpolator(float stiffness, float damping, float end-Pos)", "SpringInterpolator(float stiffness, float damping, float endPos, float velocity)", and "SpringInterpolator(float stiffness, float damping, float endPos, float velocity, float valueThreshold)".

The endPos parameter represents a relative displacement, that is, a difference between an initial position and a rest position of a spring. In some embodiments, endPos may represent a relative displacement of a UI element.

The velocity parameter represents an initial speed. In some embodiments, velocity may represent an initial speed of the UI element.

The valueThreshold parameter represents a threshold for determining that the animation stops. When a displacement (or another property) difference between two adjacent frames is less than the threshold, the animation stops running. When the threshold is larger, the animation is more prone to stop, and running time is shorter. On the contrary, when the threshold is smaller, the running time of the animation is longer. A value of the threshold may be set based on a specific animation property. In some embodiments, the FloatValueHold parameter of the elasticity interpolator is $1/1000$ by default, and the value of the threshold is 1 in another construction method. In some embodiments, when the threshold is customized, a suggested value shown in Table 1 may be used based on an animation property.

TABLE 1

| Animation property | valueThreshold |
| --- | --- |
| ROTATION/ROTATION_X/ROTATION_Y | 1/10 |
| ALPHA | 1/256 |
| SCALE_X/SCALE_Y | 1/500 |
| TRANSLATION_Y/TRANSLATION_X | 1 |

In addition, the threshold may be directly the following constants provided by a DynamicAnimation class: MIN_VISIBLE_CHANGE_PIXELS, IN_VISIBLE_ CHANGE_ROTATION_DEGREES, MIN_VISI- BLE_CHANGE_ALPHA, and MIN_VISIBLE_CHANG- E_SCALE.

For example, specific code of an animation class of the customized elasticity interpolator may be expressed as follows:

"PhysicalInterpolatorBase interpolator=new SpringInter- polator(400F, 40F, 200F, 2600F, 1F);

ObjectAnimator animator=ObjectAnimator.ofFloat(list- View, "translationY", 0, 346);

animator.setDuration(interpolator.getDuration( )); //ob- taining the animation duration animator.setInterpolator(interpolator); //setting the cus- tomized interpolator for the animation class animator.start( ); //running the animation".

In some embodiments, the electronic device 100 custom- izes a friction interpolator. For example, function code of the friction interpolator may be expressed as "FlingInterpolator (float initVelocity, float friction)". initVelocity represents an initial speed, and friction represents friction.

For example, specific code of an animation class using the friction interpolator may be expressed as follows:

"PhysicalInterpolatorBase interpolator=new FlingInter- polator(600F, 0.5F);

ObjectAnimator animator=ObjectAnimator.ofFloat(list- View, "translationY", 0, interpolator.getEndOffset( ));

animator.setDuration(interpolator.getDuration( )); //ob- taining the animation duration animator.setInterpolator(interpolator); //setting the cus- tomized interpolator for the animation class anima- tor.start( );" //running the animation.

In some embodiments, the electronic device 100 may set the animation duration (Duration) and a start position by itself, or may invoke an engine model to obtain the animation duration (Duration) and an end position, and then set the animation duration and the end position for the animation class (Animator class).

For example, code for invoking the engine model by the electronic device 100 to obtain the animation duration may be expressed as "com.xxx.dynamicanimation. interpolator.PhysicalInterpolatorBase#getDuration".

For example, code for invoking the engine model to obtain the end position of the spring may be expressed as "com.xxx.dynamicanimation.interpolator.PhysicalInterpol-atorBase#getEndOffset".

For example, code for setting the valueThreshold parameter may be expressed as "com.xxx.dynamic-animation.interpolator.PhysicalInterpolatorBase#setValue-Threshold".

In some embodiments, code of an animation class using an elastic engine may be expressed as one of the following code: "SpringAnimation(K object, FloatPropertyCompat<K> property, float stiffness, float damping, float startValue, float endValue, float velocity)", and "SpringAnimation(K object, FloatPropertyCompat<K> property, float stiffness, float damping, float endValue, float velocity)".

The object parameter represents an animation object, and the Property parameter represents a property object to which the animation class or the interpolator is applied. Refer to Table 1. The parameter may be used to indirectly set valueThreshold. The parameter is optional in an interpolator version, and the parameter may not be set when valueThreshold is set in another manner, that is, a construction method without the property parameter is used directly. The parameter is a mandatory parameter in an animation class version. The DynamicAnimation class provides the following constants that can be used directly:

"TRANSLATION_X, TRANSLATION_Y, TRANSLA-TION_Z, SCALE_X, SCALE_Y, ROTATION, ROTA-TION_X, ROTATION_Y, X, Y, Z, ALPHA, SCROLL_X, and SCROLL_Y". The electronic device 100 may customize a ViewProperty interface.

For example, specific code of an animation class using a spring engine may be expressed as follows:

"SpringAnimation animation=SpringAnimation (list-View, DynamicAnimation.TRANSLATION_Y, 400F, 40F, 0, 1000F);

animation.start( );"

In some embodiments, code of an animation class using a friction engine may be expressed as follows: "FlingAni-mation (K object, FloatPropertyCompat<K> property, float initVelocity, float friction)".

For example, specific code of an animation class using the friction may be expressed as follows:

"FlingAnimation animation=FlingAnimation (listView, DynamicAnimation.TRANSLATION_Y, 2000F, 0.5F); animation.start( );".

Figure 48:
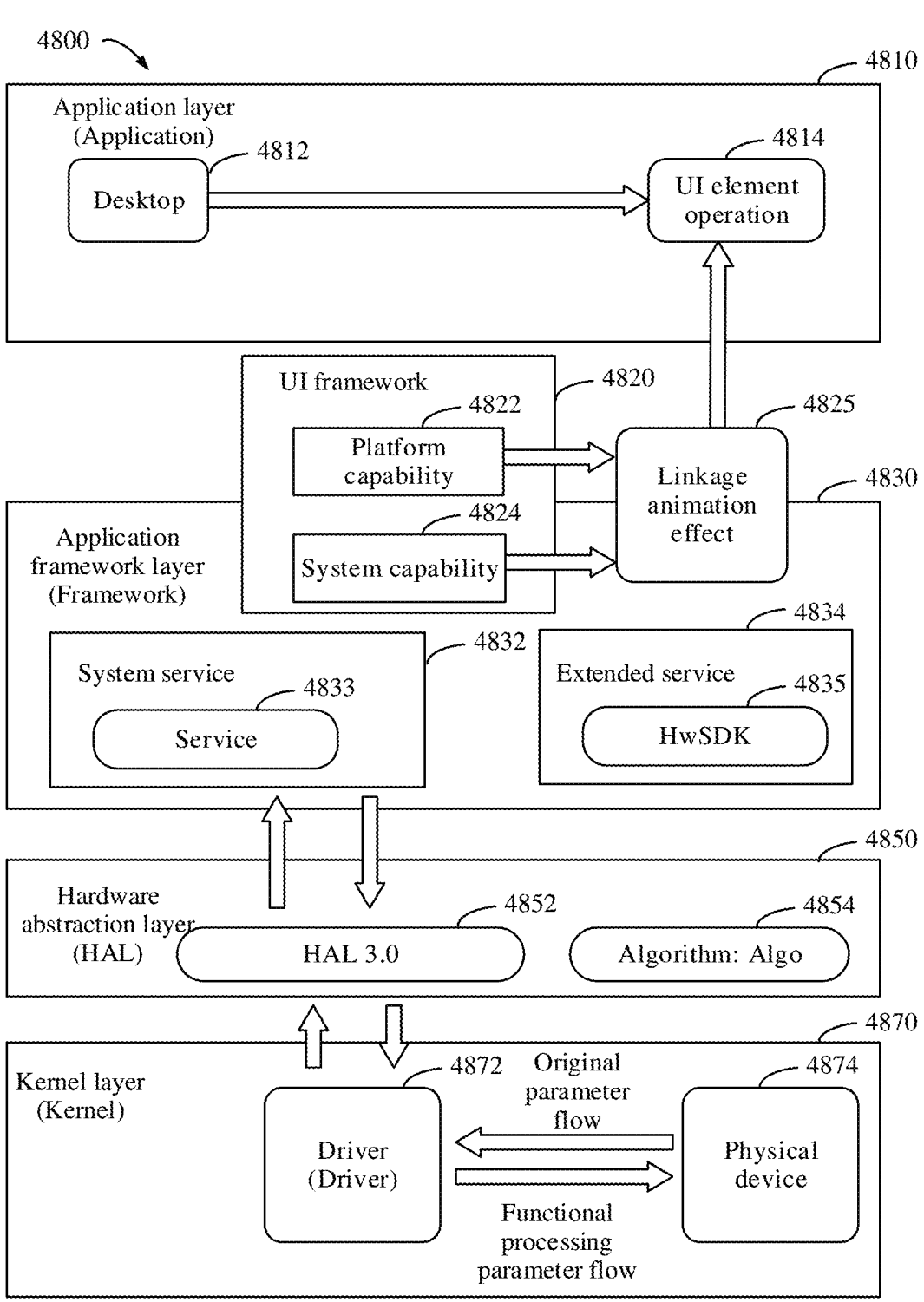
FIG. 48 is a schematic diagram of a system framework for implementing a "linkage" animation effect capability or function according to an embodiment of the present disclosure.

FIG. 48 is a schematic diagram of a system framework 4800 for implementing a "linkage" animation effect capability or function according to an embodiment of the present disclosure. An animation effect capability of a UI framework is implemented based on an overall architecture of Android® or HarmonyOS®, including mainstream four-layer logic processing. A data processing process is presented to a user from the bottom to the top. The user mainly uses and experiences an animation effect function at an application layer. In this embodiment of the present disclosure, a capability interaction relationship between a desktop and the UI framework is shown in FIG. 48. Specifically, as shown in FIG. 48, the system framework 4800 may include an application layer 4810, an application framework layer 4830, a hardware abstraction layer 4850, and a kernel layer 4870. The application layer 4810 may include a desktop 4812. A UI element operation 4814 may be implemented on the desktop 4812. The UI element operation 4814 may include a dragging operation, a pressing operation, a depth pressing operation, and the like. The application framework layer 4830 may include a system service 4832 and an extended service 4834. The system service 4832 may include various system services, for example, a Service 4833. The extended service 4834 may include various extended services, such as SDK 4835. The hardware abstraction layer (HAL) 4850 may include an HAL 3.0 4852 and an algorithm Algo 4854. The kernel layer 4870 may include a driver 4872 and a physical device 4874. The physical device 4874 may provide an original parameter flow to the driver 4872, and the driver 4872 may provide a function processing parameter flow to the physical device 4874. As further shown in FIG. 48, the UI framework 4820 for implementing a linkage animation effect 4825 may be implemented between the application layer 4810 and the application framework layer 4830. The UI framework 4820 may include a platform capability 4822 and a system capability 4824, and both may be used to provide the linkage animation effect 4825. The linkage animation effect 4825 may be provided for the UI element operation 4814 at the application layer 4810.

Figure 49:
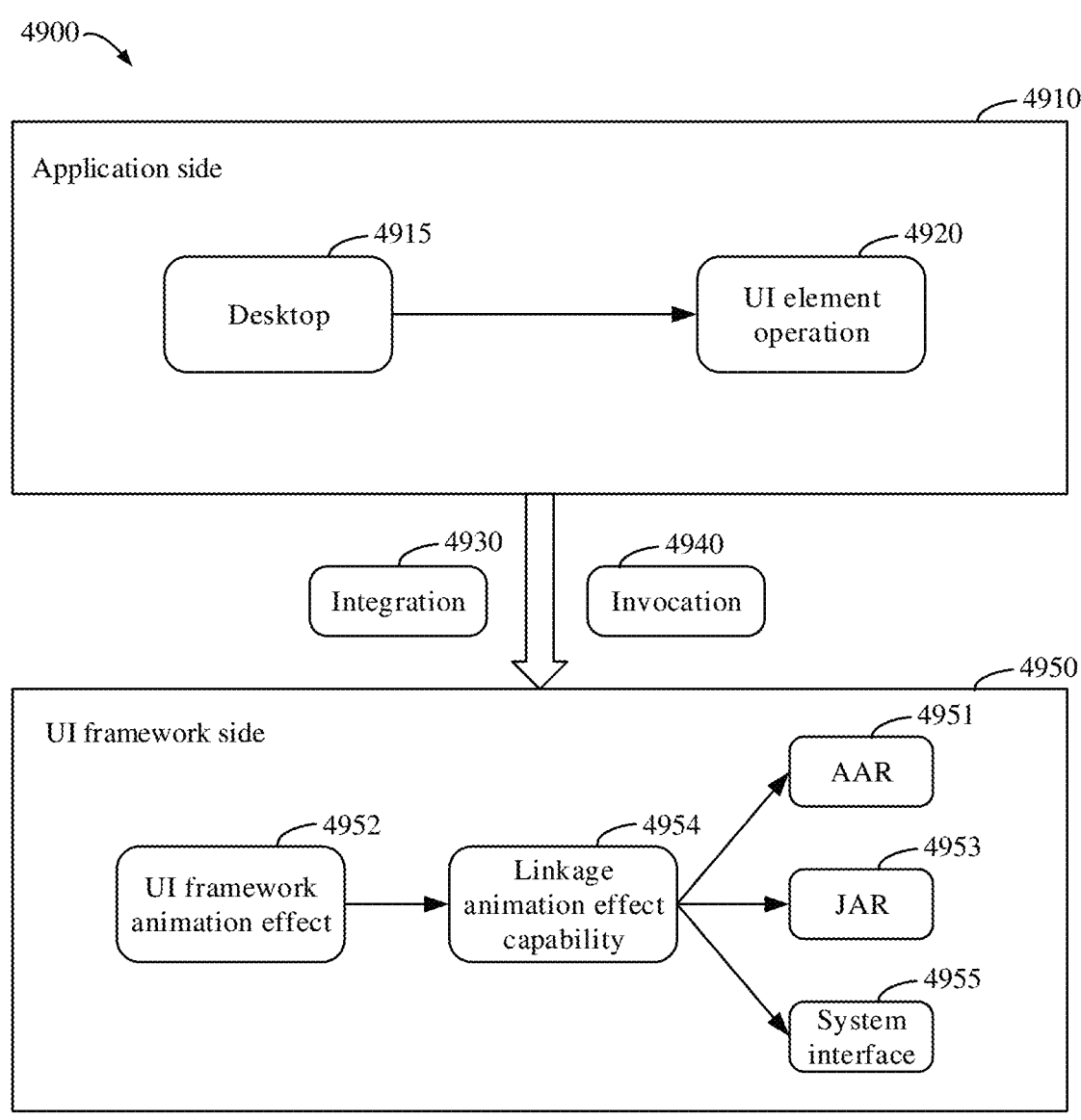
FIG. 49 is a schematic diagram of a relationship between an application side and a UI framework side related to a "linkage" animation effect capability or function according to an embodiment of the present disclosure.

FIG. 49 is a schematic diagram of a relationship between an application side and a UI framework side related to a "linkage" animation effect capability or function according to an embodiment of the present disclosure. As shown in FIG. 49, an application side 4910 may include a desktop 4915, and operations, such as dragging, pressing, and depth pressing may be implemented on a UI element on the desktop 4915. A UI framework side 4950 may include a UI framework animation effect 4952, the UI framework animation effect 4952 may implement a linkage animation effect capability 4954, and the linkage animation effect capability 4954 may be implemented by using a manner, such as an AAR 4951, a JAR 4953, and a system interface 4955. The application side 4910 may invoke the "linkage" animation effect capability or function provided by the UI framework side 4950 by integrating 4930 and invoking 4940. Through an interaction between the application side 4910 and the UI framework side 4950, a new linkage "animation effect" is implemented in this embodiment of the present disclosure, so that original independent UI elements (such as an icon, a card, and a control) are associated.

FIG. 50 is a schematic diagram of a specific description of three manners of implementing a "linkage" animation effect capability or function according to an embodiment of the present disclosure. As shown in FIG. 50, a relationship 5001 between the AAR 4951 and a system of the electronic device 100 is as follows: The AAR 4951 is a capability that is packaged based on a capability in a binary manner and that is provided for an application side in a system for integration. A version schedule of the AAR 4951 may be freely controlled without following the system. A relationship 5003 between the JAR 4953 and the system of the electronic device 100 is as follows: The JAR 4953 is a capability that is packaged based on a capability in a binary manner and that is provided for all components in the system. A version schedule of the JAR 4953 may be freely controlled without following the system. A relationship 5005 between the system interface 4955 and the system of the electronic device 100 is as follows: The system interface 4955 is an interface at a framework layer in a system version, is a capability provided for all components in the system, and is upgraded with the system. The present disclosure focuses on implementation of a linkage animation effect capability. Integration is implemented through the AAR and JAR manners, and invocation is implemented through a manner of a system interface. Scenarios are not limited, but the capability display manners are different. In other words, functions of the methods described above in the present disclosure may be implemented by using an AAR file, a JAR file, and/or a system interface of the electronic device 100. In this manner, a capability or function of a "linkage" animation effect may be simply and conveniently implemented and provided for an application of the electronic device, for example, a desktop.

What is claimed is:

1. A method, comprising:
   displaying M user interface (UI) elements on a screen of an electronic device, wherein M is a positive integer greater than 1;
   detecting dragging performed on a first UI element in the M UI elements; and
   in response to the dragging, enabling each of N UI elements on the screen to move with corresponding animation effects, wherein:
   N is a positive integer ranging from 1 to M−1, and
   enabling the N UI elements to move with the corresponding animation effects comprises:
   determining a first animation effect of movement of the first UI element in response to the dragging;
   determining a distance between the first UI element and a second UI element, the second UI element being in the N UI elements;
   determining a second animation effect of movement of the second UI element in response to the dragging based on the first animation effect, the distance, and a size of the second UI element, wherein determining the second animation effect of the movement of the second UI element in response to the dragging based on the distance comprises determining a duration that the movement of the second UI element continues after the dragging ends based on the distance;
   determining a third animation effect of movement of a third UI element in response to the dragging, the third UI element being in the N UI elements, and wherein determining the second animation effect of the movement of the second UI element based on the size of the second UI element comprises determining the second animation effect is different from the third animation effect in response to the size of the second UI element being different than a size of the third UI element; and
   enabling the second UI element to move with the second animation effect and the third UI element to move with the third animation effect, to visually indicate that the second UI element and the third UI element move with the first UI element.

2. The method according to claim 1, wherein determining the distance comprises:
   determining a first reference point of the first UI element and a second reference point of the second UI element; and
   determining the distance between the first reference point and the second reference point.

3. The method according to claim 1, wherein determining the distance comprises:
   determining a first reference point of the first UI element;
   determining, from a plurality of circles that each use the first reference point as a center and that have respective radii, a target circle that intersects with the second UI element and has a smallest radius; and
   determining the smallest radius of the target circle as the distance.

4. The method according to claim 1, wherein determining the distance comprises:
   determining a horizontal spacing between the first UI element and the second UI element;
   determining a vertical spacing between the first UI element and the second UI element; and
   determining the distance based on any one of the following:
   at least one of the horizontal spacing and the vertical spacing; or
   a direction from a second reference point of the second UI element to a first reference point of the first UI element and at least one of the horizontal spacing and the vertical spacing.

5. The method according to claim 1, further comprising:
   determining an impact area of the first UI element based on a size of the first UI element; and
   determining UI elements that are in the M UI elements and that are in the impact area as the N UI elements.

6. The method according to claim 1, further comprising:
   determining M−1 UI elements in the M UI elements other than the first UI element as the N UI elements.

7. The method according to claim 1, wherein:
   determining the second animation effect of the movement of the second UI element in response to the dragging is based on:
   the first animation effect, the distance, the size of the second UI element, and a size of the first UI element, wherein the second animation effect indicates a first linkage impact between the first UI element and the second UI element, and wherein the first linkage impact between the first UI element and the second UI element is inversely proportional to the size of the second UI element and directly proportional to the size of the first UI element.

8. The method according to claim 7, wherein the first animation effect of the movement of the first UI element is determined based on a predefined curve in which a displacement changes over time.

9. The method according to claim 8, wherein the predefined curve is a Bessel curve or an elastic force curve.

10. The method according to claim 1, wherein enabling the second UI element to move with the second animation effect comprises:
   determining a direction of the dragging; and
   enabling the second UI element to move, in association with the direction, with the second animation effect.

11. The method according to claim 1, wherein enabling the second UI element to move with the second animation effect comprises:
   determining a delay time from a start of the dragging based on the distance; and
   in response to the dragging, enabling the second UI element to move with the second animation effect after the delay time.

12. An electronic device, comprising:
   one or more processors; and
   a memory coupled to the processor and storing instructions which, when executed by the one or more processors, cause the electronic device to perform operations of:

displaying M user interface (UI) elements on a screen of the electronic device, wherein M is a positive integer greater than 1;

detecting dragging performed on a first UI element in the M UI elements; and in response to the dragging, enabling each of N UI elements on the screen to move with corresponding animation effects, wherein:

N is a positive integer ranging from 1 to M−1, and enabling the N UI elements to move with the corresponding animation effects comprises:

determining a first animation effect of movement of the first UI element in response to the dragging;

determining a distance between the first UI element and a second UI element, the second UI element being in the N UI elements;

determining a second animation effect of movement of the second UI element in response to the dragging based on the first animation effect, the distance, and a size of the second UI element, wherein determining the second animation effect of the movement of the second UI element in response to the dragging based on the distance comprises determining a duration that the movement of the second UI element continues after the dragging ends based on the distance;

determining a third animation effect of movement of a third UI element in response to the dragging, the third UI element being in the N UI elements, and wherein determining the second animation effect of the movement of the second UI element based on the size of the second UI element comprises determining the second animation effect is different from the third animation effect in response to the size of the second UI element being different than a size of the third UI element; and enabling the second UI element to move with the second animation effect and the third UI element to move with the third animation effect, to visually indicate that the second UI element and the third UI element move with the first UI element.

13. The electronic device according to claim 12, wherein determining the distance comprises:

determining a first reference point of the first UI element and a second reference point of the second UI element; and determining the distance between the first reference point and the second reference point.

14. The electronic device according to claim 12, wherein determining the distance comprises:

determining a first reference point of the first UI element;

determining, from a plurality of circles that each use the first reference point as a center and that have respective radii, a target circle that intersects with the second UI element and has a smallest radius; and determining the smallest radius of the target circle as the distance.

15. The electronic device according to claim 12, wherein determining the distance comprises:

determining a horizontal spacing between the first UI element and the second UI element;

determining a vertical spacing between the first UI element and the second UI element; and determining the distance based on any one of the following:

at least one of the horizontal spacing and the vertical spacing; or a direction from a second reference point of the second UI element to a first reference point of the first UI element and at least one of the horizontal spacing and the vertical spacing.

16. The electronic device according to claim 12, wherein the operations further comprising:

determining an impact area of the first UI element based on a size of the first UI element; and determining UI elements that are in the M UI elements and that are in the impact area as the N UI elements.

17. A non-transitory computer-readable storage medium, wherein the non-transitory computer-readable storage medium stores instructions which, when executed by an electronic device, cause the electronic device to perform operations of:

displaying M user interface (UI) elements on a screen of the electronic device, wherein M is a positive integer greater than 1;

detecting dragging performed on a first UI element in the M UI elements; and in response to the dragging, enabling each of N UI elements on the screen to move with corresponding animation effects, wherein:

N is a positive integer ranging from 1 to M-1, and enabling the N UI elements to move with the corresponding animation effects comprises:

determining a first animation effect of movement of the first UI element in response to the dragging;

determining a distance between the first UI element and a second UI element, the second UI element being in the N UI elements;

determining a second animation effect of movement of the second UI element in response to the dragging based on the first animation effect, the distance, and a size of the second UI element, wherein determining the second animation effect of the movement of the second UI element in response to the dragging based on the distance comprises determining a duration that the movement of the second UI element continues after the dragging ends based on the distance;

determining a third animation effect of movement of a third UI element in response to the dragging, the third UI element being in the N UI elements, and wherein determining the second animation effect of the movement of the second UI element based on the size of the second UI element comprises determining the second animation effect is different from the third animation effect in response to the size of the second UI element being different than a size of the third UI element; and enabling the second UI element to move with the second animation effect and the third UI element to move with the third animation effect, to visually indicate that the second UI element and the third UI element move with the first UI element.

18. The non-transitory computer-readable storage medium according to claim 17, wherein determining the distance comprises:

determining a first reference point of the first UI element and a second reference point of the second UI element; and determining the distance between the first reference point and the second reference point.

19. The non-transitory computer-readable storage medium according to claim 17, wherein determining the distance comprises:

determining a first reference point of the first UI element;

determining, from a plurality of circles that each use the first reference point as a center and that have respective radii, a target circle that intersects with the second UI element and has a smallest radius; and determining the smallest radius of the target circle as the distance.

20. The non-transitory computer-readable storage medium according to claim 17, wherein determining the distance comprises:

determining a horizontal spacing between the first UI element and the second UI element;

determining a vertical spacing between the first UI element and the second UI element; and determining the distance based on any one of the following:

at least one of the horizontal spacing and the vertical spacing; or a direction from a second reference point of the second UI element to a first reference point of the first UI element and at least one of the horizontal spacing and the vertical spacing.

* * * * *